United States Patent
Ito et al.

(10) Patent No.: US 8,992,317 B2
(45) Date of Patent: Mar. 31, 2015

(54) GAME SYSTEM, GAME DEVICE, STORAGE MEDIUM STORING A GAME PROGRAM, AND GAME PROCESS METHOD

(75) Inventors: Jun Ito, Kyoto (JP); Keizo Ohta, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 345 days.

(21) Appl. No.: 13/332,954

(22) Filed: Dec. 21, 2011

(65) Prior Publication Data

US 2012/0190442 A1 Jul. 26, 2012

(30) Foreign Application Priority Data

Jan. 25, 2011 (JP) ................................ 2011-012788

(51) Int. Cl.
*A63F 13/26* (2014.01)
*A63F 13/20* (2014.01)
*A63F 13/40* (2014.01)

(52) U.S. Cl.
CPC ............... *A63F 13/06* (2013.01); *A63F 13/10* (2013.01); *A63F 2300/1031* (2013.01); *A63F 2300/105* (2013.01); *A63F 2300/1075* (2013.01); *A63F 2300/301* (2013.01); *A63F 2300/6661* (2013.01)
USPC ............................................. 463/31; 463/34

(58) Field of Classification Search
CPC . A63F 13/04; A63F 13/06; A63F 2009/2407; A63F 2300/105; A63F 2300/301
USPC ................................ 463/30, 31, 33, 34; 345/158
See application file for complete search history.

(56) References Cited

U.S. PATENT DOCUMENTS

| | | | | |
|---|---|---|---|---|
| 6,478,679 | B1 * | 11/2002 | Himoto et al. | 463/36 |
| 6,540,614 | B1 * | 4/2003 | Nishino et al. | 463/40 |
| 6,921,336 | B1 * | 7/2005 | Best | 463/32 |
| 2002/0165028 | A1 * | 11/2002 | Miyamoto et al. | 463/46 |
| 2003/0216177 | A1 | 11/2003 | Aonuma et al. | |
| 2009/0225026 | A1 * | 9/2009 | Sheba | 345/156 |
| 2010/0279769 | A1 * | 11/2010 | Kidakam | 463/31 |
| 2010/0311501 | A1 * | 12/2010 | Hsu | 463/30 |
| 2010/0331082 | A1 * | 12/2010 | Kim et al. | 463/30 |

FOREIGN PATENT DOCUMENTS

JP 2001-034247 2/2001
JP 2003-325973 11/2003

* cited by examiner

*Primary Examiner* — Omkar Deodhar
*Assistant Examiner* — Allen Chan
(74) *Attorney, Agent, or Firm* — Nixon & Vanderhye PC

(57) ABSTRACT

A game system includes a game device and a terminal device. The game device obtains operation data representing an operation on the terminal device. Moreover, the game device generates a first game image and second game images based on a game process based on the operation data. The first game image is output to, and displayed on, a television separate from the terminal device. The second game image is wirelessly transmitted to, and displayed on, the terminal device. The game device calculates an attitude of the terminal device based on data output from an inertia sensor of the terminal device, and switches between second game images in accordance with the attitude of the terminal device.

23 Claims, 18 Drawing Sheets

| | REFERENCE STATE | WHEN DIRECTED TO RIGHT |
|---|---|---|
| TERMINAL DEVICE |  |  |
| VIRTUAL CAMERA |  |  |
| PLAYER OBJECT |  |  |

GAME SYSTEM, GAME DEVICE, STORAGE MEDIUM STORING A GAME PROGRAM, AND GAME PROCESS METHOD

CROSS REFERENCE TO RELATED APPLICATIONS

The disclosure of Japanese Patent Application No. 2011-12788 filed on Jan. 25, 2011, is incorporated herein by reference.

FIELD

The present specification discloses a game system for displaying game images on two display devices, etc.

BACKGROUND AND SUMMARY

There are conventional game systems in which game images are displayed on two display devices. For example, there are game systems in which an image of a three-dimensional game space is displayed on a television, while a map image or an item image is displayed on the screen of a portable game device capable of communicating with a video game device. With such a game system, a player can look at both an image of a three-dimensional game space and a map image without performing a screen switching operation, and it is thus possible to provide game images with which a player can easily grasp the game space and can easily perform game operations.

In the above game system, game operations on the map image are performed using the portable game device, and game operations performed on the three-dimensional game space displayed on the television are performed using a controller of the video game device. Therefore, when a single-player game is played, the player switches between the controller and the portable game device each time the player switches between operations on the two game images. Thus, with the above game system, since switching between operations on the two game images is troublesome, it is difficult to perform game operations on the two game images, and it is difficult for the player to make effective use of the two display devices. With the above game system, it is not possible for example to play a game while dynamically (without stopping the gameplay) changing game operations on the game images of the two display devices.

Therefore, the present specification discloses a game system in which it is possible to easily perform game operations on game images displayed on two display devices.

(1)

An example game system described in the present specification includes a game device, and a controller device capable of communicating with the game system.

The game device includes an operation data obtaining unit, a game process unit, a first game image generation unit, a second game image generation unit, a first image output unit, and a second image output unit. The operation data obtaining unit obtains operation data representing an operation on the controller device. The game process unit performs a game process based on the operation data. The first game image generation unit generates a first game image based on the game process. The second game image generation unit generates a second game image based on the game process. The first image output unit outputs the first game image to a predetermined display device separate from the controller device. The second image output unit wirelessly transmits the second game image to the controller device.

The controller device includes a second game image obtaining unit, a display unit, an inertia sensor, and an operation data transmission unit. The second game image obtaining unit receives the second game image. The display unit displays the second game image. The operation data transmission unit transmits the operation data, including data output from the inertia sensor, to the game device.

The game device includes an attitude calculation unit for calculating an attitude of the controller device based on the data output from the inertia sensor. The second game image generation unit is capable of generating a third game image or a fourth game image, as the second game image, and switching between the third game image and the fourth game image in accordance with whether the attitude of the controller device is in a predetermined first state or in a second state different from the first state.

The "game device" may be any information processing device capable of performing game processes to generate game images based on the game processes. The game device may be a single-purpose information processing device for games, or a general-purpose information processing device such as an ordinary personal computer.

The "controller device" is a concept including any device having a display unit and an inertia sensor, and is a concept including the terminal device of an embodiment to be described later, and a portable game device.

The "game system" may be any game system as long as it includes a game device and a controller device, and may or may not include a predetermined display device for displaying the first game image. That is, the game system may be provided in a form including or not including the predetermined display device.

Each of the "first state" and the "second state" is a state regarding the attitude of the controller device, and may be a state that is simply determined by the attitude at a point in time or a state that is determined by a change in attitude. For example, the first state may be defined as a state where the attitude of the controller device is greater than a predetermined threshold, whereas the second state may be defined as a state where the attitude of the controller device is less than or equal to the predetermined threshold. For example, the first state may be defined as a change in the attitude of the controller device from an attitude less than or equal to a predetermined first threshold to another attitude greater than the first threshold, and the second state may be defined as a change in the attitude of the controller device from an attitude greater than a predetermined second threshold to another attitude less than or equal to the second threshold.

The "second game image generation unit" is not limited as long as it is capable of switching between game images in accordance with at least two different states of the controller device, and may switch between game images in accordance with three or more different states of the controller device.

To "switch between the third game image and the fourth game image" means to change the game image from one game image to another, different, game image. The two different images to be switched from one to another may be a subjective perspective image and a map image, as in the embodiment to be described later. Alternatively, the two different images to be switched from one to another may be images representing the game space as viewed from different viewpoints and/or different viewing directions, or may be an image representing the game space and another image not representing the game space. For example, the other image may be an image representing a menu screen, an image representing an item screen for selecting an item, or an image irrelevant to the progress of the game (e.g., an image representing the title screen of the game).

With the configuration (1) above, game images to be displayed on two display devices (the display unit of the controller device and a predetermined display device) are generated based on operations on the controller device. That is, since the player can perform operations on different game images with a single controller device, it is possible to easily perform game operations on different game images displayed on two display devices without switching between controller devices as in the conventional game system described above.

Moreover, with the configuration (1) above, since the second game images (the third game image and the fourth game image) to be displayed on the controller device are switched from one to another in accordance with the change of the attitude of the controller device, the player can easily switch between the second game images using the controller device. Thus, it is possible to display a plurality of different game images on the screen of the controller device, and the player can switch between the second game images while performing the game operation using the controller device. Therefore, the player can play the game while making more effective use of the two display devices. For example, with the configuration (1) above, it is possible to provide a novel game method of dynamically switching between the second game images during the game and, accordingly, dynamically switching between the screens of the two display devices as the object to look at during the game.

With the configuration (1) above, since the game images are generated on the game device side, the controller device only needs to have a function of receiving and displaying the game images. Where game processes are performed by both of two devices (the video game device and the portable game device), as in the conventional game system described above, for example, the game processes will be complicated because game processes to be performed by the devices are synchronized together. On the other hand, with the configuration (1) above, since game processes are performed by one device (on the game device side), there is no need to synchronize the game processes, and it is therefore possible to simplify the game processes.

(2)

The game process unit may include a determination unit. The determination unit determines that the attitude of the controller device is in the first state when an attitude of a screen of the display unit is closer to being vertical than a predetermined reference attitude, and in the second state when the attitude of the screen of the display unit is closer to being horizontal than the predetermined reference attitude.

With the configuration (2) above, the second game images (the third game image and the fourth game image) are switched from one to another between the first state in which the screen of the controller device is vertical and the second state in which the screen of the controller device is horizontal. That is, the player can switch between the second game images (the third game image and the fourth game image) by a natural action of moving the controller device up and down, and it is thus possible to provide an easy switching operation.

With the configuration (2) above, the player can freely put the screen of the controller device in a vertical or horizontal position as necessary. That is, with the configuration (2) above, the player does not need to always keep the controller device in a vertical position, and can therefore comfortably perform game operations without getting the arms tired. Since the direction of the screen as viewed from the player does not change even if the attitude of the controller device is changed, it will not be difficult to view the screen even if the attitude is changed, and it is thus possible to provide an easy-to-view game image.

(3)

If it is determined that the controller device is in the first state, the determination unit may change the predetermined reference attitude to another attitude closer to being horizontal, and if it is determined that the controller device is in the second state, the determination unit may change the predetermined reference attitude to another attitude closer to being vertical.

With the configuration (3) above, a reference attitude that is relatively close to being horizontal is used for the determination of a transition from the first state in which the screen of the controller device is closer to being vertical to the second state in which the screen is closer to being horizontal. On the other hand, another reference attitude that is relatively close to being vertical is used for the determination of a transition of the controller device from the second state to the first state. Then, immediately after the controller device transitions from one state to the other, the controller device is prevented from going back to the old state due to slight attitude changes after the transition. Therefore, with the configuration (3) above, it is possible to prevent frequent switching between the first state and the second state, and thus to prevent frequent switching between the second game images (the third game image and the fourth game image).

(4)

The first image generation unit may generate a first game image representing a game space. In this case, the second image generation unit generates the third game image which represents the game space and is different from the first game image when the attitude of the controller device is in the first state (the vertical state), and generates the fourth image different from the third image when the attitude of the controller device is in the second state (the horizontal state).

The "fourth image" may be any image as long as it is a different type of an image from the third image representing the game space generated in the first state. For example, the "fourth image" may be an image representing a menu screen, an image representing an item screen, or the like, as well as a map image as in the embodiment to be described later.

With the configuration (4) above, when the controller device is in the first state, images representing the game space are displayed on different display devices in different manners, and the player can therefore easily grasp the circumstances of the game space. When the controller device is in the second state, a game image that is different from that in the first state is displayed on the controller device, and it is thus possible to provide game information different from that in the first state to the player. The switching between the second game images (the third game image and the fourth game image) can be easily done by changing the attitude of the controller device. Therefore, the player can easily switch between a game image with which the circumstances of the game space can be easily grasped, and another game image with which other game information can be obtained, during game operations, thus making more effective use of the two display devices.

Where the configuration (4) above is combined with the configuration (2) above, the following advantages are further obtained. That is, with the configuration (4) above, the first game image representing the game space is displayed on the predetermined display device. The image the player primarily looks at during the game is the image representing the game space, and if such an image representing the game space is displayed on the predetermined display device, the player can grasp the circumstances of the game space (with the first game image) even if the screen of the controller device is put in a horizontal position. Therefore, in such a case, it is possible to reduce the chance of the player performing game operations while keeping the screen of the controller device in a vertical position, and game operations using the controller device can be made more comfortable.

Moreover, in a case where the configuration (4) above is combined with the configuration (2) above, an image representing the game space is displayed on the controller device when the screen of the controller device is in a vertical position (the first state), and another game image is displayed on the controller device when the screen of the controller device is in a horizontal position (the second state). Then, an image representing the game space which is an image the player primarily looks at during the game is displayed on the predetermined display device or on the controller device when the screen of the controller device is in a vertical position. Therefore, the player, looking at the screen of either display device, can perform game operations while looking primarily in the forward direction. Thus, the player can play the game without substantially changing the viewing direction during the game, and is therefore allowed to play the game comfortably.

(5)

The game process unit includes an object control unit for controlling a player object arranged in the game space based on the operation data. In this case, the first image generation unit generates the first game image representing the game space using a first virtual camera that is set so that the player object is included in a display range. The second image generation unit generates the third game image using a second virtual camera that is set at a position of a viewpoint of the player object when the attitude of the controller device is in the first state.

The "position of the viewpoint of the player object" is a concept including the position of the player object and the vicinity thereof. That is, the position is not limited as long as a so-called "subjective perspective" game image is generated when the virtual camera is arranged at the position.

With the configuration (5) above, a so-called "objective perspective" game image and a "subjective perspective" game image are displayed on different display devices. Therefore, the player can more easily grasp the circumstances of the game space by looking at the two different game images.

(6)

The second image generation unit may generate the third game image so that a predetermined object arranged in the game space is displayed in a different manner from that for the first game image when the attitude of the controller device is in the first state.

To "generate the third game image so that a predetermined object arranged in the game space is displayed in a different manner from that for the first game image" is a concept including a case in which the predetermined object is in different colors or different shapes in different game images, and a case in which the predetermined object is displayed in one game image while the predetermined object is not displayed in the other game image (see FIGS. 14 and 15).

With the configuration (6) above, since the predetermined object is displayed on the controller device in a different manner from that for the predetermined display device, it is possible to create a situation where the player needs to look at the screen of the controller device or a situation where it is advantageous for the player to look at the screen of the controller device rather than the predetermined display device. That is, it is possible to motivate the player to look at the screen of the controller device by changing the attitude of the controller device. Thus, the player will be playing the game while switching between the screen of the controller device and the predetermined display device as the object to look at, depending on the status of the game, rather than simply using the game image displayed on the controller device as a supplementary image. With the configuration (6) above, the player can perform a novel game operation of playing the game while dynamically switching between screens to look at during the game, and it is thus possible to provide a game with higher playability.

(7)

The first game image generation unit may generate the first game image representing the game space while the predetermined object is made invisible. In this case, the second image generation unit generates the third game image while the predetermined object is made visible when the attitude of the controller device is in the first state.

With the configuration (7) above, the predetermined object is displayed only on the controller device. Therefore, it is possible to implement a novel game operation, in which the player normally looks at the predetermined display device, and looks at the screen of the controller device by changing the attitude of the controller device as necessary (when the player wishes to see the predetermined object).

(8)

The second image generation unit may generate the third game image using a second virtual camera which assumes an attitude in accordance with the attitude of the controller device when the attitude of the controller device is in the first state.

With the configuration (8) above, in the first state, the viewing direction in the image of the game space displayed on the controller device changes in accordance with the attitude of the controller device. Then, the player can easily and quickly change the viewing direction by an intuitive operation using the controller device.

(9)

The second image generation unit may generate the fourth game image which shows the game space as viewed from above when the attitude of the controller device is in the second state.

The "image which shows the game space as viewed from above" may be an image generated by using a virtual camera set in a virtual three-dimensional game space, or may be a two-dimensional image that is not generated using a virtual camera but is provided in advance, for example.

With the configuration (9) above, the player can easily grasp the arrangement of different objects in the game space, for example, by holding the controller device in the second state.

(10)

The game process unit may use different methods of operation on a predetermined object in the game space when the attitude of the controller device is in the first state and when the attitude of the controller device is in the second state.

With the configuration (10) above, the method of operation on the predetermined object changes as the second game images (the third game image and the fourth game image) are switched from one to another. Therefore, it is possible to provide, to the player, a suitable operation method in accordance with the displayed second game image.

(11)

When the attitude of the controller device is in the first state, the game process unit may perform a predetermined game process in response to an operation on the controller device, the predetermined game process being a process which cannot be performed when the attitude of the controller device is in the second state.

The "predetermined game process" is not limited as long as it is a process that influences the progress of the game or that changes the game display. For example, the "predetermined game process" is a process of making an object execute a predetermined action or a process of selecting a predetermined object in the game space.

With the configuration (11) above, the operation of performing the predetermined game process can be done only when the controller device is in the first state. Thus, it is possible to motivate the player to change the attitude of the controller device. With the configuration (11) above, the player will be playing the game while changing the attitude of the controller device, depending on the status of the game, rather than simply using the game image displayed on the controller device as a supplementary image. Therefore, with the configuration (11) above, the player can perform a novel game operation of playing the game while dynamically switching between game images during the game by changing the attitude of the controller device, and it is thus possible to provide a game with higher playability.

(12)

Another example game system described in the present specification includes a game device, and a controller device capable of communicating with the game device. The game system includes an operation data obtaining unit, an attitude calculation unit, a game process unit, a first game image generation unit, a second game image generation unit, a first display control unit, and a second display control unit. The operation data obtaining unit obtains operation data representing an operation on the controller device. The attitude calculation section calculates an attitude of the controller device based on the operation data. The game process unit performs a game process based on the operation data. The first game image generation unit generates a first game image based on the game process. The second game image generation unit generates second game images based on the game process so that the second game images are switched from one to another in accordance with the attitude of the controller device. The first display control unit displays the first game image on a predetermined display device separate from the controller device. The second display control unit displays the second game image on a display unit of the controller device.

With the configuration (12) above, since game images to be displayed on two display devices are generated based on operations on the controller device, as with the configuration (1) above, the player can perform operations on different game images with a single controller device, and can easily perform game operations on different game images displayed on two display devices.

Moreover, with the configuration (12) above, since the second game images to be displayed on the controller device are switched from one to another in accordance with a change in the attitude of the controller device, as with the configuration (1) above, the player can easily switch between the second game images by using the controller device. Thus, it is possible to display a plurality of different game images on the screen of the controller device, and the player can switch between the second game images while performing the game operation using the controller device. Therefore, the player can play the game while making more effective use of the two display devices. For example, with the configuration (12) above, it is possible to provide a novel game method of dynamically switching between the second game images during the game and, accordingly, dynamically switching between the screens of the two display devices as the object to look at during the game.

(13)

Another example game system described in the present specification is a game system including a game device, and a controller device capable of communicating with the game device. The game system includes an operation data obtaining unit, an attitude calculation unit, a game process unit, a first game image generation unit, a second game image generation unit, a first display control unit, and a second display control unit. The operation data obtaining unit obtains operation data representing an operation on the controller device. The attitude calculation section calculates an attitude of the controller device based on the operation data. The game process unit performs a game process based on the operation data. The first game image generation unit generates a first game image representing a virtual game space based on the game process. The second game image generation unit generates a second game image based on the game process. The first display control unit displays the first game image on a predetermined display device separate from the controller device. The second display control unit displays the second game image on a display unit of the controller device.

Herein, the second game image generation unit generates the second game image which represents the game space at least when the attitude of the controller device is in a predetermined first state. When the attitude of the controller device is in the first state, the game process unit performs a predetermined game process in response to an operation on the game space represented by the second game image. The predetermined game process is a process which cannot be performed when the attitude of the controller device is in a predetermined second state different from the first state.

The "second game image generation unit" may generate an image representing the game space or generate other images or generate no image in other states as long as it generates an image representing the game space at least in the first state.

The "operation on the game space represented by the second game image" is a concept including an operation on a position or an object in the game space represented by the second game image such that the operation triggers some action on the target object, and an operation of selecting a position or an object in the game space. This operation may be, for example, an operation of shooting at an object included in the second game image.

With the configuration (13) above, game images to be displayed on two display devices (the display unit of the controller device and a predetermined display device) are generated based on operations on the controller device. That is, since the player can perform operations on different game images with a single controller device, it is possible to easily perform game operations on different game images displayed on two display devices without switching between controller devices as in the conventional game system described above.

Moreover, with the configuration (13) above, a game image representing the game space is displayed on the predetermined display device, and when the controller device is in the first state, a game image representing the game space is displayed also on the controller device. When the controller device is in the first state, the game operation for performing the predetermined game process can be performed. Therefore, the player can use an operation method in which the player plays the game while looking primarily at the predetermined display device with the controller device held in the second state, and another operation method in which the player plays the game while looking primarily at the controller device with the controller device held in the first state, and the player can easily switch between these two different operation methods by changing the attitude of the controller device. That is, with the configuration (13) above, the player can perform a novel game operation of playing the game using two different operation methods while dynamically switching between screens of two display devices as the screen to look at during the game, and it is thus possible to provide a game with higher playability.

The present specification also discloses an example game device included in the game systems of (1) to (13) above. The present specification also discloses a non-transitory computer-readable storage medium storing a game program which causes a computer of the game device to function as means equivalent to various units in the game device. Moreover, the specification discloses a game process method to be carried out in the game systems of (1) to (13) above.

With the game system, the game device, the non-transitory storage medium storing a game program, and the game process method described above, the player can perform operations on game images displayed on two display devices with a single controller device, and the player can therefore more easily perform game operations using two display devices and make effective use of two display devices.

These and other objects, features, aspects and advantages will become more apparent from the following detailed description when taken in conjunction with the accompanying drawings.

DETAILED DESCRIPTION OF NON-LIMITING EXAMPLE EMBODIMENTS

[1. General Configuration of Game System]

Figure 1:
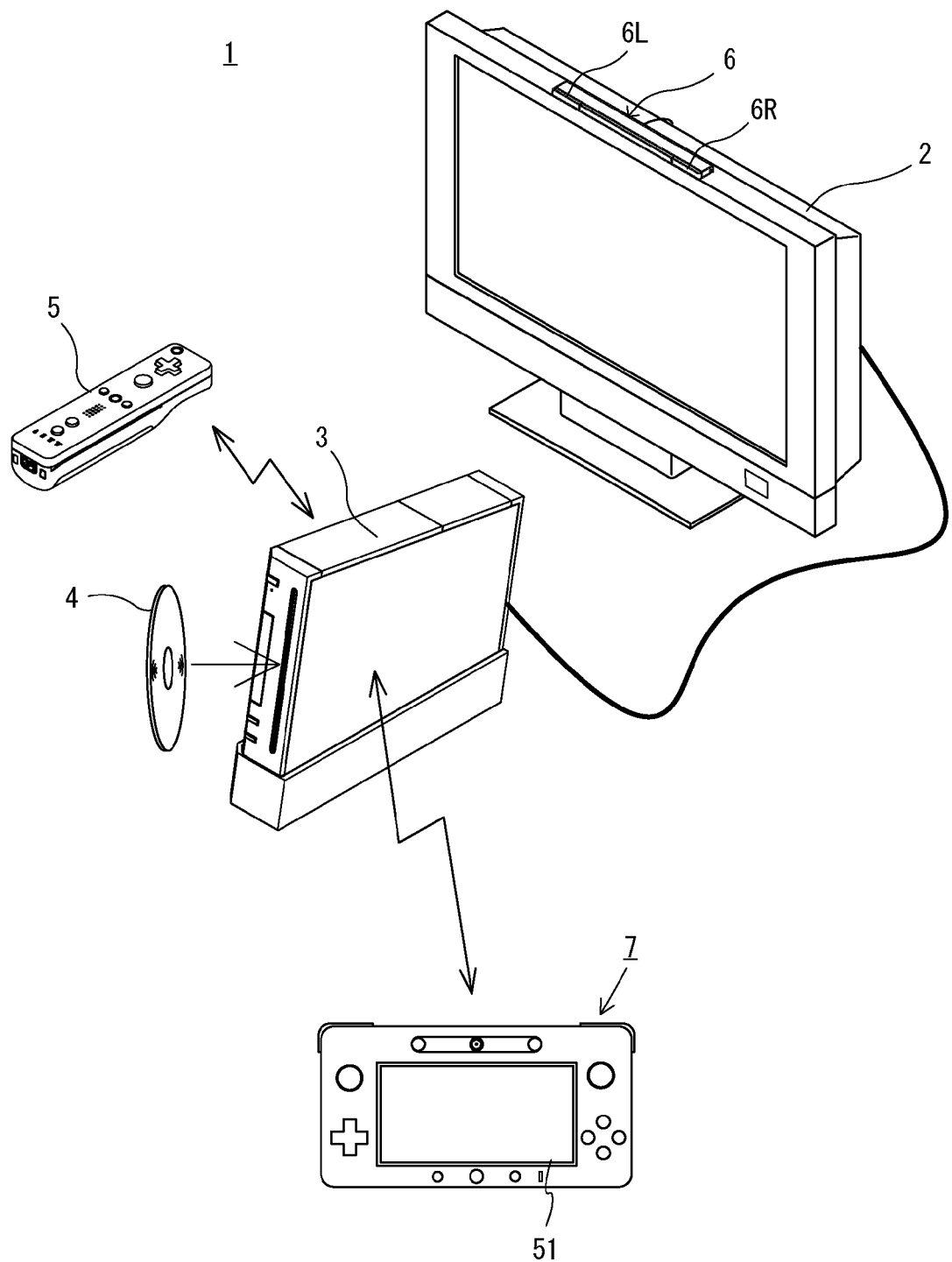
FIG. 1 is an external view of an example non-limiting game system 1.

A game system 1 according to an example of the present embodiment will now be described with reference to the drawings. FIG. 1 is an external view of the game system 1. In FIG. 1, a game system 1 includes a non-portable display device (hereinafter referred to as a "television") 2 such as a television receiver, a home-console type game device 3, an optical disc 4, a controller 5, a marker device 6, and a terminal device 7. In the game system 1, a game device 3 performs game processes based on game operations performed using the controller 5 and/or the terminal device 7, and game images obtained through the game processes are displayed on a television 2 and/or the terminal device 7.

In the game device 3, the optical disc 4 typifying a non-transitory information storage medium used for a game device 3 in a replaceable manner is removably inserted. An information processing program (a game program, for example) to be executed by the game device 3 is stored in the optical disc 4. The game device 3 has, on the front surface thereof, an insertion opening for the optical disc 4. The game device 3 reads and executes the information processing program stored on the optical disc 4 which is inserted into the insertion opening, to perform the game process.

The television 2 is connected to the game device 3 by a connecting cord. Game images obtained as a result of the game processes performed by the game device 3 are displayed on the television 2. The television 2 includes a speaker 2a (see FIG. 2), and a speaker 2a outputs game sounds obtained as a result of the game process. In alternative embodiments, the game device 3 and the non-portable display device may be an integral unit. Also, the communication between the game device 3 and the television 2 may be wireless communication.

The marker device 6 is provided along the periphery of the screen (on the upper side of the screen in FIG. 1) of the television 2. The user (player) can perform game operations by moving the controller 5, the details of which will be described later, and a marker device 6 is used by the game device 3 for calculating the position, the roll angle, etc., of the controller 5. The marker device 6 includes two markers 6R and 6L on opposite ends thereof. Specifically, a marker 6R (as well as the marker 6L) includes one or more infrared LEDs (Light Emitting Diodes), and emits an infrared light in a forward direction of the television 2. The marker device 6 is connected to the game device 3, and the game device 3 is able to control the lighting of each infrared LED of the marker device 6. The marker device 6 is portable, and the user can arrange the marker device 6 at any position. While FIG. 1 shows an embodiment in which the marker device 6 is arranged on top of the television 2, the position and the direction of arranging the marker device 6 are not limited to this particular arrangement.

The controller 5 provides the game device 3 with operation data representing the content of operations performed on the controller itself. The controller 5 and the game device 3 can communicate with each other by wireless communication. In the present embodiment, the wireless communication between a controller 5 and the game device 3 uses, for example, Bluetooth (Registered Trademark) technology. In other embodiments, a controller 5 and the game device 3 may be connected by a wired connection. While only one controller 5 is included in the game system 1 in the present embodiment, the game device 3 can communicate with a plurality of controllers, and a game can be played by multiple players by using a predetermined number of controllers at the same time. The detailed configuration of the controller 5 will be described below.

The terminal device 7 is sized so that it can be held by the user, and the user can hold and move the terminal device 7, or can use a terminal device 7 placed at an arbitrary position. The terminal device 7, whose detailed configuration will be described below, includes an LCD (Liquid Crystal Display) 51 as a display, input mechanisms (e.g., a touch panel 52, a gyrosensor 64, etc., to be described later). The terminal device 7 and the game device 3 can communicate with each other by a wireless connection (or by a wired connection). The terminal device 7 receives from the game device 3 data of images (e.g., game images) generated by the game device 3, and displays the images on the LCD 51. While an LCD is used as the display device in the embodiment, a terminal device 7 may include any other display device such as a display device utilizing EL (Electro Luminescence), for example. The terminal device 7 transmits operation data representing the content of operations performed on the terminal device itself to the game device 3.

[2. Internal Configuration of Game Device 3]

Figure 2:
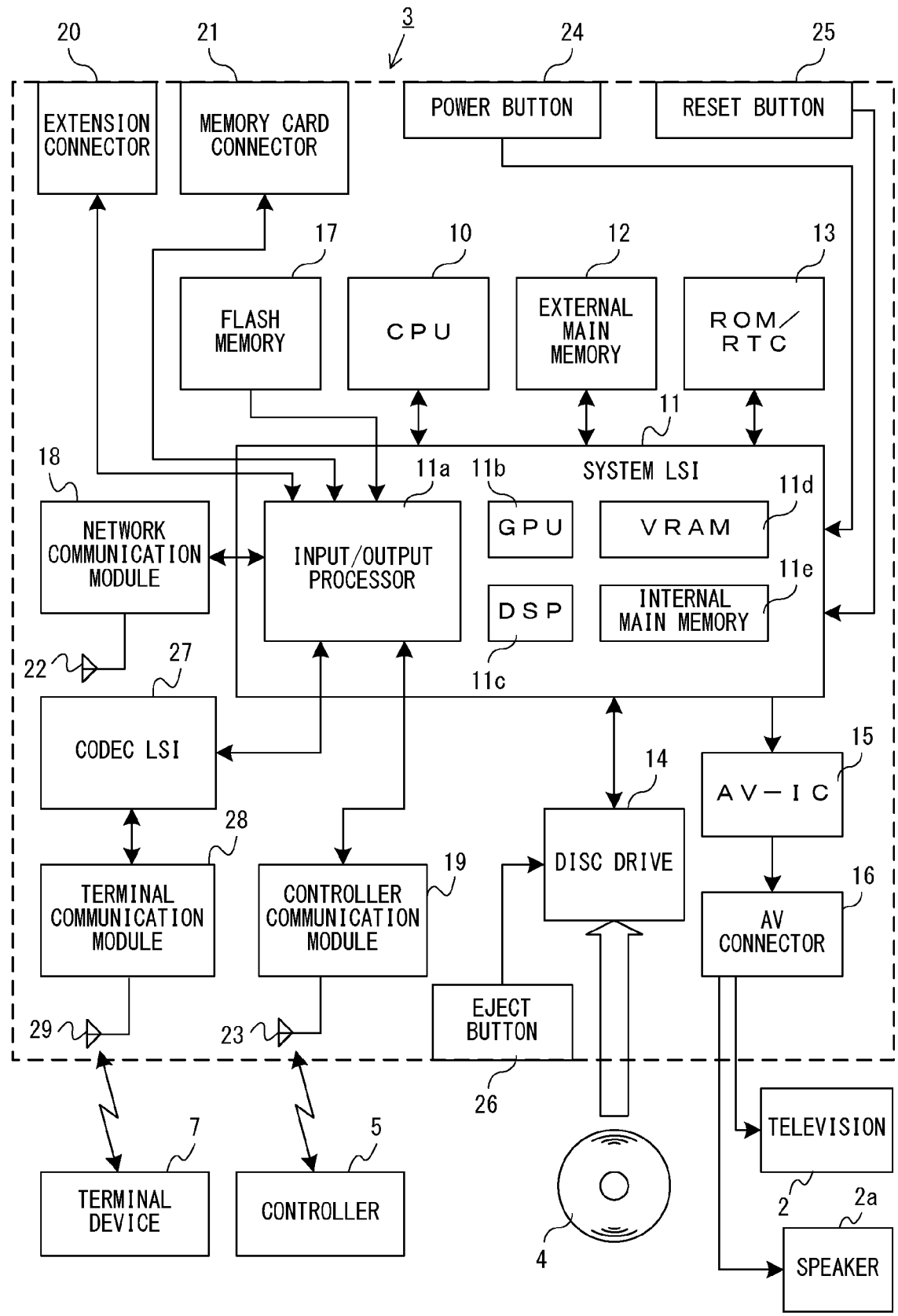
FIG. 2 is a block diagram showing an example internal configuration of an example non-limiting game device 3.

An internal configuration of the game device 3 will be described with reference to FIG. 2. FIG. 2 is a block diagram illustrating an internal configuration of the game device 3. The game device 3 includes a CPU (Central Processing Unit) 10, a system LSI 11, an external main memory 12, a ROM/RTC 13, a disc drive 14, and an AV-IC 15.

The CPU 10 performs game processes by executing a game program stored, for example, on the optical disc 4, and functions as a game processor. The CPU 10 is connected to the system LSI 11. The external main memory 12, the ROM/RTC 13, the disc drive 14, and the AV-IC 15, as well as the CPU 10, are connected to the system LSI 11. The system LSI 11 performs processes for controlling data transmission between the respective components connected thereto, generating images to be displayed, acquiring data from an external device(s), and the like. The internal configuration of the system LSI 11 will be described below. The external main memory 12 is of a volatile type and stores a program such as a game program read from the optical disc 4, a game program read from a flash memory 17, and various data. The external main memory 12 is used as a work area and a buffer area for the CPU 10. The ROM/RTC 13 includes a ROM (a so-called boot ROM) incorporating a boot program for the game device 3, and a clock circuit (RTC: Real Time Clock) for counting time. The disc drive 14 reads program data, texture data, and the like from the optical disc 4, and writes the read data into an internal main memory 11e (to be described below) or the external main memory 12.

The system LSI 11 includes an input/output processor (I/O processor) 11a, a GPU (Graphics Processor Unit) 11b, a DSP (Digital Signal Processor) 11c, a VRAM (Video RAM) 11d, and the internal main memory 11e. Although not shown in the figures, these components 11a to 11e are connected with each other through an internal bus.

The GPU 11b, acting as a part of a rendering mechanism, generates images in accordance with graphics commands (rendering commands) from the CPU 10. The VRAM 11d stores data (data such as polygon data and texture data) used for the GPU 11b to execute the graphics commands. When images are generated, the GPU 11b generates image data using data stored in the VRAM 11d. In the present embodiment, the game device 3 generates both game images displayed on the television 2 and game images displayed on the terminal device 7. Hereinafter, the game images displayed on the television 2 may be referred to as the "television game images", and the game images displayed on the terminal device 7 may be referred to as the "terminal game images".

The DSP 11c, functioning as an audio processor, generates sound data using sound data and sound waveform (e.g., tone quality) data stored in one or both of the internal main memory 11e and the external main memory 12. In the present embodiment, as with the game images, game sounds to be outputted from the speaker of the television 2 and game sounds to be outputted from the speaker of the terminal device 7 are both generated. Hereinafter, the game sounds outputted from the television 2 may be referred to as "television game sounds", and the game sounds outputted from the terminal device 7 may be referred to as "terminal game sounds".

As described above, of the images and sounds generated in the game device 3, data of the images and sounds outputted from the television 2 is read out by the AV-IC 15. The AV-IC 15 outputs the read-out image data to the television 2 via an AV connector 16, and outputs the read-out sound data to the speaker 2a provided in the television 2. Thus, images are displayed on the television 2, and sounds are outputted from the speaker 2a.

Of the images and sounds generated in the game device 3, data of the images and sounds outputted from the terminal device 7 are transmitted to the terminal device 7 by an input/output processor 11a, etc. The data transmission to the terminal device 7 by the input/output processor 11a, or the like, will be described below.

The input/output processor 11a exchanges data with components connected thereto, and downloads data from an external device(s). The input/output processor 11a is connected to the flash memory 17, a network communication module 18, a controller communication module 19, an extension connector 20, a memory card connector 21, and a codec LSI 27. An antenna 22 is connected to the network communication module 18. An antenna 23 is connected to the controller communication module 19. The codec LSI 27 is connected to a terminal communication module 28, and an antenna 29 is connected to the terminal communication module 28.

The game device 3 can be connected to a network such as the Internet to communicate with external information processing devices (e.g., other game devices, various servers, computers, etc.). That is, the input/output processor 11a is connected to a network such as the Internet via the network communication module 18 and the antenna 22 and can communicate with external information processing device(s) connected to the network. The input/output processor 11a regularly accesses the flash memory 17, and detects the presence or absence of any data which is to be transmitted to the network, and when detected, transmits the data to the network via the network communication module 18 and the antenna 22. Further, the input/output processor 11a receives data transmitted from an external information processing device and data downloaded from a download server via the network, the antenna 22 and the network communication module 18, and stores the received data in the flash memory 17. The CPU 10 executes a game program so as to read data stored in the flash memory 17 and use the data, as appropriate, in the game program. The flash memory 17 may store game save data (e.g., game result data or unfinished game data) of a game played using the game device 3 in addition to data exchanged between the game device 3 and an external information processing device. The flash memory 17 may also store a game program(s).

The game device 3 can receive operation data from the controller 5. That is, the input/output processor 11a receives operation data transmitted from the controller 5 via the antenna 23 and the controller communication module 19, and stores (temporarily) it in a buffer area of the internal main memory 11e or the external main memory 12.

The game device 3 can exchange data such as images and sounds with the terminal device 7. When transmitting game images (terminal game images) to the terminal device 7, the input/output processor 11a outputs data of game images generated by the GPU 11b to the codec LSI 27. The codec LSI 27 performs a predetermined compression process on the image data from the input/output processor 11a. The terminal communication module 28 wirelessly communicates with the terminal device 7. Therefore, image data compressed by the codec LSI 27 is transmitted by the terminal communication module 28 to the terminal device 7 via the antenna 29. In the present embodiment, the image data transmitted from the game device 3 to the terminal device 7 is image data used in a game, and the playability of a game can be adversely influenced if there is a delay in the images displayed in the game. Therefore, delay may be eliminated as much as possible for the transmission of image data from the game device 3 to the terminal device 7. Therefore, in the present embodiment, the codec LSI 27 compresses image data using a compression technique with high efficiency such as the H.264 standard, for example. Other compression techniques may be used, and image data may be transmitted uncompressed if the communication speed is sufficient. The terminal communication module 28 is, for example, a Wi-Fi certified communication module, and may perform wireless communication at high speed with the terminal device 7 using a MIMO (Multiple Input Multiple Output) technique employed in the IEEE 802.11n standard, for example, or may use other communication schemes.

The game device 3 transmits sound data to the terminal device 7, in addition to image data. That is, the input/output processor 11a outputs sound data generated by the DSP 11c to the terminal communication module 28 via the codec LSI 27. The codec LSI 27 performs a compression process on sound data, as with image data. While the compression scheme for sound data may be any scheme, it may be a scheme with a high compression ratio and little sound deterioration. In other embodiments, the sound data may be transmitted uncompressed. The terminal communication module 28 transmits the compressed image data and sound data to the terminal device 7 via the antenna 29.

Moreover, the game device 3 transmits various control data to the terminal device 7 as necessary, in addition to the image data and the sound data. Control data is data representing control instructions for components of the terminal device 7, and represents, for example, an instruction for controlling the lighting of a marker unit (a marker unit 55 shown in FIG. 10), an instruction for controlling the image-capturing operation of a camera (a camera 56 shown in FIG. 10), etc. The input/output processor 11a transmits control data to the terminal device 7 in response to an instruction of the CPU 10. While the codec LSI 27 does not perform a data compression process in the present embodiment for the control data, it may perform a compression process in other embodiments. The above-described data transmitted from the game device 3 to the terminal device 7 may be encrypted as necessary or may not be encrypted.

The game device 3 can receive various data from the terminal device 7. In the present embodiment, the terminal device 7 transmits operation data, image data and sound data, the details of which will be described below. Data transmitted from the terminal device 7 are received by the terminal communication module 28 via the antenna 29. The image data and the sound data from the terminal device 7 are subjected to a compression process similar to that on the image data and the sound data from the game device 3 to the terminal device 7. Therefore, these image data and sound data are sent from the terminal communication module 28 to the codec LSI 27, and subjected to an expansion process by the codec LSI 27 to be outputted to the input/output processor 11a. On the other hand, the operation data from the terminal device 7 may not be subjected to a compression process since the amount of data is small as compared with images and sounds. It may be encrypted as necessary, or it may not be encrypted. After being received by the terminal communication module 28, the operation data is outputted to the input/output processor 11a via the codec LSI 27. The input/output processor 11a stores (temporarily) data received from the terminal device 7 in a buffer area of the internal main memory 11e or the external main memory 12.

The game device 3 can be connected to another device or an external storage medium. That is, the input/output processor 11a is connected to the extension connector 20 and the memory card connector 21. The extension connector 20 is a connector for an interface, such as a USB or SCSI interface. The extension connector 20 can receive a medium such as an external storage medium, a peripheral device such as another controller, or a wired communication connector which enables communication with a network in place of the network communication module 18. The memory card connector 21 is a connector for connecting thereto an external storage medium such as a memory card (which may be of a proprietary or standard format, such as SD, miniSD, microSD, Compact Flash, etc.). For example, the input/output processor 11a can access an external storage medium via the extension connector 20 or the memory card connector 21 to store data in the external storage medium or read data from the external storage medium.

The game device 3 includes a power button 24, a reset button 25, and an eject button 26. The power button 24 and the reset button 25 are connected to the system LSI 11. When the power button 24 is on, power is supplied to the components of the game device 3 from an external power supply through an AC adaptor (not shown). When the reset button 25 is pressed, the system LSI 11 reboots a boot program of the game device 3. The eject button 26 is connected to the disc drive 14. When the eject button 26 is pressed, the optical disc 4 is ejected from the disc drive 14.

In other embodiments, some of the components of the game device 3 may be provided as extension devices separate from the game device 3. In this case, an extension device may be connected to the game device 3 via the extension connector 20, for example. Specifically, an extension device may include components of the codec LSI 27, the terminal communication module 28 and the antenna 29, for example, and can be attached/detached to/from the extension connector 20. Thus, by connecting the extension device to a game device which does not include the above components, the game device can communicate with the terminal device 7.

[3. Configuration of Controller 5]

Figure 3:
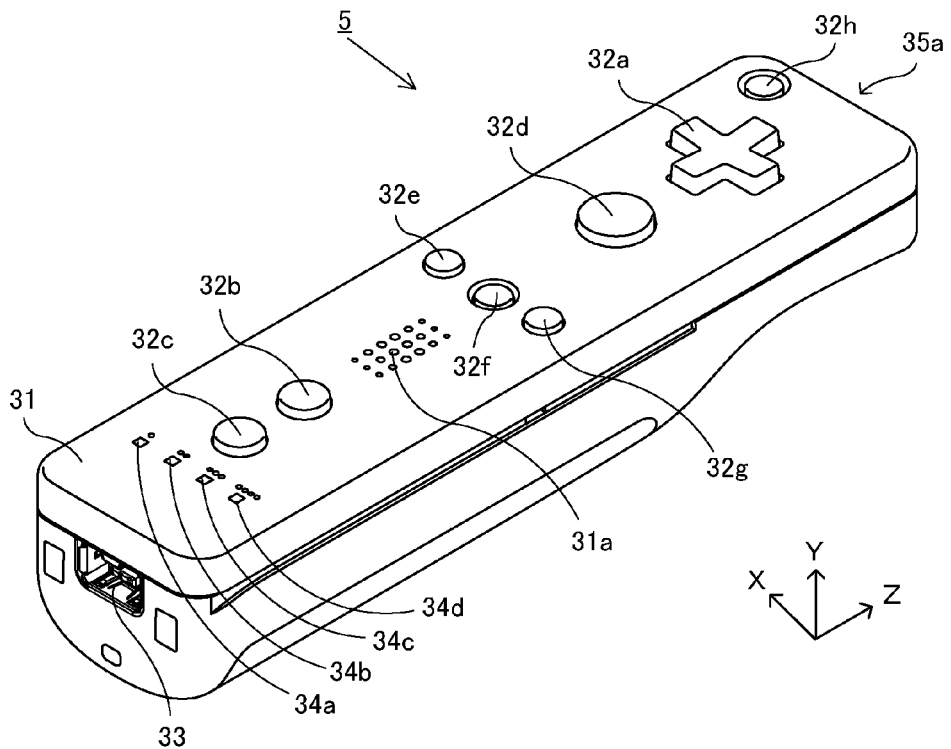
FIG. 3 is a perspective view showing an example external configuration of an example non-limiting controller 5.
Figure 4:
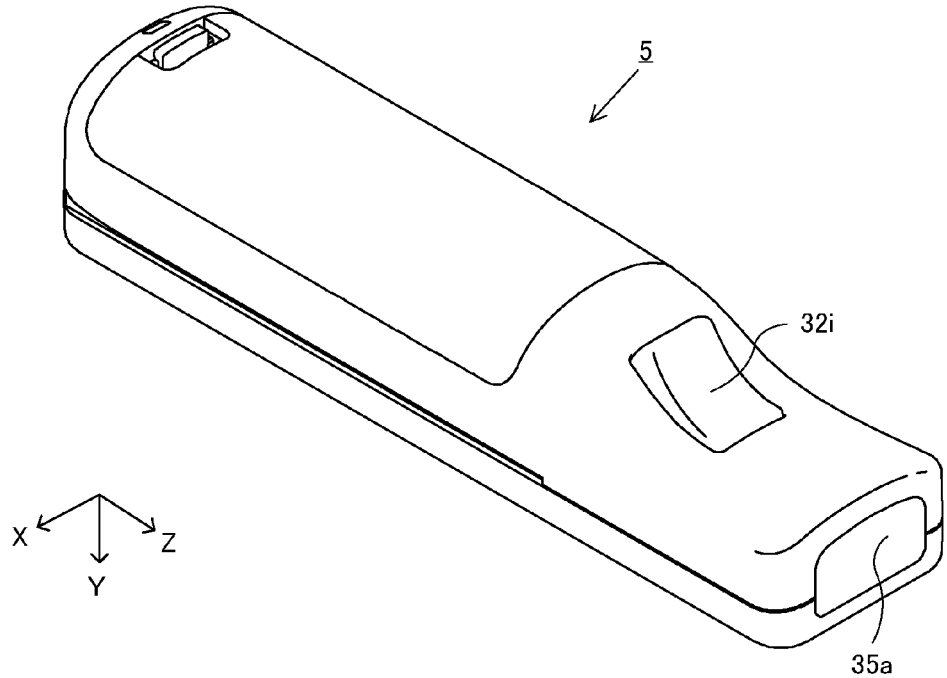
FIG. 4 is a perspective view showing an example external configuration of the controller 5.

Next, with reference to FIGS. 3 to 7, the controller 5 will be described. FIG. 3 is one perspective view illustrating an external configuration of the controller 5. FIG. 4 is another perspective view illustrating an external configuration of the controller 5. The perspective view of FIG. 3 shows the controller 5 as viewed from the top rear side thereof, and the perspective view of FIG. 4 shows the controller 5 as viewed from the bottom front side thereof.

As shown in FIGS. 3 and 4, the controller 5 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or a child. A user can perform game operations by pressing buttons provided on the controller 5, and by moving the controller 5 itself to change the position and the orientation (tilt) thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In the present specification, the top surface of the housing 31 on which the buttons 32a to 32h are provided may be referred to as a "button surface". As shown in FIG. 4, a recessed portion is formed on the bottom surface of the housing 31, and a B button 32i is provided on a rear slope surface of the recessed portion. The operation buttons 32a to 32i are assigned, as necessary, their respective functions in accordance with the game program executed by the game device 3. Further, the power button 32h is used to remotely turn ON/OFF the game device 3. The home button 32f and the power button 32h each have the top surface thereof recessed below the top surface of the housing 31. Therefore, the likelihood of the home button 32f and the power button 32h being inadvertently pressed by the user is reduced.

On the rear surface of the housing 31, the connector 33 is provided. The connector 33 is used for connecting another device (e.g., another sensor unit or another controller) to the controller 5. Both sides of the connector 33 on the rear surface of the housing 31 have a engagement hole 33a (see FIG. 6) for preventing easy inadvertent disengagement of a device connected to the controller 5 as described above.

In the rear-side portion of the top surface of the housing 31, a plurality (four in FIG. 3) of LEDs 34a to 34d are provided. The controller 5 is assigned a controller type (number) so as to be distinguishable from other controllers. The LEDs 34a to 34d are each used for informing the user of the controller type which is currently set for the controller 5, and for informing the user of the battery level of the controller 5, for example. Specifically, when game operations are performed using the controller 5, one of the plurality of LEDs 34a to 34d corresponding to the controller type is lit up.

The controller 5 has an image capturing/processing unit 35 (FIG. 6), and a light incident surface 35a of an image capturing/processing unit 35 is provided on the front surface of the housing 31, as shown in FIG. 4. The light incident surface 35a is made of a material transmitting therethrough at least infrared light from the markers 6R and 6L.

On the top surface of the housing 31, sound holes 31a for externally outputting a sound from a speaker 49 (see FIG. 5) provided in the controller 5 are provided between the first button 32b and the home button 32f.

Figure 5:
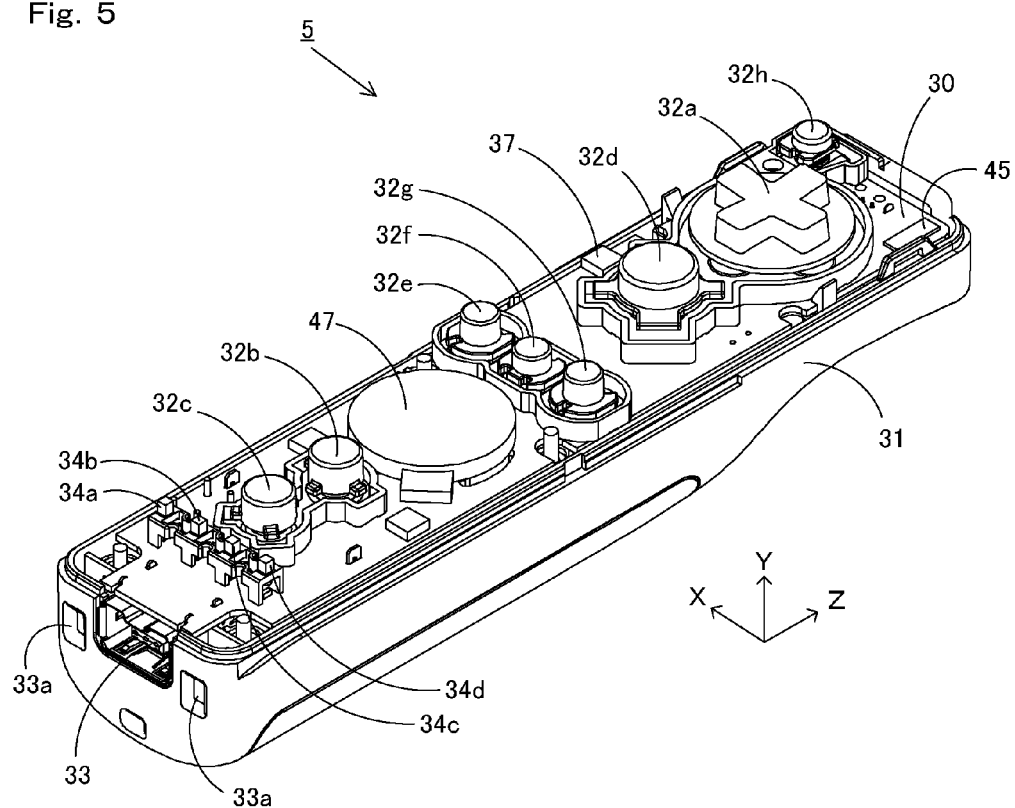
FIG. 5 is a diagram showing an example internal configuration of the controller 5.
Figure 6:
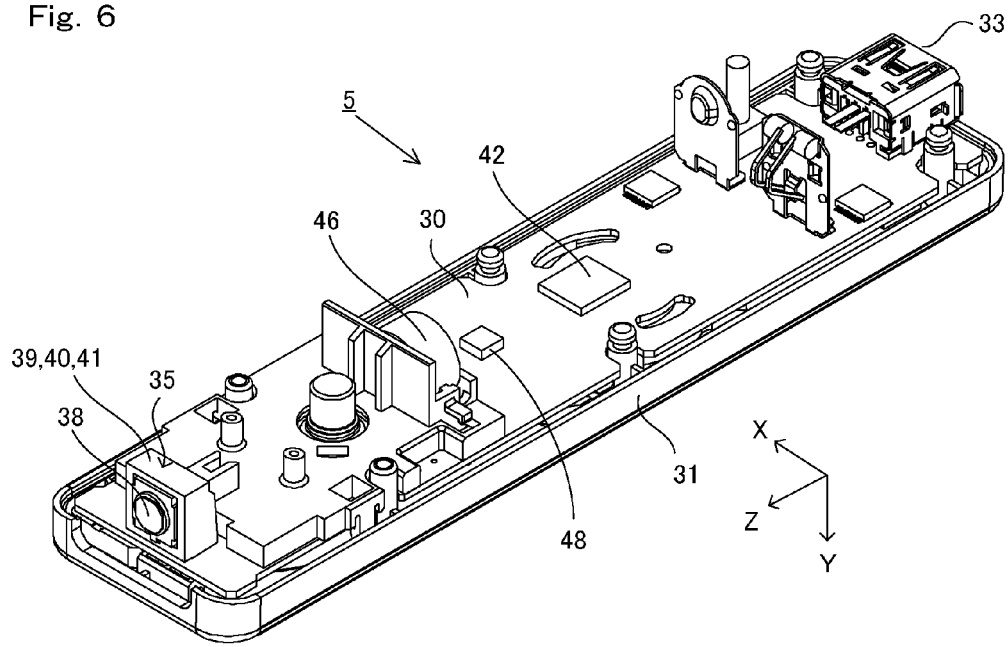
FIG. 6 is a diagram showing an example internal configuration of the controller 5.

Next, with reference to FIGS. 5 and 6, an internal structure of the controller 5 will be described. FIGS. 5 and 6 are diagrams illustrating the internal structure of the controller 5. FIG. 5 is a perspective view illustrating a state in which an upper casing (a part of the housing 31) of the controller 5 is removed. FIG. 6 is a perspective view illustrating a state in which a lower casing (a part of the housing 31) of the controller 5 is removed. The perspective view of FIG. 6 shows a substrate 30 of FIG. 5 as viewed from the reverse side.

As shown in FIG. 5, the substrate 30 is fixed inside the housing 31, and on a top main surface of the substrate 30, the operation buttons 32a to 32h, the LEDs 34a to 34d, an acceleration sensor 37, an antenna 45, the speaker 49, and the like are provided. These elements are connected to a microcomputer 42 (see FIG. 6) via lines (not shown) formed on the substrate 30 and the like. In the present embodiment, the acceleration sensor 37 is provided at a position offset from the center of the controller 5 with respect to the X-axis direction. Thus, calculation of the movement of the controller 5 being rotated about the Z-axis is facilitated. Further, the acceleration sensor 37 is provided anterior to the center of the controller 5 with respect to the longitudinal direction (Z-axis direction). Further, a wireless module 44 (see FIG. 6) and the antenna 45 allow the controller 5 to act as a wireless controller.

As shown in FIG. 6, at a front edge of a bottom main surface of the substrate 30, the image capturing/processing unit 35 is provided. The image capturing/processing unit 35 includes an infrared filter 38, a lens 39, an image capturing element 40 and an image processing circuit 41 located in this order from the front of the controller 5. These components 38 to 41 are attached on the bottom main surface of the substrate 30.

On the bottom main surface of the substrate 30, the microcomputer 42 and a vibrator 46 are provided. The vibrator 46 is, for example, a vibration motor or a solenoid, and is connected to the microcomputer 42 via lines formed on the substrate 30 or the like. The controller 5 is vibrated by actuation of the vibrator 46 based on a command from the microcomputer 42. Therefore, the vibration is conveyed to the user's hand holding the controller 5, and thus a so-called vibration-feedback game is realized. In the present embodiment, the vibrator 46 is disposed slightly toward the front of the housing 31. That is, the vibrator 46 is positioned offset from the center toward the end of the controller 5 so that the vibration of the vibrator 46 greatly vibrates the entire controller 5. Further, the connector 33 is provided at the rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speaker 49, and the like.

The shape of the controller 5, the shape of each operation button, the number and the positions of acceleration sensors and vibrators, and so on, shown in FIGS. 3 to 6 are merely illustrative, and the systems, methods, and techniques described herein may be implemented with controllers having other shapes, numbers, and positions. Further, although in the present embodiment the image-capturing direction of the image-capturing unit is the Z-axis positive direction, the image-capturing direction may be any direction. That is, the position of the image capturing/processing unit 35 (the light incident surface 35a of the image capturing/processing unit 35) in the controller 5 may not be on the front surface of the housing 31, but may be on any other surface on which light can be received from the outside of the housing 31.

Figure 7:
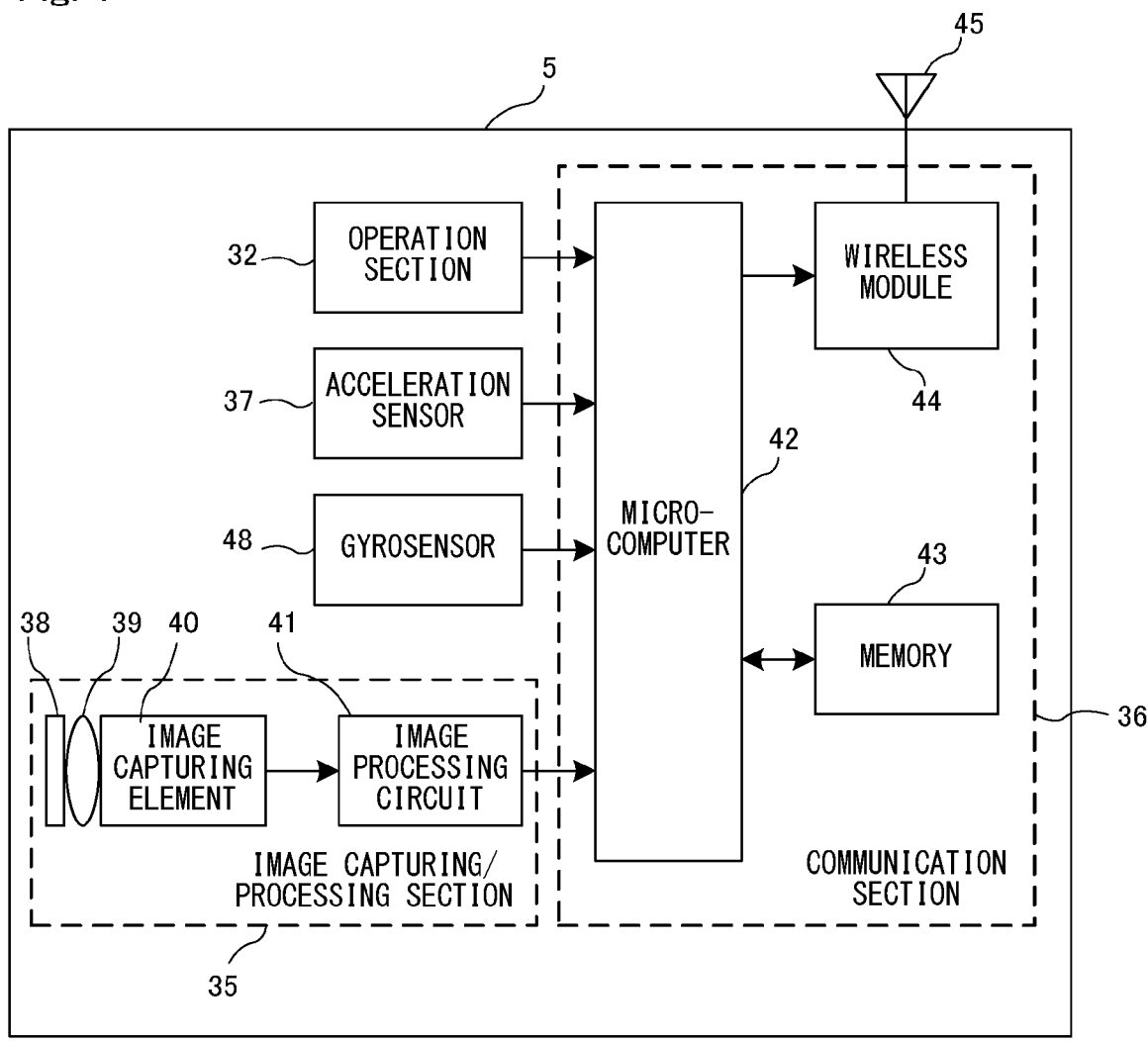
FIG. 7 is a block diagram showing an example configuration of the controller 5.

FIG. 7 is a block diagram illustrating a configuration of the controller 5. The controller 5 includes an operation unit 32 (the operation buttons 32a to 32i), the image capturing/processing unit 35, a communication unit 36, the acceleration sensor 37, and a gyrosensor 48. The controller 5 transmits to the game device 3, as operation data, data representing the content of operations performed on the controller itself. Hereinafter, the operation data transmitted by the controller 5 may be referred to as the "controller operation data", and the operation data transmitted by the terminal device 7 may be referred to as the "terminal operation data".

The operation unit 32 includes the operation buttons 32a to 32i described above, and outputs, to the microcomputer 42 of the communication unit 36, operation button data indicating the input status of the operation buttons 32a to 32i (e.g., whether or not the operation buttons 32a to 32i are pressed).

The image capturing/processing unit 35 is a system for analyzing image data captured by the image-capturing element and calculating the centroid, the size, etc., of an area(s) having a high brightness in the image data. The image capturing/processing unit 35 has a maximum sampling period of, for example, about 200 frames/sec., and therefore can trace and analyze even relatively fast motion of the controller 5.

The image capturing/processing unit 35 includes the infrared filter 38, the lens 39, an image capturing element 40 and the image processing circuit 41. The infrared filter 38 transmits therethrough only infrared light included in the light incident on the front surface of the controller 5. The lens 39 collects the infrared light transmitted through the infrared filter 38 so that it is incident on the image capturing element 40. The image capturing element 40 is a solid-state image-capturing device such as, for example, a CMOS sensor or a CCD sensor, which receives the infrared light collected by the lens 39, and outputs an image signal. The marker unit 55 of the terminal device 7 and the marker device 6 of which images are captured are formed by markers outputting infrared light. Therefore, the provision of the infrared filter 38 enables the image capturing element 40 to receive only the infrared light transmitted through the infrared filter 38 and generate image data, so that an image of the image-capturing object (e.g., the markers of a marker unit 55 and/or the marker device 6) can be captured more accurately. Hereinafter, the image taken by the image capturing element 40 is referred to as a captured image. The image data generated by the image capturing element 40 is processed by the image processing circuit 41. The image processing circuit 41 calculates the positions of the image-capturing objects within the captured image. The image processing circuit 41 outputs coordinates of the calculated positions, to the microcomputer 42 of the communication unit 36. The data representing the coordinates is transmitted as operation data to the game device 3 by the microcomputer 42. Hereinafter, the coordinates are referred to as "marker coordinates". The marker coordinates change depending on the roll orientation (roll angle about the z axis) and/or the position of the controller 5 itself, and therefore the game device 3 can calculate, for example, the roll angle and the position of the controller 5 using the marker coordinates.

In other embodiments, the controller 5 may not include the image processing circuit 41, and the captured image itself may be transmitted from the controller 5 to the game device 3. In this case, the game device 3 may have a circuit or a program, having the same function as the image processing circuit 41, for calculating the marker coordinates.

The acceleration sensor 37 detects accelerations (including gravitational acceleration) of the controller 5, that is, force (including gravity) applied to the controller 5. The acceleration sensor 37 detects a value of a portion of acceleration (linear acceleration) that is applied to the detection unit of the acceleration sensor 37 in the straight line direction along the sensing axis direction, among all the acceleration applied to the detection unit of the acceleration sensor 37. For example, a multi-axis acceleration sensor having two or more axes detects acceleration components along the axes, as the acceleration applied to the detection unit of the acceleration sensor. While the acceleration sensor 37 is assumed to be an electrostatic capacitance type MEMS (Micro Electro Mechanical System) acceleration sensor, other types of acceleration sensors may be used.

In the present embodiment, the acceleration sensor 37 detects linear acceleration in each of three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects acceleration in the straight line direction along each axis, and an output from the acceleration sensor 37 represents a value of the linear acceleration for each of the three axes. In other words, the detected acceleration is represented as a three-dimensional vector in an XYZ-coordinate system (controller coordinate system) defined relative to the controller 5.

Data (acceleration data) representing the acceleration detected by the acceleration sensor 37 is outputted to the communication unit 36. The acceleration detected by the acceleration sensor 37 changes depending on the orientation and the movement of the controller 5 itself, and therefore the game device 3 is capable of calculating the orientation and the movement of the controller 5 using the obtained acceleration data. In the present embodiment, the game device 3 calculates the attitude, the roll angle, etc., of the controller 5 based on the obtained acceleration data.

One skilled in the art will readily understand from the description herein that additional information relating to the controller 5 can be estimated or calculated (determined) through a process by a computer, such as a processor (for example, the CPU 10) of the game device 3 or a processor (for example, the microcomputer 42) of the controller 5, based on an acceleration signal outputted from the acceleration sensor 37 (this applies also to an acceleration sensor 63 to be described later). For example, in the case in which the computer performs a process on the premise that the controller 5 including the acceleration sensor 37 is in static state (that is, in the case in which the process is performed on the premise that the acceleration to be detected by the acceleration sensor includes only the gravitational acceleration), when the controller 5 is actually in static state, it is possible to determine whether or not, or how much the controller 5 is tilting relative to the direction of gravity, based on the detected acceleration. Specifically, when the state in which the detection axis of the acceleration sensor 37 faces vertically downward is used as a reference, whether or not the controller 5 is tilting relative to the reference can be determined based on whether or not 1G (gravitational acceleration) is present, and the degree of tilt of the controller 5 relative to the reference can be determined based on the magnitude thereof. Further, with the multi-axis acceleration sensor 37, it is possible to more specifically determine the degree of tilt of the controller 5 relative to the direction of gravity by performing a process on the acceleration signals of different axes. In this case, the processor may calculate, based on the output from the acceleration sensor 37, the tilt angle of the controller 5, or the tilt direction of the controller 5 without calculating the tilt angle. Thus, by using the acceleration sensor 37 in combination with the processor, it is possible to determine the tilt angle or the attitude of the controller 5.

On the other hand, when it is premised that the controller 5 is in dynamic state (in which the controller 5 is being moved), the acceleration sensor 37 detects the acceleration based on the movement of the controller 5, in addition to the gravitational acceleration, and it is therefore possible to determine the movement direction of the controller 5 by removing the gravitational acceleration component from the detected acceleration through a predetermined process. Even when it is premised that the controller 5 is in dynamic state, it is possible to determine the tilt of the controller 5 relative to the direction of gravity by removing the acceleration component based on the movement of the acceleration sensor from the detected acceleration through a predetermined process. In other embodiments, the acceleration sensor 37 may include an embedded processor or other type of dedicated processor for performing a predetermined process on an acceleration signal detected by the built-in acceleration detector before the acceleration signal is outputted to the microcomputer 42. For example, when the acceleration sensor 37 is used to detect static acceleration (for example, gravitational acceleration), the embedded or dedicated processor may convert the acceleration signal to a tilt angle(s) (or another suitable parameter).

The gyrosensor 48 detects angular velocities about three axes (the X, Y and Z axes in the embodiment). In the present specification, with respect to the image-capturing direction (the Z-axis positive direction) of the controller 5, the rotation direction about the X axis is referred to as the pitch direction, the rotation direction about the Y axis as the yaw direction, and the rotation direction about the Z axis as the roll direction. The number and combination of gyrosensors to be used are not limited to any particular number and combination as long as a gyrosensor 48 can detect angular velocities about three axes. For example, the gyrosensor 48 may be a 3-axis gyrosensor, or angular velocities about three axes may be detected by combining together a 2-axis gyrosensor and a 1-axis gyrosensor. Data representing the angular velocity detected by the gyrosensor 48 is outputted to the communication unit 36. The gyrosensor 48 may be a gyrosensor that detects an angular velocity or velocities about one axis or two axes.

The communication unit 36 includes the microcomputer 42, a memory 43, the wireless module 44 and the antenna 45. The microcomputer 42 controls the wireless module 44 for wirelessly transmitting, to the game device 3, data acquired by the microcomputer 42 while using the memory 43 as a storage area in the process.

Data outputted from the operation unit 32, the image capturing/processing unit 35, the acceleration sensor 37 and the gyrosensor 48 to the microcomputer 42 are temporarily stored in the memory 43. The data are transmitted as the operation data (controller operation data) to the game device 3. At the time of the transmission to a controller communication module 19 of the game device 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The controller communication module 19 of the game device 3 receives the low power radio wave signal. The game device 3 demodulates or decodes the received low power radio wave signal to obtain the operation data. Based on the obtained operation data, the CPU 10 of the game device 3 performs the game process. Note that while the wireless transmission from the communication unit 36 to the controller communication module 19 is sequentially performed with a predetermined cycle, since the game process is generally performed with a cycle of 1/60 sec (as one frame period), the transmission may be performed with a cycle less than or equal to this period. The communication unit 36 of the controller 5 outputs, to the controller communication module 19 of the game device 3, the operation data at a rate of once per 1/200 sec, for example.

As described above, as operation data representing operations performed on the controller itself, the controller 5 can transmit marker coordinate data, acceleration data, angular velocity data, and operation button data. The game device 3 performs the game processes using the operation data as game inputs. Therefore, by using the controller 5, the user can perform game operations of moving the controller 5 itself, in addition to the conventional typical game operation of pressing the operation buttons. For example, it enables an operation of tilting the controller 5 to an intended attitude, an operation of specifying an intended position on the screen with the controller 5, an operation of moving the controller 5 itself, etc.

While the controller 5 does not include the display for displaying the game image in the embodiment, it may include a display for displaying, for example, an image representing the battery level, etc.

[4. Configuration of Terminal Device 7]

Figure 8:
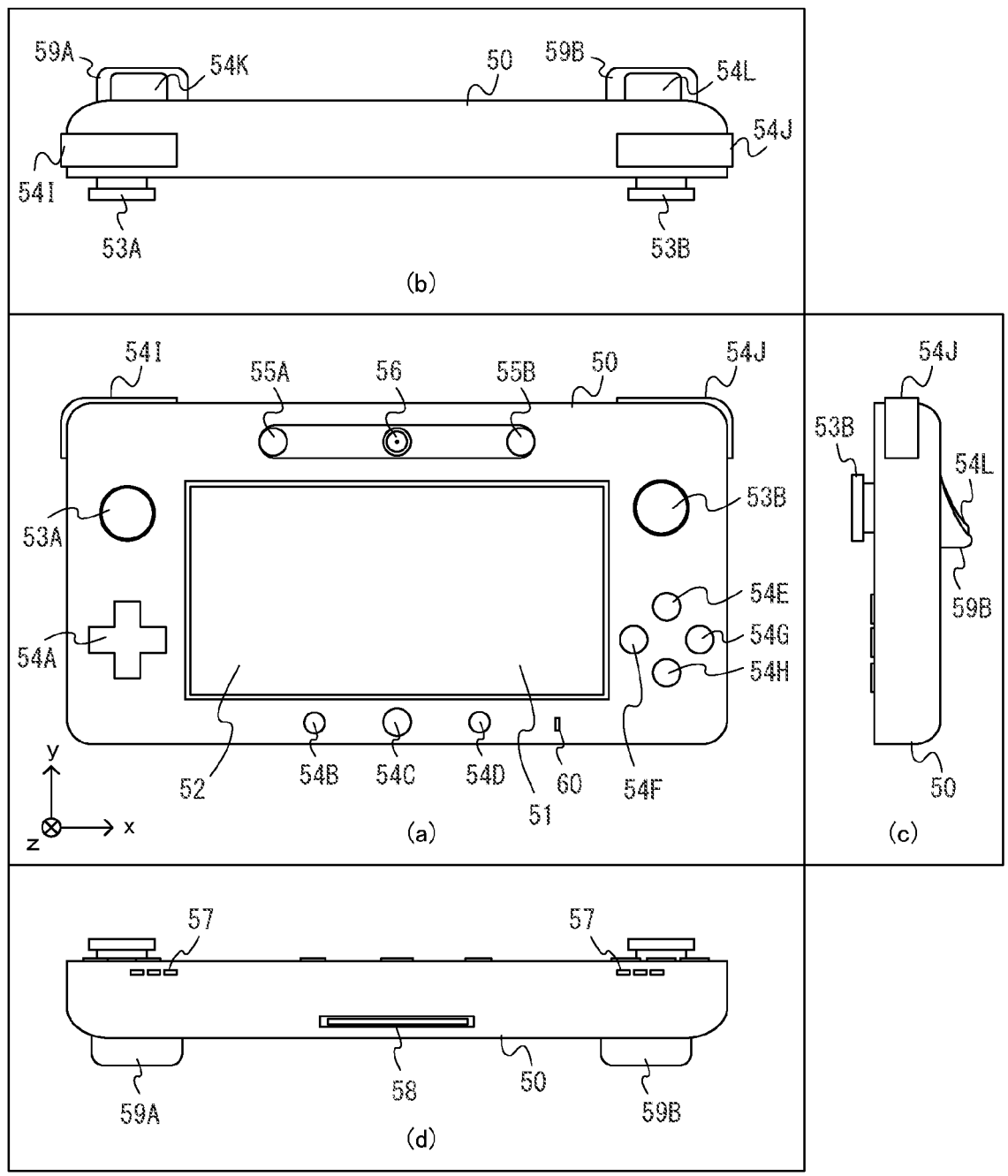
FIG. 8 is a diagram showing an example external configuration of an example non-limiting terminal device 7.
Figure 9:
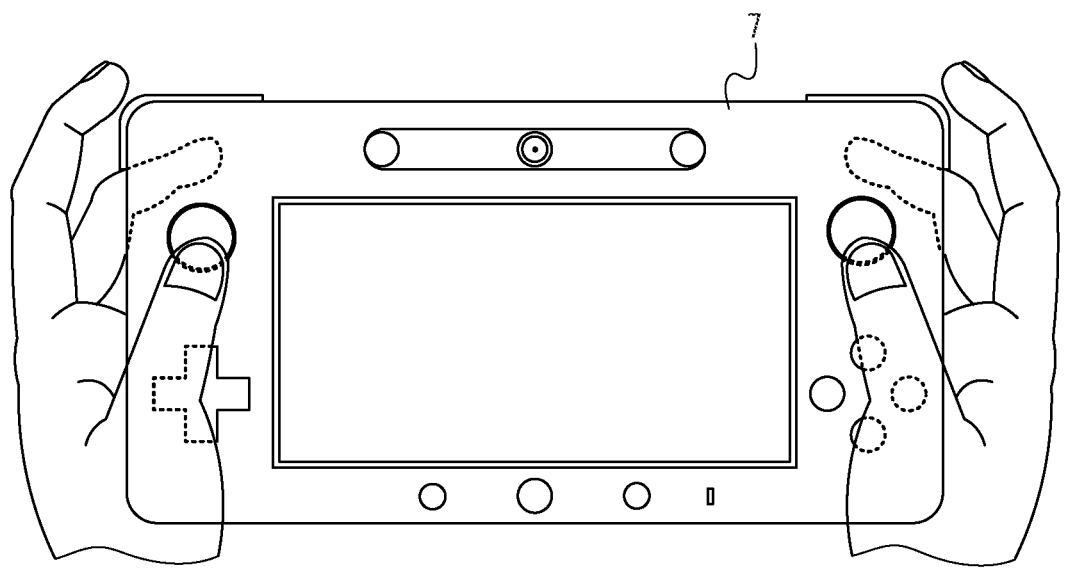
FIG. 9 is a diagram showing an example of a terminal device 7 being held by a user.
Figure 10:
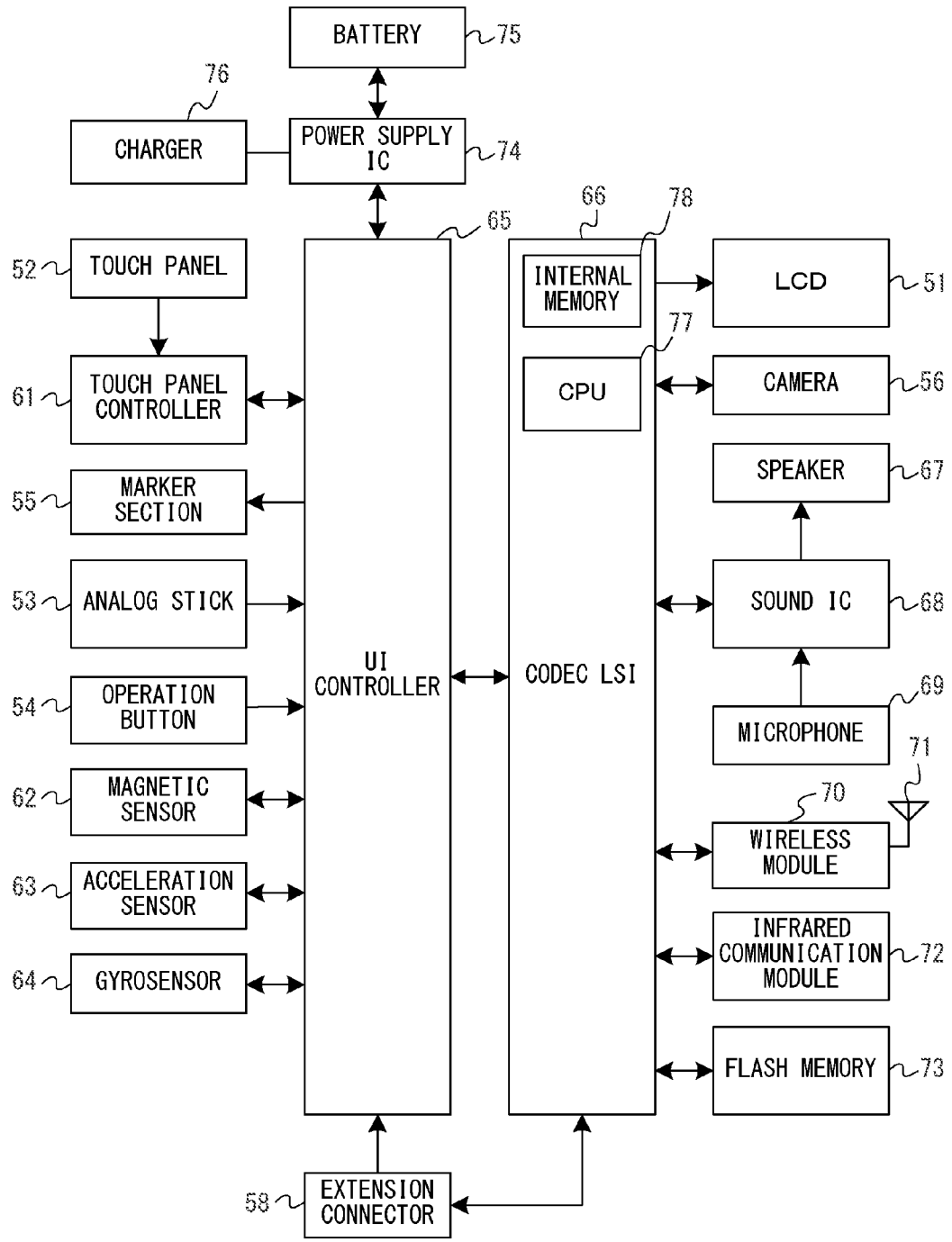
FIG. 10 is a block diagram showing an example internal configuration of the terminal device 7.

Next, a configuration of a terminal device 7 will be described with reference to FIGS. 8 to 10. FIG. 8 is a diagram showing an external configuration of the terminal device 7. FIG. 8(*a*) is a front view of the terminal device 7, FIG. 8(*b*) is a top view thereof, FIG. 8(*c*) is a right side view thereof, and FIG. 8(*d*) is a bottom view thereof. FIG. 9 is a diagram showing a user holding the terminal device 7.

As shown in FIG. 8, the terminal device 7 includes a housing 50 generally in a horizontally-elongated rectangular plate shape. The housing 50 is sized so that it can be held by the user. Thus, the user can hold and move the terminal device 7, and can change the position in which the terminal device 7 is placed.

The terminal device 7 includes an LCD 51 on the front surface of the housing 50. The LCD 51 is provided near the center of the surface of the housing 50. Therefore, the user can hold and move the terminal device while looking at the screen of the LCD 51 by holding opposing end portions of the housing 50 with respect to the LCD 51, as shown in FIG. 9. While FIG. 9 shows an example in which the user holds the terminal device 7 in a landscape position (in a horizontally-oriented direction) by holding left and right opposing end portions of the housing 50 with respect to the LCD 51, the user can hold the terminal device 7 in a portrait position (in a vertically-oriented direction).

As shown in FIG. 8(*a*), the terminal device 7 includes a touch panel 52 on the screen of the LCD 51 as an operation mechanism. In the present embodiment, the touch panel 52 is a resistive-type touch panel. However, the touch panel is not limited to the resistive type, and may be a touch panel of any type including, for example, a capacitive type, etc. The touch panel 52 may be of a single-touch type or a multi-touch type. In the present embodiment, a touch panel having the same resolution (detection precision) as the resolution of the LCD 51 is used as the touch panel 52. However the resolution of the touch panel 52 does not always need to coincide with the resolution of the LCD 51. While a touch pen is usually used for making inputs on the touch panel 52, an input may be made on the touch panel 52 with a finger of the user, instead of using the touch pen. The housing 50 may be provided with a hole for accommodating the touch pen used for performing operations on the touch panel 52. Thus, since the terminal device 7 includes the touch panel 52, the user can operate the touch panel 52 while moving the terminal device 7. That is, the user can move the screen of the LCD 51 while directly (by means of the touch panel 52) making an input on the screen.

As shown in FIG. 8, the terminal device 7 includes two analog sticks 53A and 53B and a plurality of buttons 54A to 54L, as operation mechanisms. The analog sticks 53A and 53B are each a direction-specifying device. The analog sticks 53A and 53B are each configured so that the stick portion operated with a finger of the user can be slid (or tilted) in any direction (at any angle in the up, down, left, right and diagonal directions) with respect to the surface of the housing 50. The left analog stick 53A is provided on the left side of the screen of the LCD 51, and a right analog stick 53B is provided on the right side of the screen of the LCD 51. Therefore, the user can make a direction-specifying input by using an analog stick with either the left or the right hand. As shown in FIG. 9, the analog sticks 53A and 53B are provided at such positions that the user can operate them while holding the left and right portions of the terminal device 7, and therefore the user can easily operate the analog sticks 53A and 53B even when holding and moving the terminal device 7.

The buttons 54A to 54L are operation mechanisms for making predetermined inputs. As will be discussed below, the buttons 54A to 54L are provided at such positions that the user can operate them while holding the left and right portions of the terminal device 7 (see FIG. 9). Therefore, the user can easily operate these operation mechanisms even when holding and moving the terminal device 7.

As shown in FIG. 8(a), the cross button (direction-input button) 54A and the buttons 54B to 54H, of the operation buttons 54A to 54L, are provided on the front surface of the housing 50. That is, these buttons 54A to 54G are provided at positions at which they can be operated by the thumbs of the user (see FIG. 9).

The cross button 54A is provided on the left side of the LCD 51 and under the left analog stick 53A. That is, the cross button 54A is provided at such a position that it can be operated with the left hand of the user. The cross button 54A has a cross shape, and is a button with which it is possible to specify up, down, left and right directions. The buttons 54B to 54D are provided on the lower side of the LCD 51. These three buttons 54B to 54D are provided at positions at which they can be operated with either the left or the right hand. The four buttons 54E to 54H are provided on the right side of the LCD 51 and under the right analog stick 53B. That is, the four buttons 54E to 54H are provided at positions at which they can be operated with the right hand of the user. Moreover, the four buttons 54E to 54H are provided on the upper, lower, left and right side (of the center position among the four buttons 54E to 54H). Therefore, with the terminal device 7, the four buttons 54E to 54H can also serve as buttons with which the user specifies the up, down, left and right directions.

As shown in FIGS. 8(a), 8(b) and 8(c), the first L button 54I and the first R button 54J are provided on diagonally upper portions (the left upper portion and the right upper portion) of the housing 50. Specifically, the first L button 54I is provided at the left end of the upper side surface of the plate-like housing 50 so that it is exposed on the upper left side surface. The first R button 54J is provided at the right end of the upper side surface of the housing 50, and is exposed on the upper right side surface. Thus, the first L button 54I is provided at such a position that it can be operated with the left index finger of the user, and the first R button 54J is provided at such a position that it can be operated with the right index finger of the user (see FIG. 9).

As shown in FIGS. 8(b) and 8(c), a second L button 54K and a second R button 54L are arranged on leg portions 59A and 59B which are provided so as to project from the back surface (i.e., the surface opposite to the front surface on which the LCD 51 is provided) of the plate-like housing 50. Specifically, the second L button 54K is provided slightly toward the upper side in the left portion (the left portion as viewed from the front surface side) of the back surface of the housing 50, and the second R button 54L is provided slightly toward the upper side in the right portion (the right portion as viewed from the front surface side) of the back surface of the housing 50. In other words, the second L button 54K is provided on the reverse side so as to generally correspond to a left analog stick 53A provided on the front surface, and the second R button 54L is provided on the reverse side so as to generally correspond to the right analog stick 53B provided on the front surface. Thus, the second L button 54K is provided at a position at which it can be operated with the left middle finger of the user, and the second R button 54L is provided at a position at which it can be operated with the right middle finger of the user (see FIG. 9). As shown in FIG. 8(c), the second L button 54K and the second R button 54L are provided on diagonally-upwardly-facing surfaces of the leg portions 59A and 59B and have diagonally-upwardly-facing button surfaces. It is believed that the middle fingers will move in the up/down direction when the user holds the terminal device 7, and it will be easier for the user to press the second L button 54K and the second R button 54L if the button surfaces are facing upward. With the provision of leg portions on the back surface of the housing 50, it is easier for the user to hold the housing 50, and with the provision of buttons on the leg portions, it is easier to operate the housing 50 while holding the housing 50.

With the terminal device 7 shown in FIG. 8, since the second L button 54K and the second R button 54L are provided on the back surface, if the terminal device 7 is put down with the screen of the LCD 51 (the front surface of the housing 50) facing up, the screen may not be completely horizontal. Therefore, in other embodiments, three or more leg portions may be formed on the back surface of the housing 50. Then, since it can be put down on the floor surface with the leg portions in contact with the floor surface in a state where the screen of the LCD 51 is facing up, the terminal device 7 can be put down so that the screen is horizontal. A removable leg portion may be added so that the terminal device 7 is put down horizontally.

The buttons 54A to 54L are each assigned a function in accordance with the game program. For example, the cross button 54A and the buttons 54E to 54H may be used for direction-specifying operations, selection operations, etc., whereas the buttons 54B to 54E may be used for OK button operations, cancel button operations, etc.

Although not shown, the terminal device 7 may include a button for turning ON/OFF the power of the terminal device 7. The terminal device 7 may also include a button for turning ON/OFF the screen display of the LCD 51, a button for performing a connection setting (pairing) with the game device 3, and a button for adjusting the sound volume of the speaker (the speaker 67 shown in FIG. 10).

As shown in FIG. 8(a), the terminal device 7 includes the marker unit (the marker unit 55 shown in FIG. 10) including a marker 55A and a marker 55B on the front surface of the housing 50. The marker unit 55 is provided on the upper side of the LCD 51. The marker 55A and the marker 55B are each formed by one or more infrared LEDs, as are the markers 6R and 6L of the marker device 6. The marker unit 55 is used for the game device 3 to calculate the movement, etc., of the controller 5, as is the marker device 6 described above. The game device 3 can control the lighting of the infrared LEDs of the marker unit 55.

The terminal device 7 includes a camera 56 as an image-capturing mechanism. The camera 56 includes an image-capturing element (e.g., a CCD image sensor, a CMOS image sensor, or the like) having a predetermined resolution, and a lens. As shown in FIG. 8, a camera 56 is provided on the front surface of the housing 50 in the present embodiment. Therefore, the camera 56 can capture an image of the face of the user holding the terminal device 7, and can capture an image of the user playing a game while looking at the LCD 51, for example.

The terminal device 7 includes a microphone (a microphone 79 shown in FIG. 10) as a sound input mechanism. A microphone hole 60 is provided on the front surface of the housing 50. The microphone 69 is provided inside the housing 50 behind the microphone hole 60. The microphone detects sounds around the terminal device 7 such as the voice of the user.

The terminal device 7 includes a speaker (the speaker 67 shown in FIG. 10) as a sound output mechanism. As shown in FIG. 8(d), speaker holes 57 are provided on the lower side surface of the housing 50. The output sounds from the speaker 67 are outputted from the speaker holes 57. In the present embodiment, the terminal device 7 includes two speakers, and the speaker holes 57 are provided at the respective positions of each of the left speaker and the right speaker.

The terminal device 7 includes an extension connector 58 via which another device can be connected to the terminal device 7. In the present embodiment, the extension connector 58 is provided on the lower side surface of the housing 50 as shown in FIG. 8(d). The other device connected to the extension connector 58 may be any device, and may be, for example, a game-specific controller (gun-shaped controller, etc.) or an input device such as a keyboard. The extension connector 58 may be omitted if it is not necessary to connect other devices to the terminal device 7.

With the terminal device 7 shown in FIG. 8, the shape of each operation button, the shape of the housing 50, the number and the positions of the components, etc., are merely illustrative, and the systems, methods, and techniques described herein may be implemented with other shapes, numbers, and positions.

Next, an internal configuration of the terminal device 7 will be described with reference to FIG. 10. FIG. 10 is a block diagram showing an internal configuration of the terminal device 7. As shown in FIG. 10, in addition to the configuration shown in FIG. 8, the terminal device 7 includes a touch panel controller 61, a magnetic sensor 62, the acceleration sensor 63, the gyrosensor 64, a user interface controller (UI controller) 65, a codec LSI 66, the speaker 67, a sound IC 68, the microphone 69, a wireless module 70, an antenna 71, an infrared communication module 72, a flash memory 73, a power supply IC 74, and a battery 75. These electronic components are mounted on an electronic circuit board and accommodated in the housing 50.

The UI controller 65 is a circuit for controlling the input/output of data to/from various types of input/output units. The UI controller 65 is connected to the touch panel controller 61, an analog stick 53 (the analog sticks 53A and 53B), an operation button 54 (the operation buttons 54A to 54L), the marker unit 55, the magnetic sensor 62, the acceleration sensor 63, and the gyrosensor 64. The UI controller 65 is connected to the codec LSI 66 and the extension connector 58. The power supply IC 74 is connected to the UI controller 65, and power is supplied to various units via the UI controller 65. The built-in battery 75 is connected to a power supply IC 74 to supply power. The charger 76 or a cable with which power can be obtained from an external power source via a connector, or the like, can be connected to the power supply IC 74, and the terminal device 7 can receive power supply from or be charged by an external power source using the charger 76 or the cable. The terminal device 7 may be charged by attaching the terminal device 7 to a cradle (not shown) having a charging function.

The touch panel controller 61 is a circuit connected to the touch panel 52 for controlling the touch panel 52. The touch panel controller 61 generates touch position data of a predetermined format based on signals from the touch panel 52, and outputs it to the UI controller 65. The touch position data represents, for example, the coordinates of a position on the input surface of the touch panel 52 at which an input is made. The touch panel controller 61 reads a signal from the touch panel 52 and generates touch position data at a rate of once per a predetermined amount of time. Various control instructions for the touch panel 52 are outputted from a UI controller 65 to the touch panel controller 61.

The analog stick 53 outputs, to the UI controller 65, stick data representing the direction and the amount of slide (or tilt) of the stick portion operated with a finger of the user. The operation button 54 outputs, to the UI controller 65, operation button data representing the input status of each of the operation buttons 54A to 54L (e.g., whether it is pressed).

The magnetic sensor 62 detects the azimuthal direction by sensing the size and direction of the magnetic field. Azimuthal direction data representing the detected azimuthal direction is outputted to the UI controller 65. Control instructions for a magnetic sensor 62 are outputted from the UI controller 65 to the magnetic sensor 62. While there are sensors using an MI (magnetic impedance) element, a flux-gate sensor, a Hall element, a GMR (giant magneto-resistive) element, a TMR (tunnel magneto-resistance) element, an AMR (anisotropic magneto-resistive) element, etc., the magnetic sensor 62 may be any sensor as long as it is possible to detect the azimuthal direction. Strictly speaking, in a place where there is a magnetic field other than the geomagnetic field, the obtained azimuthal direction data does not represent the azimuthal direction.

The acceleration sensor 63 is provided inside the housing 50 for detecting the magnitude of the linear acceleration along each of the directions of the three axes (the x, y and z axes shown in FIG. 8(a)). Specifically, an acceleration sensor 63 detects the magnitude of the linear acceleration along each of the axes, where the x axis lies in the longitudinal direction of the housing 50, the y axis lies in the width direction of the housing 50, and the z axis lies in the direction vertical to the surface of the housing 50. Acceleration data representing the detected acceleration is outputted to the UI controller 65. Control instructions for the acceleration sensor 63 are outputted from the UI controller 65 to the acceleration sensor 63. While the acceleration sensor 63 is assumed to be a capacitive-type MEMS-type acceleration sensor, for example, in the present embodiment, other types of acceleration sensors may be employed in other embodiments. The acceleration sensor 63 may be an acceleration sensor for 1-axis or 2-axis detection.

The gyrosensor 64 is provided inside the housing 50 for detecting angular velocities about the three axes, i.e., the x-axis, the y-axis and the z-axis. Angular velocity data representing the detected angular velocities is outputted to the UI controller 65. Control instructions for a gyrosensor 64 are outputted from the UI controller 65 to the gyrosensor 64. The number and combination of gyrosensors used for detecting angular velocities about three axes may be any number and combination, and the gyrosensor 64 may be formed by a 2-axis gyrosensor and a 1-axis gyrosensor, as is the gyrosensor 48. The gyrosensor 64 may be a gyrosensor for 1-axis or 2-axis detection.

The UI controller 65 outputs, to the codec LSI 66, operation data including touch position data, stick data, operation button data, azimuthal direction data, acceleration data, and angular velocity data received from various components described above. If another device is connected to the terminal device 7 via the extension connector 58, data representing an operation performed on the other device may be further included in the operation data.

The codec LSI 66 is a circuit for performing a compression process on data to be transmitted to the game device 3, and an expansion process on data transmitted from the game device 3. The LCD 51, the camera 56, the sound IC 68, the wireless module 70, the flash memory 73, and the infrared communication module 72 are connected to the codec LSI 66. The codec LSI 66 includes a CPU 77 and an internal memory 78. While the terminal device 7 does not itself perform game processes, the terminal device 7 may execute programs for the management thereof and for the communication. When the terminal device 7 is started up, a program stored in the flash memory 73 is read out to the internal memory 78 and executed by the CPU 77 upon power-up. Some area of the internal memory 78 is used as the VRAM for the LCD 51.

The camera 56 captures an image in response to an instruction from the game device 3, and outputs the captured image data to the codec LSI 66. Control instructions for the camera 56, such as an image-capturing instruction, are outputted from the codec LSI 66 to the camera 56. Camera 56 can also record video. That is, the camera 56 can repeatedly capture images and repeatedly output the image data to the codec LSI 66.

The sound IC 68 is a circuit connected to the speaker 67 and the microphone 69 for controlling input/output of sound data to/from the speaker 67 and the microphone 69. That is, when sound data is received from the codec LSI 66, the sound IC 68 outputs sound signals obtained by performing D/A conversion on the sound data to the speaker 67 so that sound is outputted from the speaker 67. The microphone 69 detects sounds propagated to the terminal device 7 (the sound of the user, etc.), and outputs sound signals representing such sounds to the sound IC 68. The sound IC 68 performs A/D conversion on the sound signals from the microphone 69 to output sound data of a predetermined format to the codec LSI 66.

The codec LSI 66 transmits image data from the camera 56, sound data from the microphone 69 and terminal operation data from the UI controller 65 to the game device 3 via the wireless module 70. In the present embodiment, the codec LSI 66 performs a compression process similar to that of the codec LSI 27 on the image data and the sound data. The terminal operation data and the compressed image data and sound data are outputted, as transmit data, to the wireless module 70. The antenna 71 is connected to the wireless module 70, and the wireless module 70 transmits the transmit data to the game device 3 via the antenna 71. The wireless module 70 has a similar function to that of the terminal communication module 28 of the game device 3. That is, the wireless module 70 has a function of connecting to a wireless LAN by a scheme in conformity with the IEEE 802.11n standard, for example. The transmitted data may be encrypted as necessary or may not be encrypted.

As described above, the transmit data transmitted from the terminal device 7 to the game device 3 includes operation data (the terminal operation data), image data, and sound data. In a case in which another device is connected to the terminal device 7 via the extension connector 58, data received from the other device may be further included in the transmit data. The infrared communication module 72 performs infrared communication in accordance with the IRDA standard, for example, with another device. The codec LSI 66 may transmit, to the game device 3, data received via infrared communication while it is included in the transmit data as necessary.

As described above, compressed image data and sound data are transmitted from the game device 3 to the terminal device 7. These data are received by the codec LSI 66 via the antenna 71 and the wireless module 70. The codec LSI 66 expands the received image data and sound data. The expanded image data is outputted to the LCD 51, and images are displayed on the LCD 51. The expanded sound data is outputted to the sound IC 68, and the sound IC 68 outputs sounds from the speaker 67.

In a case in which control data is included in data received from the game device 3, the codec LSI 66 and the UI controller 65 give control instructions to various units in accordance with the control data. As described above, the control data is data representing control instructions for the components of the terminal device 7 (the camera 56, the touch panel controller 61, the marker unit 55, sensors 62 to 64, and the infrared communication module 72 in the present embodiment). In the present embodiment, control instructions represented by control data may be instructions to activate the operation of the components or deactivate (stop) the operation thereof. That is, components that are not used in a game may be deactivated in order to reduce the power consumption, in which case it is ensured that data from the deactivated components are not included in the transmit data transmitted from the terminal device 7 to the game device 3. For the marker unit 55, which is an infrared LED, the control can be done simply by turning ON/OFF the power supply thereto.

While the terminal device 7 includes operation mechanisms such as the touch panel 52, an analog stick 53 and the operation button 54, as described above, in other embodiments, other operation mechanisms may be included instead of, or in addition to, these operation mechanisms.

While the terminal device 7 includes the magnetic sensor 62, the acceleration sensor 63 and the gyrosensor 64 as sensors for calculating movement of the terminal device 7 (including the position and the attitude thereof, or changes in the position and the attitude thereof), it may only include one or two of these sensors in other embodiments. In other embodiments, other sensors may be included instead of, or in addition to, these sensors.

While the terminal device 7 includes the camera 56 and the microphone 69, it may not include the camera 56 and the microphone 69 or it may include only one of them in other embodiments.

While the terminal device 7 includes the marker unit 55 as a configuration for calculating the positional relationship between the terminal device 7 and the controller 5 (the position and/or attitude, etc., of the terminal device 7 as seen from the controller 5), it may not include the marker unit 55 in other embodiments. In other embodiments, the terminal device 7 may include other mechanisms as a configuration for calculating the positional relationship. For example, in other embodiments, the controller 5 may include a marker unit, and the terminal device 7 may include an image-capturing element. Moreover, in such a case, the marker device 6 may include an image-capturing element, instead of an infrared LED.

[5. Outline of Processes of Game System]

Next, an outline of processes to be performed in the game system 1 of the present embodiment will be explained. By displaying game images on two display devices, i.e., the television 2 and the terminal device 7, the game system 1 is capable of providing easy-to-view game images to the player and improving the controllability and the playability. In the present embodiment, the terminal game image displayed on the terminal device 7 is switched from one to another in accordance with the attitude of the terminal device 7, and different game images are displayed in accordance with the attitude of the terminal device 7. The outline of processes of the game system 1 will now be explained for a game, as an example, in which a player object and an enemy object appear in a virtual game space.

(Switching Game Images)

Figure 11:
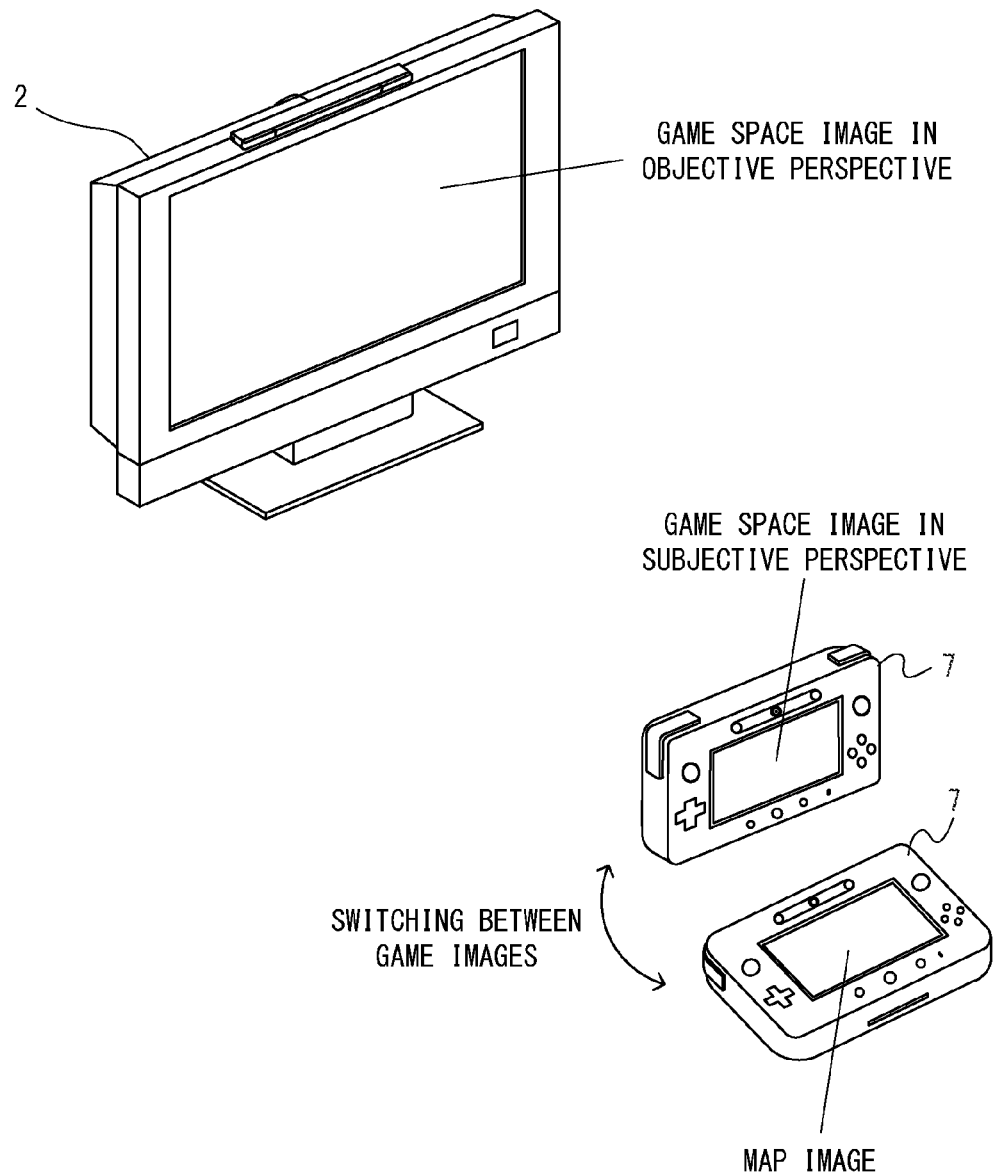
FIG. 11 is a diagram showing an example game image switching operation with the terminal device 7.

FIG. 11 is a diagram showing a game image switching operation of the terminal device 7. In the present embodiment, the terminal game image displayed on the terminal device 7 is switched from one to another in accordance with the attitude of the terminal device 7. Specifically, the terminal game image is switched from one to another when the screen of the terminal device 7 is close to being horizontal (referred to as the "horizontal state") and when the screen of the terminal device 7 is close to being vertical (referred to as the "vertical state"). More specifically, a map image showing the game space as viewed from above is displayed on the terminal device 7 when the terminal device 7 is held in the horizontal state, and an image of the game space as viewed from the position of the player object (an image in subjective perspective) is displayed on the terminal device 7 when the terminal device 7 is held in the vertical state. Thus, the player can easily switch between terminal game images by an operation of changing the attitude of the terminal device 7. In the present embodiment, an image of the game space including the player object (an image in objective perspective) is displayed on the television 2.

As described above, in the present embodiment, the terminal game image is switched from one to another by rotating the terminal device 7 in the pitch direction. Therefore, the player can switch between terminal game images by a natural action of moving the terminal device 7 up and down. As long as the switching between terminal game images is performed in accordance with the attitude of the terminal device 7, the switching may be performed by rotating the attitude of the terminal device 7 in a direction other than the pitch direction in other embodiments.

Another possible method for changing the attitude of the terminal device 7 for switching between terminal game images is, for example, to rotate the terminal device 7 in the yaw direction (rotate about an axis extending in the vertical direction) while holding the terminal device 7 in the vertical state. Another possible method is to rotate the terminal device 7 in the roll direction (the rotation direction about an axis extending perpendicular to the screen of the terminal device 7) while the terminal device 7 is held in the vertical state or in the horizontal state. However, with the former method, since the terminal device 7 is continuously held in the vertical state throughout the game, the arms of the player may become tired and the player may not be able to perform game operations comfortably. With the latter method, since the direction of the screen changes, the game image may become less easy to view.

In contrast, with the embodiment described above, since the player can perform game operations while the terminal device 7 is held in the horizontal state as necessary, it is not always necessary to hold the terminal device 7 in the vertical state and it is possible perform game operations comfortably. Since the direction of the screen of the terminal device 7 as viewed from the player does not change, it is possible to prevent game images from becoming less easy to view.

In the present embodiment, game operations on the player object are performed using the terminal device 7. Therefore, the player can perform game operations on the player object using the terminal device 7, and can also switch between game images by changing the attitude of the terminal device 7. Thus, the player can dynamically switch between terminal game images even during a game (during a game operation). In the present embodiment, since the terminal device 7 is used as the controller device and the controller 5 is not used, the game system 1 may not include the controller 5.

(Specific Examples of Game Images)

Figure 12:
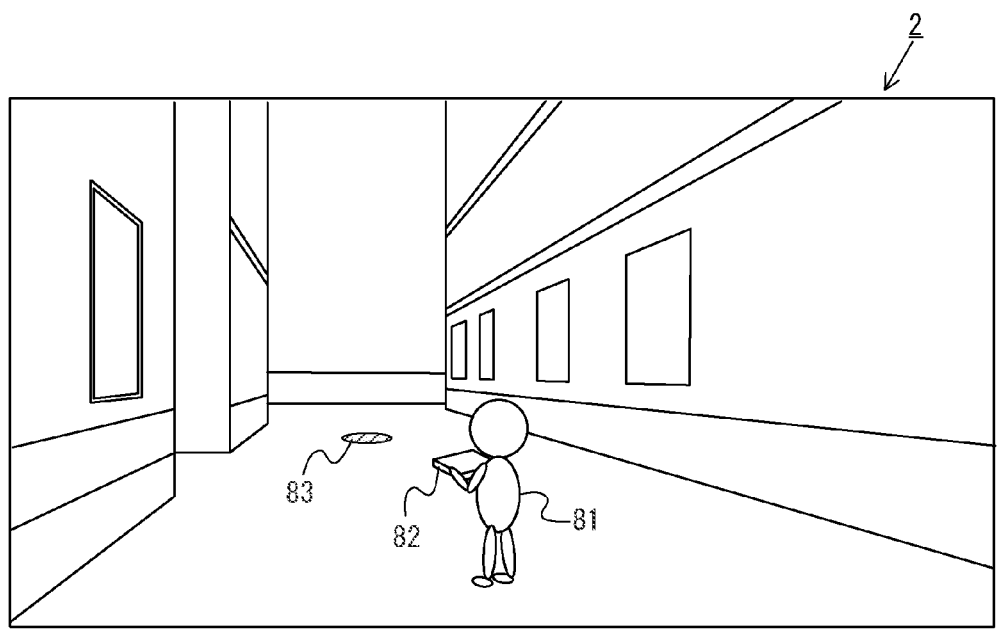
FIG. 12 is a diagram showing an example television game image in a case where the terminal device 7 is in a horizontal state.

Examples of game images displayed on the television 2 and the terminal device 7 will now be described with reference to FIGS. 12 to 15. FIG. 12 is a diagram showing an example of a television game image when the terminal device 7 is in the horizontal state. As shown in FIG. 12, an image of the game space including a player object 81 (an image in objective perspective) is displayed on the television 2. In the present embodiment, the player object 81 is holding an item 82 that looks like a camera (hereinafter referred to as the "camera 82"). When the terminal device 7 is in the horizontal state, the player object 81 puts down the camera 82.

In the present embodiment, an enemy object that looks like a ghost (an enemy object 85 shown in FIG. 15) also appears in the game space. Note however that the enemy object 85 is not displayed on the television 2, but only a shadow 83 of the enemy object 85 is displayed (see FIG. 12). Thus, in the present embodiment, it is difficult for the player to grasp the position of the enemy object 85 only from the television game image. In other embodiments, it may be made impossible for the player to grasp the position of the enemy object 85 only from the television game image. That is, the game device 3 may generate a television game image that includes neither the enemy object 85 nor the image of the shadow 83.

Figure 13:
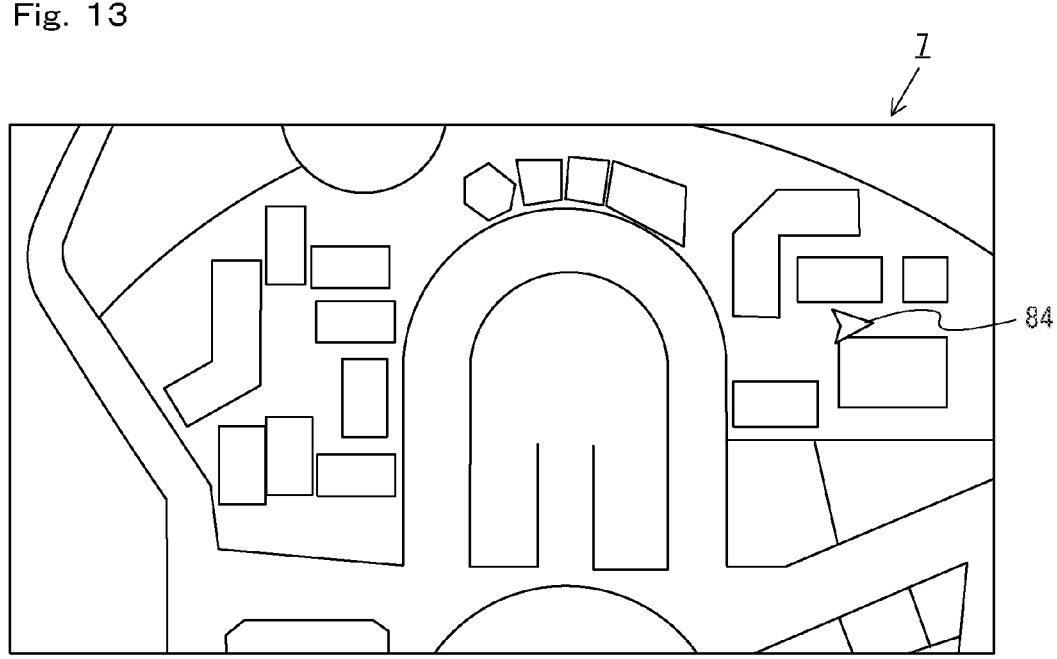
FIG. 13 is a diagram showing an example terminal game image in a case where the terminal device 7 is in a horizontal state.

FIG. 13 is a diagram showing an example of a terminal game image when the terminal device 7 is in the horizontal state. As shown in FIG. 13, when the terminal device 7 is in the horizontal state, a map image is displayed on the terminal device 7 thereof. While the map image is generated using a virtual camera arranged above the ground of the game space in the present embodiment, a two-dimensional map image may be displayed in other embodiments. The map image includes a mark 84 representing the position and direction of the player object 81. Therefore, the player can grasp the position of the player object 81 in the game space by holding the terminal device 7 in the horizontal state and looking at the map image displayed on the terminal device 7. In other embodiments, an image of a menu screen or an image of an item screen for selecting an item to be used by the player object 81 may be displayed as the terminal game image in the horizontal state.

When the terminal device 7 is in the horizontal state, the player can move the player object 81 by game operations on the terminal device 7. Specifically, the player can move the player object 81 on the ground of the game space by up, down, left and right inputs on an analog stick 53. In a move operation performed in the horizontal state, the player object 81 can turn in any direction (front, back, left or right) on the ground of the game space, the details of which will be described below.

Figure 14:
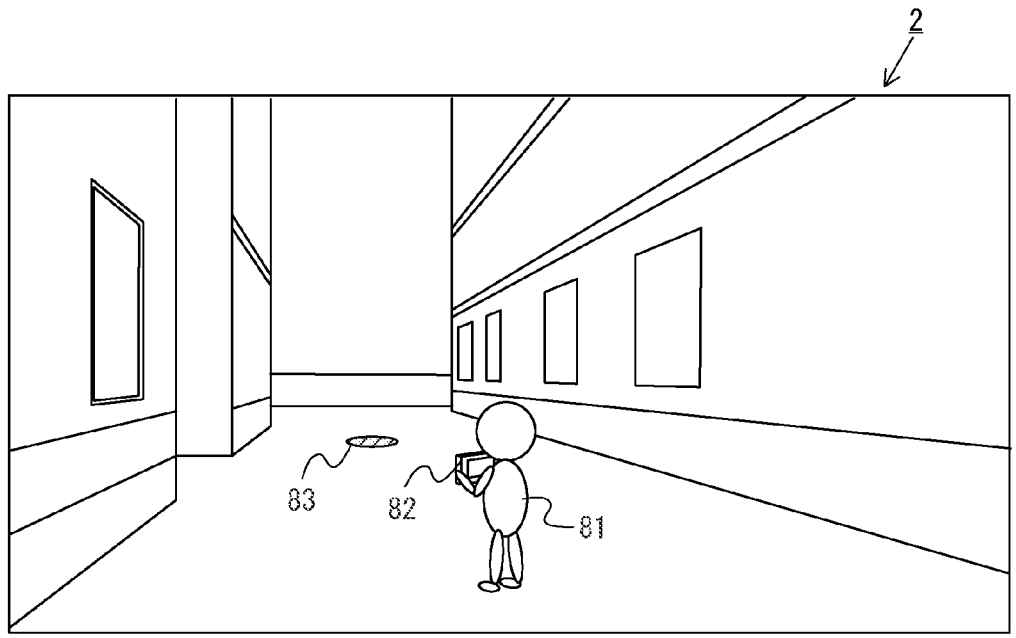
FIG. 14 is a diagram showing an example television game image in a case where the terminal device 7 is in a vertical state.

FIG. 14 is a diagram showing an example of the television game image when the terminal device 7 is in the vertical state. As shown in FIG. 14, for the television game image, an image representing the game space in objective perspective is displayed in the vertical state, as in the horizontal state. However, the enemy object 85 is not displayed, and only the shadow 83 is displayed. In the horizontal state, unlike the vertical state, the player object 81 is assuming a position (posture) with the camera 82 held in hand. The player object 81 is controlled so as to change the direction of the camera 82 in accordance with the attitude of the terminal device 7, the details of which will be described below. Therefore, the player can check the attitude of the terminal device 7 by looking at the posture of the player object 81 and the direction of the camera 82 displayed on the television 2.

Figure 15:
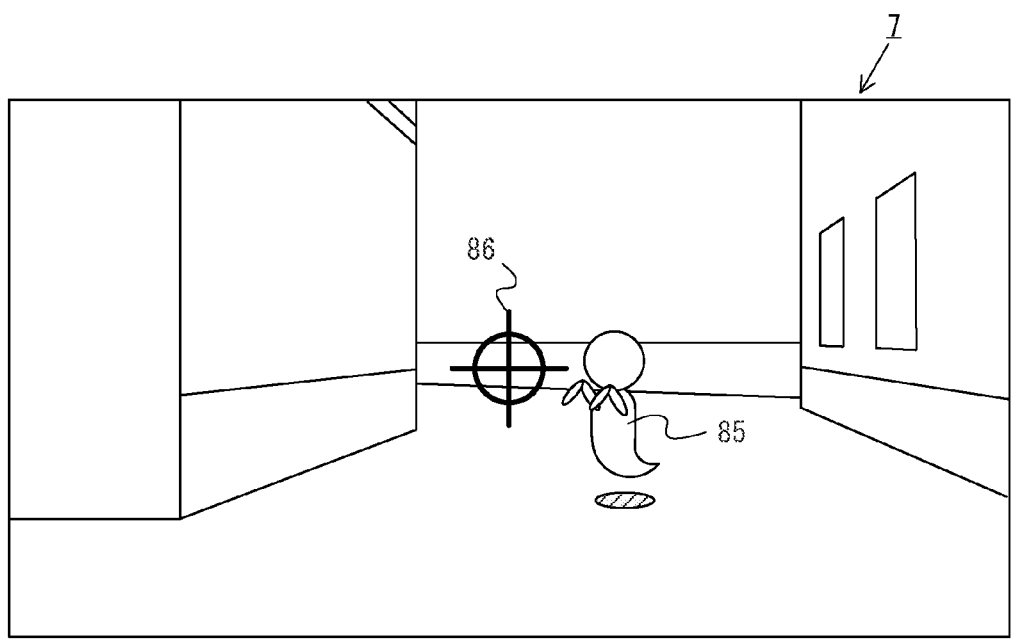
FIG. 15 is a diagram showing an example terminal game image in a case where the terminal device 7 is in a vertical state.

FIG. 15 is a diagram showing an example of the terminal game image when the terminal device 7 is in the vertical state. As shown in FIG. 15, in the vertical state, an image showing the game space in so-called "subjective perspective" (an image in subjective perspective) is displayed on the terminal device 7. More specifically, in the present embodiment, an image showing the game space as viewed from the position of the camera 82 is displayed as an image in subjective perspective. An image in subjective perspective may be any image as long as the player recognizes that it is an image as viewed from the viewpoint of the player object 81. That is, the position of the viewpoint in an image in subjective perspective may be the position of the player object 81 or a position in the vicinity thereof, or the position of the camera 82 as in the present embodiment, or it may be the position of the head of the player object 81 in other embodiments. The game image in subjective perspective is generated using a virtual camera that is set at the position of the camera 82, and the direction of the virtual camera changes in accordance with the attitude of the terminal device 7, the details of which will be described below. That is, the player can change the viewing direction of the image in subjective perspective by changing the attitude of the terminal device 7.

The enemy object 85 is displayed on the terminal game image, unlike the television game image. Therefore, the player can visually check the enemy object 85 by putting the terminal device 7 in the vertical state to switch the terminal game image to the game space image. Although not shown in FIG. 15, the terminal game image in subjective perspective is generated in the present embodiment as a black-and-white image for the sake of an atmosphere in the game.

In the present embodiment, when the terminal device 7 is in the vertical state, the player can perform a shooting operation. Specifically, in the vertical state, a reticle image 86 is displayed at the center of the screen of the terminal device 7. Then, in response to the player performing a predetermined shooting operation, the player object 81 executes a shooting action at a position pointed by the reticle image 86. If the bullet hits the enemy object 85 as a result of the shooting action, the enemy object 85 can be shot down (eliminated). As described above, since the player can change the viewing direction of the image in subjective perspective by changing the attitude of the terminal device 7, the direction of the virtual camera is changed and the position pointed by the reticle image 86 is changed in accordance with the attitude of the terminal device 7. Therefore, the player can change the shooting direction by an easy and intuitive operation of changing the attitude of the terminal device 7.

Also when the terminal device 7 is in the vertical state, as in the horizontal state, the player can move the player object 81 by game operations on the terminal device 7. Note however that in a move operation performed in the vertical state, unlike in the horizontal state, the player object 81 translates while fixing the direction thereof. The movement method in the vertical state is a movement method that is suitable for a shooting operation. That is, a movement method suitable for moving the player object 81 in the game space in objective perspective is employed as the movement method in the horizontal state, while a movement method suitable for moving in subjective perspective is employed as the movement method in the vertical state.

In the present embodiment, the player plays the game by shooting down the enemy object 85 by a shooting operation while moving the player object 81 so as not to be caught by the enemy object 85. That is, the player moves the player object 81 while looking at the television game image in objective perspective or looking at the map image by holding the terminal device 7 in the horizontal state, and the player checks the position of the enemy object 85 by holding the terminal device 7 in the vertical state, as necessary, and when the player finds the enemy object 85, the player shoots down the enemy object 85 by performing a shooting operation in the vertical state. Thus, in the present embodiment, it is possible to provide a novel game operation of dynamically switching between terminal game images during a game by changing the attitude of the terminal device 7, thereby dynamically switching between different objects to look at, i.e., the screen of the television 2 and the screen of the terminal device 7, during the game.

As described above, in the present embodiment, the player can use the terminal device 7 to perform both game operations on the game image on the television 2 and operations on the game image on the terminal device 7. Therefore, the player can easily perform game operations on different game images displayed on two display devices without performing a troublesome operation of switching between controller devices.

In the present embodiment, a game image showing the game space in objective perspective is displayed on the television 2, whereas an image that shows the game space and is different from the television game image (an image in subjective perspective) is displayed on the terminal device 7 when the terminal device 7 is in the vertical state. On the other hand, when the terminal device 7 is in the horizontal state, a game image (the map image) different from that in the vertical state is displayed on the terminal device 7. Therefore, in the present embodiment, the player can easily grasp the circumstances of the game space by holding the terminal device 7 in the vertical state (by using two different images showing the game space), and can also obtain game information different from that in the vertical state by holding the terminal device 7 in the horizontal state.

If game operations are performed while continuously holding the terminal device 7 in the vertical state, the arms of the player may become tired. For this problems, in the present embodiment, the terminal game images are switched from one to another when the terminal device 7 is in the vertical state and when it is in the horizontal state, while an image showing the game space is displayed on the television 2. Therefore, the player can grasp the circumstances of the game space by looking at the screen of the television 2 even when the terminal device 7 is not in the vertical state (when it is in the horizontal state). With the present embodiment, the player does not need to keep the terminal device 7 in the vertical state and can therefore comfortably play the game without getting tired.

With the present embodiment, the enemy object 85 is displayed only in a terminal game image that is displayed when the terminal device 7 is in the vertical state. Moreover, only when the terminal device 7 is held in the vertical state, the shooting action of the player object 81 is allowed. Thus, by giving an advantage in game for holding the terminal device 7 in the vertical state, it is possible to motivate the player to move the terminal device 7 from the horizontal state to the vertical state. Therefore, the player is allowed to perform a novel game operation of dynamically switching between terminal game images by changing the attitude of the terminal device 7 during the game.

Moreover, in the present embodiment, when moving the player object 81, the player can perform the move operation while holding the terminal device 7 in the horizontal state and looking primarily at the screen of the television 2, and when having the player object 81 execute a shooting action, the player can hold the terminal device 7 in the vertical state and perform the shooting operation while looking primarily at the screen of the terminal device 7. Therefore, both when performing the move operation and when performing the shooting operation, the player can perform game operations while looking primarily in the forward direction. That is, the present embodiment generates images showing the game space, one as the television game image and the other as the terminal game image in the vertical state, thereby allowing the player to play the game without substantially changing the viewing direction. Therefore, with the present embodiment, the player can play the game comfortably as the player does not need to change the viewing direction even when dynamically switching between two display devices as the object to look at during the game.

[6. Details of Game Processes]

Figure 16:
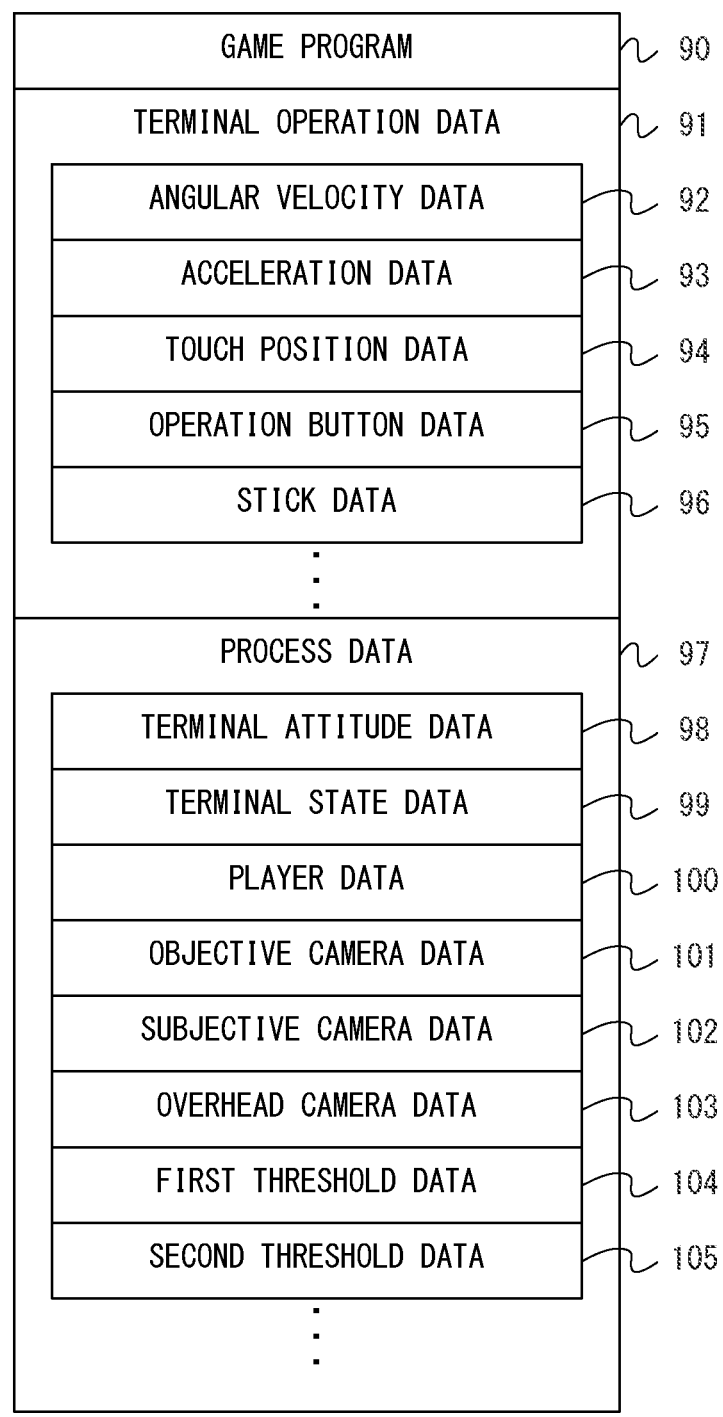
FIG. 16 is a diagram showing example various data used in a game process.

Next, the details of game processes performed by the present game system will be described. First, various data used in the game processes will be described. FIG. 16 is a diagram showing various data used in the game processes. FIG. 16 is a diagram showing primary data to be stored in the main memory (the external main memory 12 or the internal main memory 11*e*) of the game device 3. As shown in FIG. 16, the main memory of the game device 3 stores a game program 90, terminal operation data 91, and process data 97. In addition to those shown in FIG. 16, the main memory also stores other data used in the game processes, such as image data of various objects appearing in the game, and sound data used in the game, etc.

At an appropriate point in time after the power of the game device 3 is turned ON, a part or whole of the game program 90 is loaded from the optical disc 4 and stored in the main memory. The game program 90 may be obtained from the flash memory 17 or an external device of the game device 3 (e.g., via the Internet), instead of from the optical disc 4. A part of the game program 90 (e.g., a program for calculating the attitude of the terminal device 7) may be pre-stored in the game device 3.

The terminal operation data 91 is data representing an operation performed by a player on the terminal device 7. The terminal operation data 91 is transmitted from the terminal device 7, obtained by the game device 3, and stored in the main memory. The terminal operation data 91 includes angular velocity data 92, acceleration data 93, touch position data 94, operation button data 95, and stick data 96. The main memory may store a predetermined number of latest (most recently obtained) sets of terminal operation data.

The angular velocity data 92 is data representing the angular velocity detected by the gyrosensor 64. While the angular velocity data 92 represents angular velocity about each of the three axes of x, y and z shown in FIG. 8 in the present embodiment, it may represent angular velocity about any one or more axes in other embodiments.

The acceleration data 93 is data representing the acceleration (acceleration vector) detected by the acceleration sensor 63. While the acceleration data 93 represents three-dimensional acceleration of which each component is the acceleration for one of the three axes of x, y and z shown in FIG. 8 in the present embodiment, it may represent acceleration for any one or more directions in other embodiments.

The touch position data 94 is data representing the position (touch position) on the input surface of the touch panel 52 at which an input is made. In the present embodiment, the touch position data 94 represents the coordinate values in the two-dimensional coordinate system which is for representing positions on the input surface. Where the touch panel 52 is of a multi-touch type, the touch position data 94 may represent a plurality of touch positions.

The operation button data 95 is data representing the input status on depressible key operation units (the operation buttons 54A to 54L) provided on the terminal device 7. Specifically, the operation button data 95 represents whether each of the operation buttons 54A to 54L is being pressed.

The stick data 96 is data representing the direction and amount by which the stick portion of each of the analog sticks 53A and 53B is slid (or tilted). The analog stick 53 is an input device through which an input can be made by moving an operation member (stick portion) which can be moved in any two-dimensional direction, and the stick data 96 represents the direction (the operation direction) and the amount (operation amount) by which the operation member is operated. In the present embodiment, it is assumed that the operation amount and the operation direction of the analog stick 53 are represented by two-dimensional coordinates of which the x component is the operation amount for the left-right direction and the y component is the operation amount for the up-down direction.

In addition to the data 92 to 95, the terminal operation data 91 may include azimuthal direction data representing the azimuthal direction detected by the magnetic sensor 62. In the present embodiment, camera image data and/or microphone sound data, as well as the terminal operation data 91, may be transmitted from the terminal device 7 to the game device 3. The camera image data is data representing an image (camera image) captured by the camera 56 of the terminal device 7. The microphone sound data is data representing sound (microphone sound) detected by the microphone 69 of the terminal device 7. The camera image data and the microphone sound data are compressed by the codec LSI 66 and transmitted to the game device 3, and are expanded by the codec LSI 27 of the game device 3 and stored in the main memory.

Where the attitude of the terminal device 7 is calculated from the terminal operation data 91 as in the present embodiment, the terminal operation data 91 at least includes data representing a physical quantity used for calculating the attitude of the terminal device 7. While the data representing a physical quantity is the acceleration data 93, the angular velocity data 92 and azimuthal direction data in the present embodiment, the terminal operation data 91 may be data that includes any one or two of these three data in other embodiments. Since the attitude of the terminal device 7 can be easily calculated based on output data from inertia sensors such as the acceleration sensor 63 and the gyrosensor 64, the attitude may be calculated using such inertia sensors.

In a case in which the terminal device 7 includes another input mechanism (e.g., a touch pad, or an image-capturing mechanism of the controller 5, etc.), the terminal operation data 91 may include data which is output from the other input mechanism.

Although it is now shown in the figures because the controller 5 is not used as a controller device in the present embodiment, the main memory may store controller operation data representing operations of the user (player) on the controller 5.

Figure 18:
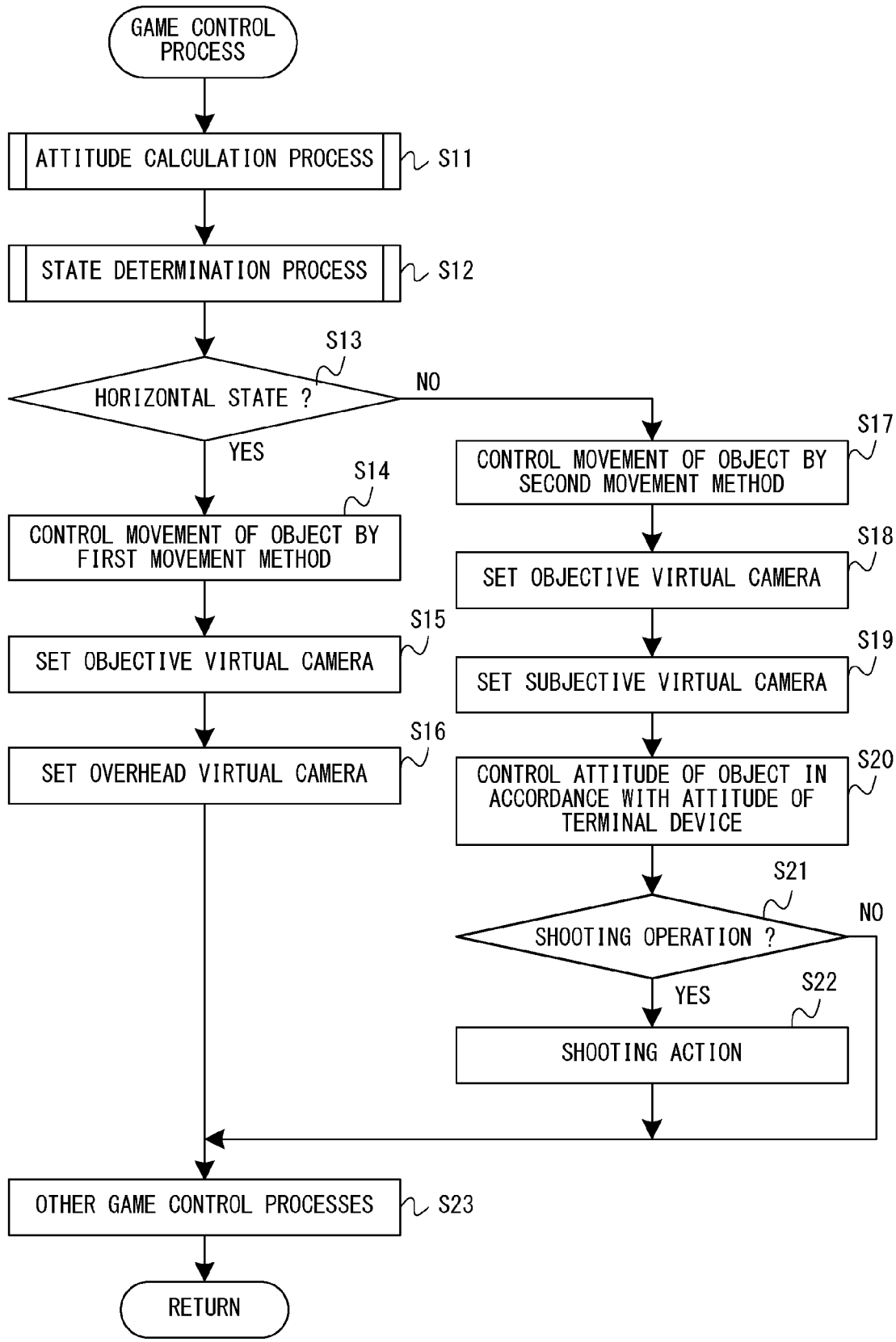
FIG. 18 is a flow chart showing an example detailed flow of a game control process (step S3) shown in FIG. 17.

The process data 97 is data used in game processes to be described below (FIG. 18). The process data 97 includes terminal attitude data 98, terminal state data 99, player data 100, objective camera data 101, subjective camera data 102, overhead camera data 103, first threshold data 104, and second threshold data 105. In addition to the data shown in FIG. 16, the process data 97 includes various data used in game processes such as data representing various parameters set for various objects appearing in the game.

The terminal attitude data 98 is data representing the attitude of the terminal device 7. For example, the attitude of the terminal device 7 may be expressed by a rotation matrix that represents the rotation from a predetermined reference attitude to the current attitude, or may be expressed by a third-order vector or three angles. While the attitude in the three-dimensional space is used as the attitude of the terminal device 7 in the present embodiment, the attitude in the two-dimensional plane may be used in other embodiments. In the present embodiment, the terminal attitude data 98 is calculated based on the acceleration data 93 and the angular velocity data 92 included in the terminal operation data. The method for calculating the terminal attitude data 98 will be later described in step S11.

The terminal state data 99 is data representing the state regarding the attitude of the terminal device 7. Specifically, the terminal state data 99 indicates one of the horizontal state and the vertical state. Whether the terminal state data 99 indicates the horizontal state or the vertical state is determined based on the terminal attitude data 98.

The player data 100 is data representing various information of the player object 81. In the present embodiment, the player data 100 represents at least the position and direction of the player object 81 and the posture of the player object 81. The posture of the player object 81 refers to the posture of the player object 81 holding the camera 82. The player data 100 is calculated based on the terminal operation data 91 and the terminal attitude data 98.

The objective camera data 101 is data representing information regarding a virtual camera (the objective virtual camera) that is used for generating an image of the game space as viewed in objective perspective (see FIGS. 12 and 14). The subjective camera data 102 is data representing information regarding a virtual camera (the subjective virtual camera) that is used for generating an image of the game space as viewed in subjective perspective (see FIG. 15). The overhead camera data 103 is data representing information regarding a virtual camera (the overhead virtual camera) that is used for generating a map image (see FIG. 13) of the game space as viewed from above. Each of the camera data 101 to 103 represents at least the position and direction of the virtual camera, and may also represent the field angle of the virtual camera, etc. Each of the camera data 101 to 103 is set based on the position and direction of the player object 81.

The threshold data 104 and 105 are data each representing a threshold used for determining the state of the terminal device 7 (the horizontal state or the vertical state). Specifically, the first threshold data 104 represents a first threshold that is used for determining whether the terminal device 7 has been brought into the vertical state. The second threshold data 105 represents a second threshold that is used for determining whether the terminal device 7 has been brought into the horizontal state. In the present embodiment, the first threshold and the second threshold are of different values, with the first threshold representing an attitude closer to being vertical than the attitude represented by the second threshold, the details of which will be described below. The values of the first threshold and the second threshold are preset in the game program 90, and the threshold data 104 and 105 are stored in the main memory at an appropriate point in time when the game program 90 is loaded.

Figure 17:
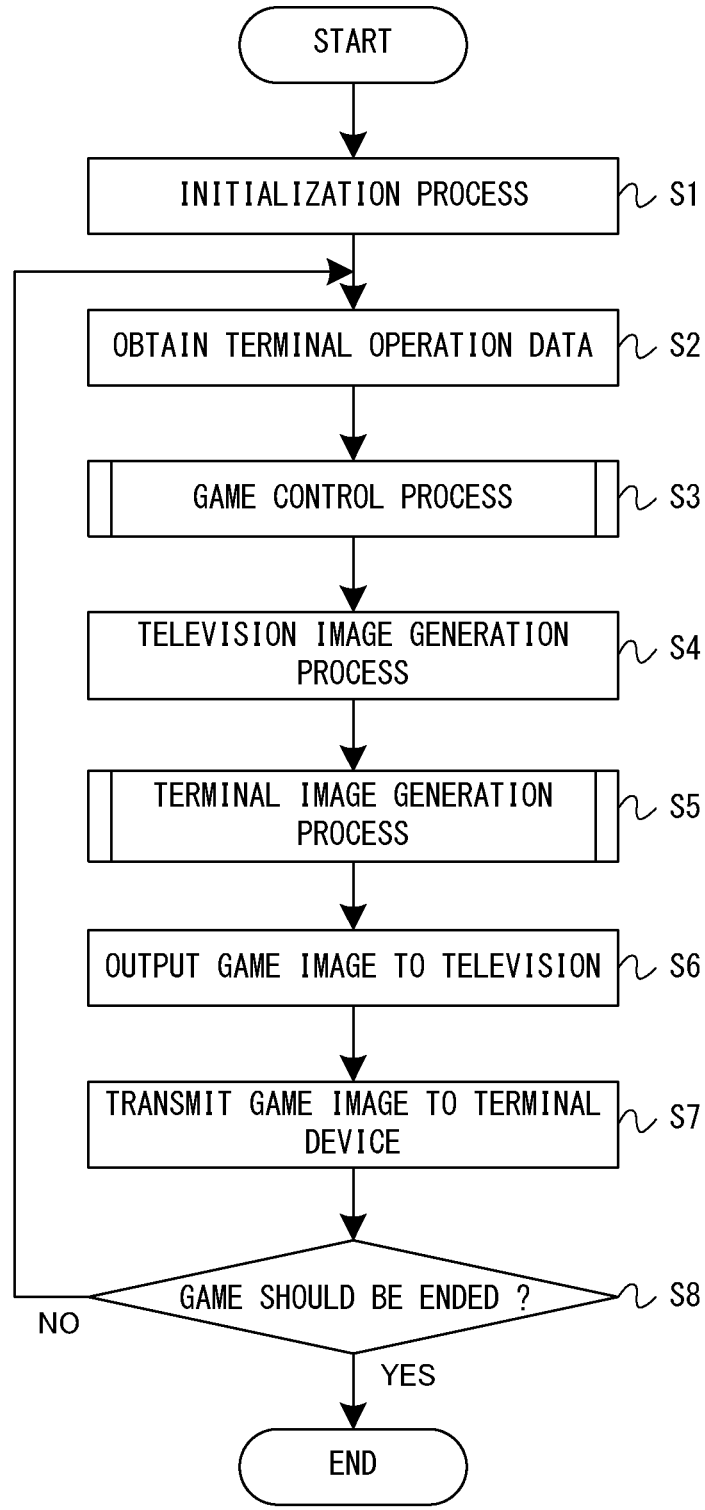
FIG. 17 is a main flow chart showing an example flow of a game process performed by the game device 3.

Next, the details of the game processes performed by the game device 3 will be described with reference to FIGS. 17 to 23. FIG. 17 is a main flow chart showing the flow of the game processes performed by the game device 3. When the power of the game device 3 is turned ON, the CPU 10 of the game device 3 executes a boot program stored in a boot ROM (not shown), so as to initialize each unit, including the main memory. Then, the game program stored in the optical disc 4 is loaded to the main memory, and the CPU 10 starts executing the game program. The game device 3 may be configured to execute the game program immediately after power-up, or it may be configured so that a built-in program is executed after power-up for displaying a predetermined menu screen first, and then the game program is executed in response to a user's instruction to start the game. The flow chart shown in FIG. 17 is a flow chart showing the process to be performed after processes described above are completed.

The processes of the steps of the flow chart shown in FIGS. 17 to 19 and 23 are merely illustrative, and the order of steps to be performed may be switched around as long as similar results are obtained. The values of the variables, and the threshold values used in determination steps are also merely illustrative, and other values may be used as necessary. While the present embodiment is described assuming that the processes of the steps of the flow chart are performed by the CPU 10, processes of some of the steps of the flow chart may be performed by a processor or a dedicated circuit other than the CPU 10.

First, in step S1, the CPU 10 performs an initialization process. The initialization process is a process of constructing a virtual game space, placing objects appearing in the game space at their initial positions, and setting initial values of various parameters used in the game processes. In the present embodiment, data representing the horizontal state as the state of the terminal device 7 is stored as the terminal state data 99 in the main memory in the initialization process. For the player object 81, data representing the position and direction thereof which have been preset is stored as the player data 100 in the main memory. The process of step S2 is performed, following step S1. Thereafter, the process loop including a series of processes of steps S2 to S8 is repeatedly performed at a rate of once per a predetermined amount of time (a one frame period).

In step S2, the CPU 10 obtains terminal operation data. As the terminal device 7 repeatedly transmits the terminal operation data to the game device 3, the game device 3 successively receives the terminal operation data. In the game device 3, the terminal communication module 28 successively receives the terminal operation data, and the input/output processor 11a successively stores the terminal operation data in the main memory. In step S3, the CPU 10 reads out the latest terminal operation data 91 from the main memory. The process of step S3 is performed, following step S2.

In step S3, the CPU 10 performs the game control process. The game control process allows the game to progress by performing various game processes based on the terminal operation data. The details of the game control process will now be described with reference to FIG. 18.

FIG. 18 is a flow chart showing a detailed flow of the game control process (step S3) shown in FIG. 17. In the game control process, first, in step S11, the CPU 10 performs the attitude calculation process. The attitude calculation process is a process of calculating the attitude of the terminal device 7 based on the terminal operation data 91. The details of the attitude calculation process will now be described with reference to FIG. 19.

Figure 19:
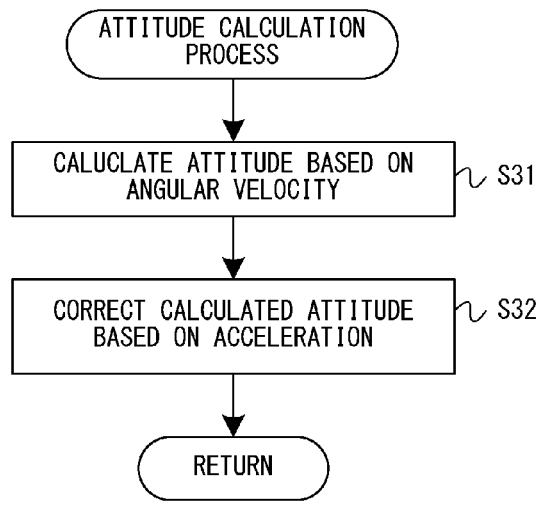
FIG. 19 is a flow chart showing an example detailed flow of an attitude calculation process (step S11) shown in FIG. 18.

FIG. 19 is a flow chart showing a detailed flow of the attitude calculation process (step S11) shown in FIG. 18. In the In the attitude calculation process, first, in step S31, the CPU 10 calculates the attitude of the terminal device 7 based on the angular velocity data 92. While the method for calculating the attitude based on the angular velocity may be any method, the attitude is calculated using the previous attitude (the attitude calculated in a previous iteration) and the current angular velocity (the angular velocity obtained in step S2 in a current iteration of the process loop). Specifically, the CPU 10 calculates the attitude by rotating the previous attitude by a unit time's worth of the current angular velocity. The previous attitude is represented by the terminal attitude data 98 stored in the main memory, and the current angular velocity is represented by the angular velocity data 92 stored in the main memory. Therefore, the CPU 10 reads out the terminal attitude data 98 and the angular velocity data 92 from the main memory to calculate the attitude of the terminal device 7. The data representing the attitude calculated as described above is stored in main memory. The process of step S32 is performed, following step S31.

Where the attitude is calculated from the angular velocity in step S31, an initial attitude may be set. That is, where the attitude of the terminal device 7 is calculated from the angular velocity, the CPU 10 initially sets the initial attitude of the terminal device 7. The initial attitude of the terminal device 7 may be calculated based on the acceleration data, or the player may be prompted to perform a predetermined operation with the terminal device 7 in a particular attitude so that the particular attitude at the point in time when the predetermined operation is performed is set as the initial attitude. While the initial attitude may be calculated in a case in which the attitude of the terminal device 7 is calculated as an absolute attitude with respect to a predetermined direction in the space, the initial attitude may not be calculated in a case in which the attitude of the terminal device 7 is calculated as a relative attitude with respect to the attitude of the terminal device 7 at the start of the game, for example.

In step S32, the CPU 10 corrects the attitude calculated in step S31 based on the acceleration of the terminal device 7. In a state in which the terminal device 7 is substantially stationary, the acceleration acting upon the terminal device 7 means the gravitational acceleration. That is, in this state, the acceleration vector represented by the acceleration data 93 represents the direction of gravity in the terminal device 7. Therefore, the CPU 10 makes an adjustment such that the downward direction (the direction of gravity) of the attitude calculated in step S31 is brought closer to the direction of gravity represented by the acceleration vector. That is, the attitude is rotated so that the downward direction is brought closer to the direction of gravity represented by the acceleration vector at a predetermined rate. Thus, the attitude based on the angular velocity can be adjusted to an attitude based on the acceleration with the direction of gravity taken into consideration. The predetermined rate may be a predetermined fixed value or may be set in accordance with the detected acceleration, etc. For example, the CPU 10 may increase the rate at which the downward direction of the attitude is brought closer to the direction of gravity represented by the acceleration vector when the magnitude of the detected acceleration is close to the magnitude of the gravitational acceleration, and decrease the rate when the magnitude of the detected acceleration is remote from the magnitude of the gravitational acceleration.

As a specific process of step S32, the CPU 10 reads out data representing the attitude calculated in step S31 and the acceleration data 93 from the main memory, and makes the adjustment described above. Then, data representing the attitude after the adjustment is made is stored in the main memory as the terminal attitude data 98. After step S32, the CPU 10 ends the attitude calculation process. The process of step S12 is performed, following the attitude calculation process of step S11.

Since the acceleration vector corresponds to the attitude of the terminal device 7 based on the gravitational acceleration, it is possible to calculate the attitude of the terminal device 7 based on the acceleration vector. Therefore, in other embodiments, the CPU 10 may calculate the attitude of the terminal device 7 based on the acceleration vector (the attitude based on the acceleration), and make an adjustment such that the attitude based on the angular velocity calculated in step S31 is brought closer to the attitude based on the acceleration at a predetermined rate.

As in the attitude calculation process described above, in the present embodiment, the attitude of the terminal device 7 is calculated based on data output from the acceleration sensor 63 and the gyrosensor 64 which are inertia sensors. Herein, the CPU 10 can know a predetermined azimuthal direction with respect to the terminal device 7 (i.e., the attitude of the terminal device 7 with respect to a predetermined azimuthal direction), from the azimuthal direction data detected by the magnetic sensor 62. Therefore, in other embodiments, the CPU 10 may calculate the attitude of the terminal device 7 by further using the azimuthal direction data, in addition to the angular velocity data 92 and the acceleration data 93. In a case in which the attitude of the terminal device 7 is calculated using the azimuthal direction data, it is possible to calculate the absolute attitude with respect to a predetermined direction in the real space, and it is therefore possible to more accurately calculate the attitude of the terminal device 7. Regarding the azimuthal direction data, in a place where there is a magnetic field other than the geomagnetic field, the azimuthal direction data does not strictly represent the absolute azimuthal direction (e.g., north). Nevertheless, since it represents the relative direction of the terminal device 7, it is still possible to calculate the attitude of the terminal device 7. In other embodiments, the attitude may be calculated based on one or two of the three data described above.

Figure 20:
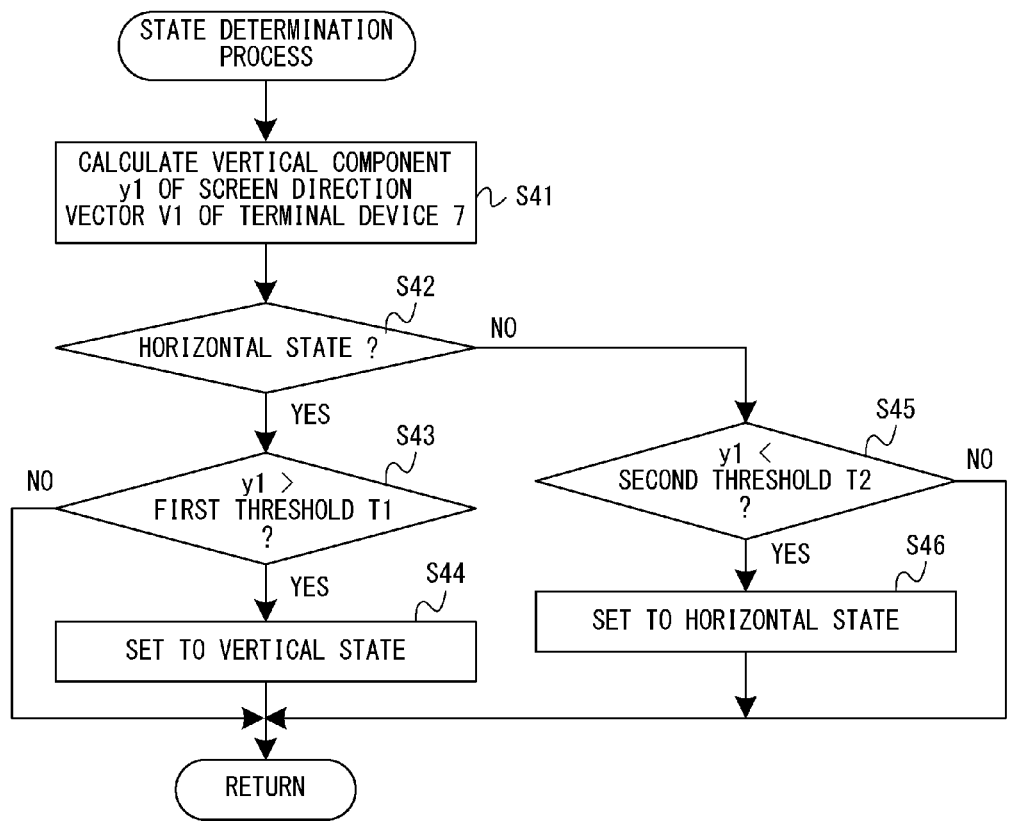
FIG. 20 is a flow chart showing an example detailed flow of a state determination process (step S12) shown in FIG. 18.
Figure 21:
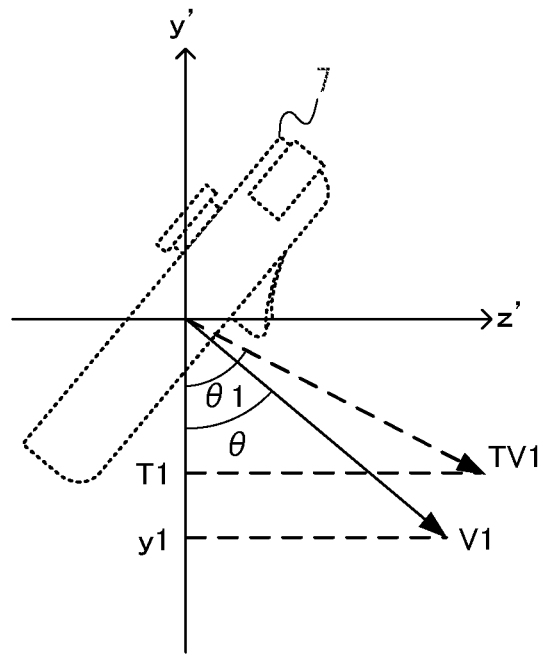
FIG. 21 is a diagram showing an example of the terminal device 7 and a subjective virtual camera in a case where the terminal device 7 is in a horizontal state.
Figure 22:
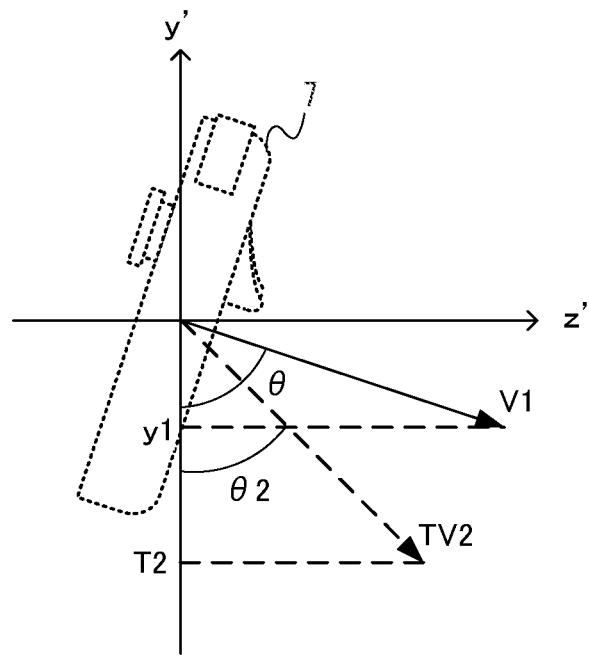
FIG. 22 is a diagram showing an example of the terminal device 7 and a subjective virtual camera in a case where the terminal device 7 is in a vertical state.

Referring back to FIG. 18, in step S12, the CPU 10 performs a state determination process. The state determination process is a process of determining whether the terminal device 7 is in the horizontal state or the vertical state described above. In the state determination process, the CPU 10 determines that the terminal device 7 is in the vertical state when the attitude of the screen of the LCD 51 is closer to being vertical than a predetermined reference attitude (the first threshold), and determines that the terminal device 7 is in the horizontal state when the attitude of the screen of the LCD 51 is closer to being horizontal than a predetermined reference attitude (the second threshold). Referring now to FIGS. 20 to 22, the details of the state determination process will be described.

FIG. 20 is a flow chart showing a detailed flow of the state determination process (step S12) shown in FIG. 18. In the state determination process, first, in step S41, the CPU 10 calculates the vertical direction component y1 of the screen direction vector V1 which represents a direction perpendicular to the screen of the terminal device 7. It is assumed that the screen direction vector V1 is a unit vector of a fixed length. The screen direction vector V1 can be obtained from the attitude calculated in the attitude calculation process (step S11). For example, where a rotation matrix including, as matrix elements, the third-order components of the screen direction vector V1 is calculated as the attitude of the terminal device 7 in the attitude calculation process, the screen direction vector V1 can be easily calculated by extracting the elements of the rotation matrix.

The determination of whether an axis perpendicular to the screen of the terminal device 7 is closer to the vertical direction or to the horizontal direction can be made by using the vertical direction component of the screen direction vector V1 (see FIGS. 21 and 22). Therefore, in the present embodiment, the CPU 10 calculates the vertical direction component y1 of the screen direction vector V1 in order to determine whether the terminal device 7 is in the horizontal state or in the vertical state. Data representing the calculated vertical direction component y1 is stored in the main memory. The process of step S42 is performed, following step S41.

In step S42, the CPU 10 determines whether the terminal device 7 is currently in the horizontal state. Specifically, the CPU 10 reads out the terminal state data 99 from the main memory, and determines whether the terminal state data 99 represents the horizontal state. If the determination result of step S42 is affirmative, i.e., if the terminal device 7 is in the horizontal state, the process of step S43 is performed. On the other hand, if the determination result of step S42 is negative, i.e., if the terminal device 7 is in the vertical state, the process of step S45 is performed.

In step S43, the CPU 10 determines whether the vertical direction component y1 of the screen direction vector V1 is greater than a predetermined first threshold T1. FIG. 21 is a diagram showing the terminal device 7 where the terminal device 7 is in the horizontal state. In FIG. 21, the angle θ is an angle between the screen direction vector V1 and the vertically downward direction. The first reference vector TV1 is a vector to be the reference for determining whether the terminal device 7 has been brought into the vertical state (from the horizontal state), and the angle θ1 is an angle between the first reference vector TV1 and the vertically downward direction. The first threshold T1 is a vertical direction component of the first reference vector TV1. For example, the first threshold T1 is determined so that the angle θ1 is 60°. Herein, the y' axis representing the vertical direction in the game space is set so that the positive direction thereof is the upward direction.

As is clear from FIG. 21, the vertical direction component y1 of the screen direction vector V1 becoming greater than the first threshold T1 means the angle θ between the screen direction vector V1 and the vertically downward direction becoming greater than the angle θ1 between the first reference vector TV1 and the vertically downward direction. That is, the vertical direction component y1 of the screen direction vector V1 becoming greater than the first threshold T1 means the attitude of the terminal device 7 becoming closer to being vertical than the reference represented by the first reference vector TV1. Thus, it is possible, with the determination of step S43, to determine whether the attitude of the terminal device 7 is closer to being vertical than the reference represented by the first reference vector TV1.

As a specific process of step S43, the CPU 10 reads out data representing the vertical direction component y1 of the screen direction vector V1 and the first threshold data 104 from the main memory, and determines whether the vertical direction component y1 is greater than the first threshold T1. If the determination result of step S43 is affirmative, the process of step S44 is performed. On the other hand, if the determination result of step S43 is negative, the CPU 10 ends the state determination process.

In step S44, the CPU 10 sets (changes) the state of the terminal device 7 to the vertical state. Specifically, data representing the vertical state is stored in the main memory as the terminal state data 99. After step S44, the CPU 10 ends the state determination process.

On the other hand, in step S45, the CPU 10 determines whether the vertical direction component y1 of the screen direction vector V1 is smaller than a predetermined second threshold T2. FIG. 22 is a diagram showing the terminal device 7 where the terminal device 7 is in the vertical state. In FIG. 22, the second reference vector TV2 is a vector to be the reference for determining whether the terminal device 7 has been brought into the horizontal state (from the vertical state), and the angle θ2 is an angle between the second reference vector TV2 and the vertically downward direction. The second threshold T2 is a vertical direction component of the second reference vector TV2. The second threshold T2 is set to a value smaller than the first threshold T1. That is, the second reference vector TV2 represents an attitude closer to being horizontal than the first reference vector TV1. For example, the second threshold T2 is determined so that the angle θ2 is 45°.

As is clear from FIG. 21, the vertical direction component y1 of the screen direction vector V1 becoming smaller than the second threshold T2 means the angle θ between the screen direction vector V1 and the vertically downward direction becoming smaller than the angle θ2 between the second reference vector TV2 and the vertically downward direction. That is, the vertical direction component y1 of the screen direction vector V1 becoming smaller than the second threshold T2 means the attitude of the terminal device 7 becoming closer to being horizontal than the reference represented by the second reference vector TV2. Therefore, it is possible, with the determination of step S45, to determine whether the attitude of the terminal device 7 is closer to being horizontal than the reference represented by the second reference vector TV2.

As a specific process of step S45, the CPU 10 reads out data representing the vertical direction component y1 of the screen direction vector V1 and the second threshold data 105 from the main memory, and determines whether the vertical direction component y1 is smaller than the second threshold T2. If the determination result of step S45 is affirmative, the process of step S46 is performed. On the other hand, if the determination result of step S45 is negative, the CPU 10 ends the state determination process.

In step S46, the CPU 10 sets (changes) the state of the terminal device 7 to the horizontal state. Specifically, data representing the horizontal state is stored in the main memory as the terminal state data 99. After step S46, the CPU 10 ends the state determination process.

With the state determination process described above, the determination is performed by using the first threshold T1 (step S43) where the terminal device 7 is in the horizontal state, and the determination is performed by using the second threshold T2 which represents an attitude closer to being horizontal than the first threshold T1 (step S45) where the terminal device 7 is in the vertical state. That is, in the state determination process, if it is determined that the terminal device 7 is in the vertical state, the threshold representing the reference for determining whether the terminal device 7 is in the horizontal state or in the vertical state is changed to the first threshold which represents an attitude closer to being horizontal, whereas if it is determined that the terminal device 7 is in the horizontal state, the threshold representing the reference is changed to the second threshold which represents an attitude closer to being vertical. Therefore, in the present embodiment, once the terminal device 7 transitions from one state to the other, the terminal device 7 is prevented from going back to the old state due to slight attitude changes after the transition.

If the first threshold T1 and the second threshold T2 are set to the same value, when the attitude of the terminal device 7 moves around near the angle represented by the thresholds, the terminal device 7 will frequently switch back and forth between the horizontal state and the vertical state, thereby frequently switching terminal game images back and forth. In contrast, with the state determination process described above, by using two different thresholds, it is possible to prevent the frequent switching between the horizontal state and the vertical state.

In the present embodiment, it is possible to change the viewing direction of the subjective virtual camera, and change the shooting direction, in accordance with the attitude of the terminal device 7, the details of which will be described below. In the state determination process described above, when the terminal device 7 is held in the vertical state, the determination is made using the second threshold T2 representing a reference closer to being horizontal, and the player is therefore able to direct the terminal device 7 in a more downward direction. That is, it is possible to increase the range across which the viewing direction of the subjective virtual camera can be moved, and to shoot across a wider range.

In the state determination process described above, the CPU 10 determines whether the terminal device 7 is in the horizontal state or in the vertical state, using the vertical direction component of the screen direction vector. Then, it is possible to perform the determination with a simple calculation. In other embodiments, the determination may be performed by comparing the angle θ with the angles θ1 and θ2 or by comparing the screen direction vector with the reference vectors. While the determination is performed using the attitude of the terminal device 7 itself in the present embodiment, the determination may be performed by using the attitude of the subjective virtual camera which corresponds to the attitude of the terminal device 7. That is, the determination may be performed by using a vector that represents the viewing direction of the subjective virtual camera, instead of the screen direction vector. It should be noted that in this case, the CPU 10 calculates the attitude of the subjective virtual camera, irrespective of the state of the terminal device 7.

Referring back to FIG. 18, the process of step S13 is performed, following the state determination process of step S12. In step S13, the CPU 10 determines whether the terminal device 7 is in the horizontal state. The determination process of step S13 is similar to the determination process of step S42 described above. If the determination result of step S13 is affirmative, i.e., if the terminal device 7 is in the horizontal state, the process of step S14 is performed. On the other hand, if the determination result of step S13 is negative, i.e., if the terminal device 7 is in the vertical state, the process of step S17 is performed.

In step S14, the CPU 10 controls the player object 81 based on the terminal operation data. While the method for moving the player object 81 may be any method, the movement of the player object 81 is controlled based on the first movement method in the present embodiment. The first movement method is a movement method in which the direction of the player object 81 in the game space changes in accordance with the direction input on the analog stick 53 of the terminal device 7. Specifically, the player object 81 moves in a direction based on the viewing direction of the objective virtual camera and the direction input, facing in that direction. For example, the player object 81 faces and moves in the viewing direction of the objective virtual camera (i.e., the front direction of the game space displayed in the television game image) in response to an input on the analog stick 53 in the straight up direction, and the player object 81 faces and moves in the rightward direction with respect to the viewing direction of the objective virtual camera in response to an input on the analog stick 53 in the rightward direction. The objective virtual camera moves so as to follow the player object 81. As described above, the present embodiment employs a movement method in which the direction of the player object 81 changes in accordance with the direction input on the terminal device 7 when the terminal device 7 is in the horizontal state.

As a specific process of step S14, the CPU 10 reads out the player data 100 from the main memory, and calculates the position and direction of the player object 81 after the movement based on the terminal operation data 91 obtained in step S2 and the player data 100. Then, data representing the calculated position and direction after the movement is newly stored in the main memory as the player data 100. The process of step S15 is performed, following step S14.

In step S15, the CPU 10 sets an objective virtual camera. The objective virtual camera may be set in any manner as long as it is set so that the player object 81 is included in the viewing field range. In the present embodiment, the objective virtual camera is set at a position that is behind the player object 81 by a predetermined distance so as to follow the position and direction of the player object 81. In the present embodiment, the objective virtual camera is controlled so as to follow the movement of the player object 81 as if it were dragged around by the player object 81, so as to prevent the viewing direction of the objective virtual camera from changing abruptly. That is, the objective virtual camera is set at a predetermined distance from the player object 81 and in a direction such that the objective virtual camera follows the direction of the player object 81 with a delay. Specifically, the CPU 10 reads out the player data 100 from the main memory, and calculates the position and direction of the objective virtual camera. Then, data representing the calculated position and direction is stored in the main memory as the objective camera data 101. The process of step S16 is performed, following step S15.

In step S16, the CPU 10 sets the overhead virtual camera. As described above, the overhead virtual camera is a virtual camera for generating an image showing the game space as viewed from above. The position of the overhead virtual camera is determined based on the position of the player object 81. For example, the overhead virtual camera is set at a position that is apart from the position of the player object 81 in the vertically upward direction by a predetermined distance. The direction of the overhead virtual camera is set to be a predetermined direction (herein, the vertically downward direction). In a case where the entire map can be contained within the screen, the position of the overhead virtual camera may be fixed. The upward direction of the screen may be set so that, for example, a predetermined direction in the virtual space (e.g., north) is the upward direction of the screen, or it may change in accordance with the direction of the player object 81. The CPU 10 reads out the player data 100 from the main memory, and calculates the position of the overhead virtual camera based on the position of the player object 81. Then, data representing the calculated position and the predetermined direction is stored in the main memory as the overhead camera data 103. The process of step S23 to be described later is performed, following step S16.

On the other hand, in step S17, the CPU 10 controls the player object 81 based on the terminal operation data. While the method for moving the player object 81 in the process of step S16 may be any method, the movement of the player object 81 is controlled based on the second movement method, which is different from the first movement method of step S14 described above, in the present embodiment. The second movement method is a movement method in which the direction of the player object 81 in the game space is fixed, and the player object 81 translates without changing the direction thereof. Specifically, the player object 81 moves forward, backward, left or right in accordance with the up, down, left or right direction input on the analog stick 53, without changing the direction thereof from the point in time when the terminal device 7 was brought into the vertical state. In embodiments in which the direction of the subjective virtual camera at the point in time when the terminal device 7 is brought into the vertical state is set in accordance with the camera 82 at that point, if the direction of the player object 81 is not equal to the direction of the camera 82 at the point in time when the terminal device 7 is brought into the vertical state, the direction of the player character may be matched with the direction of the camera 82 at that point. As described above, the present embodiment employs a movement method suitable for a shooting operation in which the player object 81 translates without changing the direction thereof when the terminal device 7 is in the vertical state.

As a specific process of step S17, the CPU 10 reads out the player data 100 from the main memory, and calculates the position of the player object 81 after the movement based on the terminal operation data 91 obtained in step S2 and the player data 100. Then, the contents of the player data 100 are updated so as to represent the calculated position after the movement. The process of step S18 is performed, following step S17.

With the process of steps S14 and S17, the CPU 10 uses different operation methods for a predetermined object (the player object 81) when the attitude of the terminal device 7 is in the horizontal state and when it is in the vertical state. That is, in the horizontal state, the player primarily performs move operations while looking at the image of the game space displayed on the television 2 and the map image displayed on the terminal device 7, and therefore an operation method suitable for movement is employed. On the other hand, in the vertical state, the player primarily performs shooting operations while looking at the image of the game space displayed on the terminal device 7, and therefore an operation method suitable for shooting is employed. Thus, with the present embodiment, it is possible to present, to the player, suitable operation methods in accordance with the game image displayed on the terminal device 7, thus improving the controllability of the terminal device 7.

In step S18, the CPU 10 sets an objective virtual camera. The process of setting the objective virtual camera in step S18 is similar to the process of step S15. When the terminal device 7 is in the vertical state, the direction of the player object 81 does not change, and therefore the viewing direction of the objective virtual camera is also fixed. When the terminal device 7 is in the vertical state, the player object 81 translates, and the objective virtual camera therefore translates in accordance with the translation of the player object 81. Thus, in the present embodiment, if the terminal device 7 returns to the horizontal state after transitioning from the horizontal state to the vertical state, the viewing direction in the television game image does not change before and after the vertical state. In the present embodiment, there may be a situation where the player holds the terminal device 7 in the vertical state and performs a game operation such as the shooting operation while looking at the terminal game image, and then puts the terminal device 7 back in the horizontal state and looks again at the television game image. Even in such a situation, in the present embodiment, the viewing direction in the television game image does not change before and after the vertical state, and therefore the player can perform game operations without getting confused not knowing which direction the viewing direction is facing. The process of step S19 is performed, following step S18.

In step S19, the CPU 10 sets a subjective virtual camera. The method for calculating the attitude of the subjective virtual camera may be any method as long as the attitude of the subjective virtual camera changes in accordance with the attitude of the terminal device 7. In the present embodiment, the attitude of the subjective virtual camera in the virtual game space is controlled so as to correspond to the attitude of the terminal device 7 in the real space (see FIG. 23). Specifically, the subjective virtual camera is set at a position dictated by the player object 81 and in an attitude in accordance with the attitude of the terminal device 7. The method for setting the subjective virtual camera will now be described with reference to FIG. 23.

Figure 23:
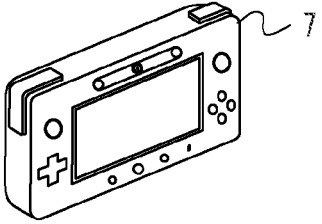
FIG. 23 is a diagram showing an example relationship between the attitude of the terminal device 7, the arrangement of the subjective virtual camera, and the posture of the player object.
Figure 23:
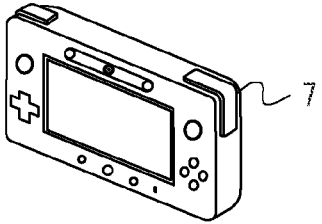
Figure 23:
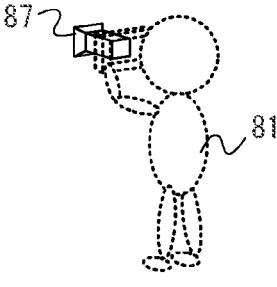
Figure 23:
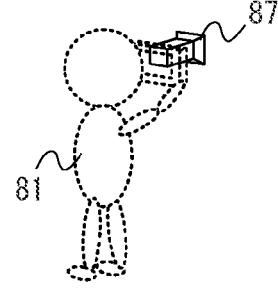
Figure 23:
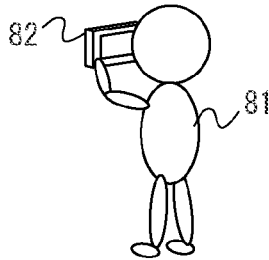
Figure 23:
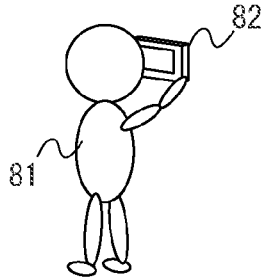

FIG. 23 is a diagram showing the relationship between the attitude of the terminal device 7, the arrangement of the subjective virtual camera, and the posture of the player object. The left column of the table shown in FIG. 23 shows the state at the point in time when the terminal device 7 is brought into the vertical state (this will be referred to as the reference state). As shown in FIG. 23, in the present embodiment, a subjective virtual camera 87 is set at the position of the camera 82. Since the player object 81 is assuming a posture in which the camera 82 is held up near the head, it is possible to generate an image in subjective perspective by setting the subjective virtual camera 87 at the position of the camera 82. At the point in time when the reference state is achieved, the subjective virtual camera 87 is set so that the viewing direction thereof is equal to that of the objective virtual camera with respect to the yaw direction (the rotation direction about an axis extending in the vertical direction). With respect to the roll direction and the pitch direction, the subjective virtual camera 87 is set to be in an attitude in accordance with the attitude of the terminal device 7. The attitude of the subjective virtual camera is set so that the viewing direction of the subjective virtual camera corresponds to an axis perpendicular to the screen of the LCD 51 (the z axis shown in FIG. 8).

The right column of the table shown in FIG. 23 shows another state achieved by rotating the terminal device 7 to the right from the reference state. The subjective virtual camera 87 is in an attitude obtained by turning the viewing direction to the right from the attitude in the reference state by the same amount as the amount of rotation of the terminal device 7 (see the middle section of the right column of the table shown in FIG. 23). That is, after the attitude in the reference state is set, the subjective virtual camera 87 is rotated, from the attitude in the reference state, in a direction in accordance with the direction of change of the attitude of the terminal device 7 and by an amount in accordance with the amount of change thereof.

As described above, in the present embodiment, when the terminal device 7 is in the vertical state, the subjective virtual camera is controlled so as to assume an attitude in accordance with the attitude of the terminal device 7. In the present embodiment, it is possible to change the shooting direction by changing the direction of the subjective virtual camera. Therefore, the player can change the shooting direction by changing the direction of the subjective virtual camera in accordance with the attitude of the terminal device 7, thus allowing the player to easily and quickly change the shooting direction.

In the present embodiment, at the point in time when the terminal device 7 transitions from the horizontal state to the vertical state, the attitude of the subjective virtual camera is set so that the viewing direction of the objective virtual camera and the viewing direction of the subjective virtual camera are equal to each other with respect to the yaw direction. Therefore, immediately after the terminal device 7 is put in the vertical state, the viewing direction of the television game image generated by using the objective virtual camera is equal to that of the terminal game image generated by using the subjective virtual camera. Therefore, with the present embodiment, even immediately after the terminal device 7 is put in the vertical state, the player can easily grasp the viewing direction of the terminal game image, and it is possible to provide a game image that is easy to view and easy to operate on. In other embodiments, the viewing direction of the subjective virtual camera immediately after the terminal device 7 is put in the vertical state may be a different direction. For example, in other embodiments, the viewing direction of the subjective virtual camera immediately after the terminal device 7 is put in the vertical state may be controlled so as to be in the front direction of the player object 81. For example, where it is possible to select an object to be the shooting target (to lock the shooting target), the viewing direction of the subjective virtual camera immediately after the terminal device 7 is put in the vertical state may be controlled so as to be toward the selected object.

As a specific process of step S19, the CPU 10 reads out the terminal attitude data 98 and the player data 100 from the main memory, and calculates the position of the camera 82 dictated by the position of the player object 81 and the attitude of the subjective virtual camera. Immediately after the terminal device 7 transitions from the horizontal state to the vertical state, the CPU 10 further reads out the objective camera data 101 from the main memory, and calculates the attitude of the subjective virtual camera based on the attitude of the terminal device 7 and the attitude of the objective virtual camera. Then, the CPU 10 stores the data representing the calculated position and attitude in the main memory as the subjective camera data 102. The process of step S20 is performed, following step S19.

In step S20, the CPU 10 controls the posture of the player object 81 in accordance with the attitude of the terminal device 7. Specifically, the posture of the player object 81 is controlled so that the attitude of the camera 82 held by the player object 81 is an attitude in accordance with the attitude of the terminal device 7. As shown in FIG. 23, in the reference state, the player object 81 assumes a posture in which the camera 82 is held up so that the camera 82 faces in the front direction of the player object 81 with respect to the yaw direction (see the bottom section of the left column of the table shown in FIG. 23). The posture of the player object 81 is controlled so that the camera 82 assumes an attitude in accordance with the attitude of the terminal device 7 with respect to the pitch direction and the roll direction.

On the other hand, after the attitude of the camera 82 in the reference state is set, the posture of the player object 81 is controlled so that the attitude of the camera 82 is changed, from the attitude of the camera 82 in the reference state, in a direction in accordance with the direction of change of the attitude of the terminal device 7 and by an amount in accordance with the amount of change thereof. For example, as shown in FIG. 23, when the terminal device 7 is rotated to the right from the reference state, the player object 81 assumes a posture in which the camera 82 is turned to the right from the reference state in accordance with the attitude of the terminal device 7. In the present embodiment, when the terminal device 7 is in the vertical state, the player object 81 changes its posture by changing only the direction of the upper body without changing the direction of the feet (the lower body).

As a specific process of step S20, the CPU 10 reads out the terminal attitude data 98 from the main memory, and calculates the posture of the player object 81 (the attitude of the camera 82) based on the attitude of the terminal device 7. Then, the contents of the player data 100 are updated so as to represent the calculated posture. The process of step S21 is performed, following the process of step S20.

In step S21, the CPU 10 determines whether a shooting operation has been performed. The shooting operation is an operation of making the player object 81 execute a shooting action, and is an operation of pressing a predetermined button (herein, the first R button 54J), for example. Specifically, the CPU 10 determines whether the predetermined button has been pressed by referencing the operation button data 95 obtained in step S2. If the determination result of step S21 is affirmative, the process of step S22 is performed. On the other hand, if the determination result of step S21 is negative, the process of step S23 is performed, skipping the process of step S22.

In step S22, the CPU 10 makes the player object 81 execute a shooting action. Specifically, the CPU 10 makes the player object 81 execute an operation of firing a bullet or a beam in the viewing direction of the subjective virtual camera from the position of the player object 81 (e.g., the position of the camera 82). Thus, the player object 81 executes a shooting action at the position pointed by the reticle image 86. The process of step S23 is performed, following step S22.

As described above, in the present embodiment, when the attitude of the terminal device 7 is in the vertical state, the CPU 10 performs a game process (the shooting process in step S22), which cannot be performed when the attitude of the terminal device 7 is in the horizontal state, in response to an operation on the terminal device 7. Thus, the player puts the terminal device 7 in the vertical state in order to perform a specific game operation, and it is therefore possible to motivate the player to change the attitude of the terminal device 7. That is, it is possible to provide a novel game operation of dynamically switching between terminal game images during a game by changing the attitude of the terminal device 7.

In step S23, the CPU 10 performs other game progress processes. Other game progress processes are those performed in the game control process of step S3, other than the processes of steps S11 to S22. The above and other game progress processes include, for example, the process of controlling the action of the enemy object 85, the process of determining whether a bullet or a beam fired in the shooting action has hit the enemy object 85, etc. Processes for allowing the game to progress, other than those described above are performed in step S23 as necessary. The CPU 10 ends the game control process after step S23.

Referring back to FIG. 17, the process of step S4 is performed following the game control process of step S3. In step S4, the CPU 10 and the GPU 11*b* generate a television game image to be displayed on the television 2 based on the game control process described above. That is, the CPU 10 and the GPU 11*b* read out data representing the results of the game control process of step S3 from the main memory, and read out data used for generating the game image from the VRAM 11*d*, to generate the television game image. In the present embodiment, an image representing the game space is generated by using the objective virtual camera which is set so that the player object 81 is included in the display range. In this process, the television game image is generated while the enemy object 85 is made invisible. The generated television game image is stored in the VRAM 11*d*. The process of step S5 is performed, following step S4.

In step S5, the terminal game image generation process is performed. In the terminal game image generation process, terminal game images are generated based on game processes so that the game images are switched from one to another in accordance with the attitude of the terminal device 7. The details of the terminal game image generation process will now be described with reference to FIG. 24.

Figure 24:
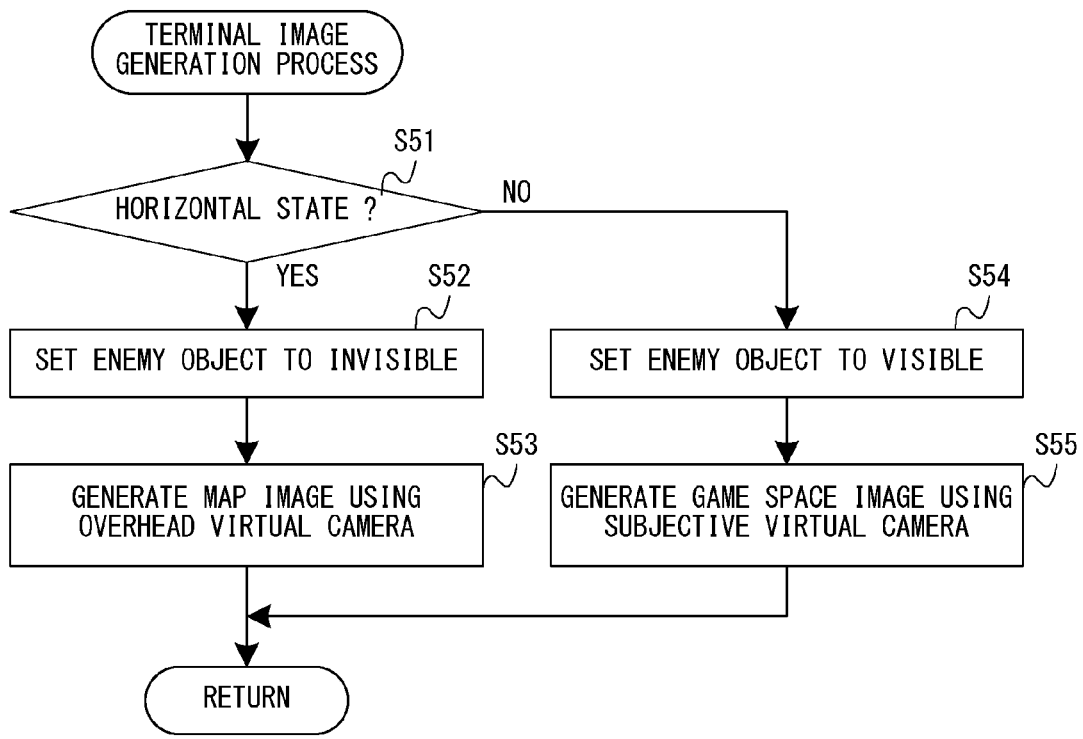
FIG. 24 is a flow chart showing an example detailed flow of a terminal game image generation process (step S5) shown in FIG. 17.

FIG. 24 is a flow chart showing the detailed flow of the terminal game image generation process (step S5) shown in FIG. 17. In the terminal game image generation process, first, in step S51, the CPU 10 determines whether the terminal device 7 is in the horizontal state. The determination process of step S51 is similar to the determination process of step S42 described above. If the determination result of step S51 is affirmative, i.e., if the terminal device 7 is in the horizontal state, the process of step S52 is performed. On the other hand, if the determination result of step S51 is negative, i.e., if the terminal device 7 is in the vertical state, the process of step S54 is performed.

In step S52, the CPU 10 sets the enemy object 85 to "invisible". Specifically, the CPU 10 sets a flag indicating whether the enemy object 85 is "visible" or "invisible" to a flag value that indicates "invisible", and stores the flag data representing this flag value in the main memory. The process of step S53 is performed, following step S52.

In step S53, the CPU 10 and the GPU 11*b* generate a map image using the overhead virtual camera. That is, the CPU 10 and the GPU 11*b* read out data representing the results of the game control process of step S3 (including the flag data described above) from the main memory, and reads out data used for generating game images from the VRAM 11*d*, to generate the terminal game image. In step S53, the terminal game image is generated using the overhead virtual camera described above. Therefore, in step S53, an image showing the game space as viewed from above (map image) is generated. Since the flag data indicates "invisible", the terminal game image is generated in step S53 while the enemy object 85 and the shadow 83 are made invisible. The terminal game image generated as described above is stored in the VRAM 11*d*. After step S53, the CPU 10 ends the terminal game image generation process.

On the other hand, in step S54, the CPU 10 sets the enemy object 85 to "visible". Specifically, the CPU 10 sets a flag indicating whether the enemy object 85 is "visible" or "invisible" to a flag value that indicates "visible", and stores the flag data representing the flag value in the main memory. The process of step S55 is performed, following step S54.

In step S55, the CPU 10 and the GPU 11*b* generate the map image using the subjective virtual camera. That is, the CPU 10 and the GPU 11*b* read out data representing the results of the game control process of step S3 (including the flag data described above) from the main memory, and reads out data used for generating the game image from the VRAM 11*d*, to generate the terminal game image.

In step S55, the terminal game image is generated by using the subjective virtual camera which is set at the position of the viewpoint of the player object. Therefore, in step S55, the terminal game image is an image representing the game space in so-called "subjective perspective". Thus, the terminal game image is an image that represents the game space and is different from the television game image (the game image of the objective perspective). In step S55, since the flag data indicates "visible", the terminal game image is generated while the enemy object 85 and the shadow 83 are made visible. That is, when the attitude of the terminal device 7 is in the vertical state, the terminal game image is generated so as to be displayed in a different manner, regarding the enemy object 85, from that for the television game image. The reticle image 86 (see FIG. 15) described above is added at the center of the terminal game image. The terminal game image generated as described above is stored in the VRAM 11*d*. After step S55, the CPU 10 ends the terminal game image generation process.

As in step S55 described above, in the present embodiment, the predetermined object (the enemy object 85) is displayed in different manners on two display devices. Therefore, it is possible to motivate the player to change the attitude of the terminal device 7 and look at the screen of the terminal device 7. That is, with the present embodiment, the player can perform a novel game operation of dynamically switching between terminal game images by changing the attitude of the terminal device 7.

In the present embodiment, the enemy object 85 is displayed in different manners on two display devices, wherein the enemy object 85 is not displayed on the television 2 while the enemy object 85 is displayed on the terminal device 7. In other embodiments, the enemy object 85 may be displayed in different manners by other methods. For example, in other embodiments, the enemy object 85 may be displayed in different colors or in different shapes on the television 2 and on the terminal device 7. Specifically, in a game that is played by multiple players, the enemy object 85 may be displayed as it is on the terminal device 7 while the enemy object 85 is displayed so that it looks like another player object (a teammate object) on the television 2. Then, it is possible to provide a game with high playability, in which the player can hold the terminal device 7 in the vertical state to thereby reveal the enemy object 85.

In step S55, black-and-white game images may be generated for the sake of an atmosphere in the game, or the like. The terminal game image may be enlarged/shrunk in accordance with game operations by the player, for example, so that the player can perform a shooting operation with a higher precision.

Referring back to FIG. 17, in step S6, the CPU 10 outputs the game image to the television 2. Specifically, the CPU 10 sends data of the television game image stored in the VRAM 11*d* to the AV-IC 15. In response to this, the AV-IC 15 outputs data of the television game image to the television 2 via the AV connector 16. Thus, the television game image is displayed on the television 2. In step S6, the game sound data may be output to the television 2, together with the game image data, so that the game sound is output from the speaker 2*a* of the television 2. The process of step S7 is performed, following step S6.

In step S7, the CPU 10 transmits the game image to the terminal device 7. Specifically, image data of the terminal game image stored in the VRAM 11d is sent to the codec LSI 27 by the CPU 10, and a predetermined compression process is performed by the codec LSI 27. The compressed image data is transmitted to the terminal device 7 by the terminal communication module 28 via the antenna 29. The terminal device 7 receives image data transmitted from the game device 3 by means of the wireless module 70, and a predetermined expansion process is performed on the received image data by the codec LSI 66. The extracted image data is outputted to the LCD 51. Thus, the terminal game image is displayed on the LCD 51. In step S7, game sound data may be transmitted to the terminal device 7, together with game image data, so that the game sound is output from the speaker 67 of the terminal device 7. The process of step S8 is performed, following step S7.

In step S8, the CPU 10 determines whether the game should be ended. The determination of step S8 is made based on, for example, whether the game is over (the player object 81 has been caught by the enemy object 85), or whether the player has given an instruction to quit the game, etc. If the determination result of step S8 is negative, the process of step S2 is performed again. If the determination result of step S8 is affirmative, the CPU 10 ends the game process shown in FIG. 17. Thereafter, the series of processes through steps S2 to S8 is repeatedly performed until it is determined in step S8 that the game should be ended.

With the game process described above, game images to be displayed on two display devices (the television 2 and the terminal device 7) are generated based on operations on the terminal device 7 (steps S2 to S5). Therefore, the player can perform operations on different game images with a single controller device (the terminal device 7). That is, the player can easily perform game operations on different game images displayed on the two display devices without performing the troublesome operation of switching between controller devices.

With the game processes described above, the terminal game images to be displayed on the terminal device 7 are switched from one to another in accordance with the attitude of the terminal device 7. Then, the player can dynamically switch between the terminal game images by changing the attitude of the terminal device 7 during a game operation using the terminal device 7. Thus, the player can play the game while making effective use of the two display devices. The player can play the game by a novel method of dynamically switching between terminal game images and, accordingly, dynamically switching between the screen of the television 2 and the screen of the terminal device 7 as the object to look at.

[7. Variations]

The embodiment above is illustrative, and the present embodiment can be implemented with the following configurations, for example, in other embodiments.

(Variation Regarding Switching Between Terminal Game Images)

In the embodiment above, the game device 3 switches between terminal game images in accordance with the attitude of the terminal device 7. In other embodiments, it is not always necessary to switch between terminal game images. For example, in other embodiments, a game image fixed in subjective perspective may be displayed on the terminal device 7. In other embodiments, nothing may be displayed on the terminal device 7 when the terminal device 7 is in the horizontal state.

Even if terminal game images are not switched from one to another, the following advantages are obtained by employing a configuration where a game process that cannot be performed when the attitude of the terminal device 7 is in the horizontal state is performed in response to an operation on the game space represented by the terminal game image when the attitude of the terminal device 7 is in the vertical state. That is, with such a configuration, the player can use an operation method of playing the game while primarily looking at the television 2 by holding the terminal device 7 in the horizontal state, and another operation method of playing the game while primarily looking at the terminal device 7 by holding the terminal device 7 in the vertical state, and the player can easily switch between these two different operation methods by changing the attitude of the terminal device 7. Therefore, the player can perform a novel game operation of playing a game with two different operation methods while dynamically switching between screens to look at between those of two display devices during the game, and it is thus possible to provide a game with higher playability.

(Variation Regarding Game Images Displayed on Two Display Devices)

While the game device 3 generates different images for the television game image and for the terminal game image in the embodiment above, the same image may be used for the television game image and for the terminal game image when the terminal device 7 is in a predetermined state (one of the horizontal state and the vertical state) in other embodiments. For example, in the embodiment above, the same subjective perspective (or objective perspective) game image may be displayed on the television 2 and on the terminal device 7 when the terminal device 7 is in the vertical state. Where images are generated by using the same virtual camera for the television game image and for the terminal game image, the terminal game image may be generated by using the television game image so as to increase the efficiency in the image generation process. That is, the CPU 10 and the GPU 11b may use an image in which the enemy object 85 is not rendered as the television game image, and may use another image obtained by adding the enemy object 85 to the first image as the terminal game image.

(Variation Regarding Operation on Attitude of Terminal Device for Switching Between Game Images)

In the embodiment above, terminal game images are switched from one to another by changing the attitude of the terminal device 7 between the horizontal state and the vertical state. In other embodiments, the switching between terminal game images may be done by another method. For example, terminal game images may be switched from one to another between the landscape attitude of the terminal device 7 (an attitude where the y axis shown in FIG. 8 extends in the vertical direction) and the portrait attitude of the terminal device 7 (an attitude where the x axis shown in FIG. 8 extends in the vertical direction). Where a vertically-orientated game image and a horizontally-oriented game image are displayed on the terminal device 7, the horizontally-oriented game image may be displayed thereon when the terminal device 7 is in the landscape attitude and the vertically-orientated game image may be displayed thereon when the terminal device 7 is in the portrait attitude.

(Variation Regarding Switching Between Operations)

In the embodiment above, the method of operation on a predetermined object in the game space (the player object 81) is changed in accordance with the attitude of the terminal device 7. In other embodiments, the game device 3 does not need to change the method of operation in accordance with the attitude of the terminal device 7. In other embodiments, the game device 3 may change the assignment between the operation on the terminal device 7 and the game process to be performed in response to the operation, in accordance with the attitude of the terminal device 7. For example, in other embodiments, a game process of moving the cursor on the map image in accordance with the direction input on the analog stick 53 may be performed when the terminal device 7 is in the horizontal state, whereas a game process of moving the player object 81 in the game space in accordance with the direction input on the analog stick 53 may be performed when the terminal device 7 is in the vertical state.

In the embodiment above, there are two different states (the horizontal state and the vertical state) which the terminal device 7 can assume, and terminal game images are switched from one to another in accordance with the state of the terminal device 7. In other embodiments, there may be three or more different states which the terminal device 7 can assume, and terminal game images may be switched from one to another in accordance with the state of the terminal device 7.

(Variation Regarding Contents of Game)

While a game in which the player object 81 attempts to eliminate the enemy object 85 is described in the embodiment above, the contents of the game may be of any kind in other embodiments. For example, another game example using the game system 1 is a game in which the player shoots enemies while hiding behind objects. In this case, when the terminal device 7 is held in the horizontal state, an item screen is displayed on the terminal device 7, and the player object is hid behind an object. On the other hand, when the terminal device 7 is held in the vertical state, an image showing the game space in subjective perspective, or the like, is displayed on the terminal device 7, and the player object comes out of the object to execute a shooting action. An image showing the game space in objective perspective, for example, may be displayed on the television 2. The embodiment above is also applicable to the game described above.

(Variation Regarding Configuration of Game System)

In the embodiment above, the game system 1 has a configuration including the terminal device 7, which functions as a controller device, the controller 5, and the game device 3 for performing the game processes. Herein, the game system may have any configuration as long as it includes a controller device (the terminal device 7), and a game device for performing game processes based on operations on the controller device. For example, in other embodiments, the game system 1 may have a configuration without the controller 5. Where the game system 1 includes the controller 5, a multi-player game may be played, in which one player uses the terminal device 7 and another player uses the controller 5. In this case, a plurality of terminal devices 7 may be used, and a plurality of controllers 5 may be used.

(Variation Regarding Information Processing Device Performing Game Process)

While the series of game processes of the game system 1 is performed by the game device 3 in the embodiment above, some of the game processes may be performed by another device. For example, in other embodiments, some of the game processes (e.g., the process of generating the terminal game image) may be performed by the terminal device 7. In other embodiments, in a game system that includes a plurality of information processing devices that can communicate with each other, the game processes may be divided among the plurality of information processing devices. Where game processes are performed by a plurality of information processing devices, the game processes will be complicated because game processes to be performed by different information processing devices are synchronized together. In contrast, where game processes are performed by a single game device, wherein the terminal device 7 is responsible for the process of receiving and displaying game images, as in the present embodiment, there is no need to synchronize the game processes between a plurality of information processing devices, and it is therefore possible to simplify the game processes.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

The embodiment above is applicable, for example, to game systems, game devices, game programs, etc., with the aim of, for example, allowing the player to easily perform game operations on different game images displayed on two display devices.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A game system including a game device, and a controller device capable of communicating with the game device,
   the game device being configured at least to:
   obtain operation data representing an operation on the controller device;
   perform a game process based on the operation data;
   generate a first game image based on the game process;
   generate a second game image based on the game process;
   output the first game image to a predetermined display device separate from the controller device; and wirelessly transmit the second game image to the controller device, the controller device comprising an inertia sensor and being configured at least to:
receive the second game image;
display the second game image in a display device;
transmit the operation data, including data output from the inertia sensor, to the game device, wherein:

the game device is further configured to calculate an attitude of the controller device based on the data output from the inertia sensor;

the game device is further configured to generate a third game image or a fourth game image, as the second game image, and switch between the third game image and the fourth game image in accordance with whether the attitude of the controller device is in a predetermined first state or in a second state different from the first state;

the game device is further configured to determine that the attitude of the controller device is in the first state when an attitude of a screen of the display device is in a vertical state, and in the second state when the attitude of the screen of the display device is in a horizontal state; and an axis extending perpendicular to the screen of the display device points in a first direction when the attitude of the screen of the display device is in the vertical state and the axis extending perpendicular to the screen of the display device points in a second direction when the attitude of the screen of the display device is in the horizontal state, the first and second directions being perpendicular to each other.

2. A game system including a game device, and a controller device capable of communicating with the game device,
the game device being configured at least to:
obtain operation data representing an operation on the controller device;
perform a game process based on the operation data;
generate a first game image based on the game process;
generate a second game image based on the game process;
output the first game image to a predetermined display device separate from the controller device; and
wirelessly transmit the second game image to the controller device, the controller device comprising an inertia sensor and being configured at least to:
receive the second game image;
display the second game image in a display device;
transmit the operation data, including data output from the inertia sensor, to the game device, wherein:
the game device is further configured to calculate an attitude of the controller device based on the data output from the inertia sensor;
the game device is further configured to generate a third game image or a fourth game image, as the second game image, and switch between the third game image and the fourth game image in accordance with whether the attitude of the controller device is in a predetermined first state or in a second state different from the first state; and
the game device is further configured to determine that the attitude of the controller device is in the first state when an attitude of a screen of the display device is closer to being vertical than a predetermined reference attitude, and in the second state when the attitude of the screen of the display device is closer to being horizontal than the predetermined reference attitude;
wherein if it is determined that the controller device is in the first state, the predetermined reference attitude is changed to another attitude closer to being horizontal, and if it is determined that the controller device is in the second state, the predetermined reference attitude is changed to another attitude closer to being vertical.

3. The game system according to claim 1, wherein:
the first game image is generated representing a game space; and
the third game image is generated which represents the game space and is different from the first game image when the attitude of the controller device is in the first state, and the fourth image different from the third image is generated when the attitude of the controller device is in the second state.

4. A game system including a game device, and a controller device capable of communicating with the game device,
the game device being configured at least to:
obtain operation data representing an operation on the controller device;
perform a game process based on the operation data;
generate a first game image based on the game process;
generate a second game image based on the game process;
output the first game image to a predetermined display device separate from the controller device; and
wirelessly transmit the second game image to the controller device, the controller device comprising an inertia sensor and being configured at least to:
receive the second game image;
display the second game image in a display device;
transmit the operation data, including data output from the inertia sensor, to the game device, wherein:
the game device is further configured to calculate an attitude of the controller device based on the data output from the inertia sensor;
the game device is further configured to generate a third game image or a fourth game image, as the second game image, and switch between the third game image and the fourth game image in accordance with whether the attitude of the controller device is in a predetermined first state or in a second state different from the first state;
the game device is further configured to generate a first game image representing a game space; and
the game device is further configured to generate the third game image which represents the game space and is different from the first game image when the attitude of the controller device is in the first state, and generate the fourth image different from the third image when the attitude of the controller device is in the second state;
the game device is further configured to control a player object arranged in the game space based on the operation data;
the first game image is generated representing the game space using a first virtual camera that is set so that the player object is included in a display range; and
the third game image is generated using a second virtual camera that is set at a position of a viewpoint of the player object when the attitude of the controller device is in the first state.

5. The game system according to claim 3, wherein the third game image is generated so that a predetermined object arranged in the game space is displayed in a different manner from that for the first game image when the attitude of the controller device is in the first state.

6. A game system including a game device, and a controller device capable of communicating with the game device,
the game device being configured at least to:
obtain operation data representing an operation on the controller device;

perform a game process based on the operation data;
generate a first game image based on the game process;
generate a second game image based on the game process;
output the first game image to a predetermined display device separate from the controller device; and
wirelessly transmit the second game image to the controller device, the controller device comprising an inertia sensor and being configured at least to:
receive the second game image;
display the second game image in a display device;
transmit the operation data, including data output from the inertia sensor, to the game device, wherein:
the game device is further configured to calculate an attitude of the controller device based on the data output from the inertia sensor;
the game device is further configured to generate a third game image or a fourth game image, as the second game image, and switch between the third game image and the fourth game image in accordance with whether the attitude of the controller device is in a predetermined first state or in a second state different from the first state;
the game device is further configured to generate a first game image representing a game space; and
the game device is further configured to generate the third game image which represents the game space and is different from the first game image when the attitude of the controller device is in the first state, and generate the fourth image different from the third image when the attitude of the controller device is in the second state;
the third game image is generated so that a predetermined object arranged in the game space is displayed in a different manner from that for the first game image when the attitude of the controller device is in the first state
the first game image is generated representing the game space while the predetermined object is made invisible; and
the third game image is generated while the predetermined object is made visible when the attitude of the controller device is in the first state.

7. A game system including a game device, and a controller device capable of communicating with the game device,
the game device being configured at least to:
obtain operation data representing an operation on the controller device;
perform a game process based on the operation data;
generate a first game image based on the game process;
generate a second game image based on the game process;
output the first game image to a predetermined display device separate from the controller device; and
wirelessly transmit the second game image to the controller device, the controller device comprising an inertia sensor and being configured at least to:
receive the second game image;
display the second game image in a display device;
transmit the operation data, including data output from the inertia sensor, to the game device, wherein:
the game device is further configured to calculate an attitude of the controller device based on the data output from the inertia sensor;
the game device is further configured to generate a third game image or a fourth game image, as the second game image, and switch between the third game image and the fourth game image in accordance with whether the attitude of the controller device is in a predetermined first state or in a second state different from the first state;
the game device is further configured to generate a first game image representing a game space; and
the game device is further configured to generate the third game image which represents the game space and is different from the first game image when the attitude of the controller device is in the first state, and generate the fourth image different from the third image when the attitude of the controller device is in the second state;
the game device is further configured to generate the third game image using a virtual camera which assumes an attitude in accordance with the attitude of the controller device when the attitude of the controller device is in the first state.

8. A game system including a game device, and a controller device capable of communicating with the game device,
the game device being configured at least to:
obtain operation data representing an operation on the controller device;
perform a game process based on the operation data;
generate a first game image based on the game process;
generate a second game image based on the game process;
output the first game image to a predetermined display device separate from the controller device; and
wirelessly transmit the second game image to the controller device, the controller device comprising an inertia sensor and being configured at least to:
receive the second game image;
display the second game image in a display device;
transmit the operation data, including data output from the inertia sensor, to the game device, wherein:
the game device is further configured to calculate an attitude of the controller device based on the data output from the inertia sensor;
the game device is further configured to generate a third game image or a fourth game image, as the second game image, and switch between the third game image and the fourth game image in accordance with whether the attitude of the controller device is in a predetermined first state or in a second state different from the first state;
the game device is further configured to generate a first game image representing a game space; and
the game device is further configured to generate the third game image which represents the game space and is different from the first game image when the attitude of the controller device is in the first state, and generate the fourth image different from the third image when the attitude of the controller device is in the second state;
the game device is further configured to generate the fourth game image which shows the game space as viewed from above when the attitude of the controller device is in the second state.

9. The game system according to claim 1, wherein the game device configured to use different methods of operation on a predetermined object in the game space when the attitude of the controller device is in the first state and when the attitude of the controller device is in the second state.

10. A game system including a game device, and a controller device capable of communicating with the game device,
the game device being configured at least to:
obtain operation data representing an operation on the controller device;
perform a game process based on the operation data;
generate a first game image based on the game process;
generate a second game image based on the game process;

output the first game image to a predetermined display device separate from the controller device; and
wirelessly transmit the second game image to the controller device, the controller device comprising an inertia sensor and being configured at least to:
receive the second game image;
display the second game image in a display device;
transmit the operation data, including data output from the inertia sensor, to the game device, wherein:
the game device is further configured to calculate an attitude of the controller device based on the data output from the inertia sensor;
the game device is further configured to generate a third game image or a fourth game image, as the second game image, and switch between the third game image and the fourth game image in accordance with whether the attitude of the controller device is in a predetermined first state or in a second state different from the first state;
the game device is configured to use different methods of operation on a predetermined object in the game space when the attitude of the controller device is in the first state and when the attitude of the controller device is in the second state;
when the attitude of the controller device is in the first state, the game device performs a predetermined game process in response to an operation on the controller device, the predetermined game process being a process which cannot be performed when the attitude of the controller device is in the second state.

11. A game apparatus capable of communicating a controller device having an inertial sensor, the game apparatus comprising a computer processor and being configured at least to:
obtain operation data representing an operation on the controller device;
perform a game process based on the operation data;
generate a first game image based on the game process;
generate a second game image based on the game process;
output the first game image to a predetermined display device separate from the controller device; and
wirelessly transmit the second game image to the controller device, the controller device being configured at least to: receive the second game image, display the second game image in a display device, and transmit the operation data, including data output from the inertia sensor, to the game device;
calculate an attitude of the controller device based on the data output from the inertia sensor;
generate a third game image or a fourth game image, as the second game image, and switch between the third game image and the fourth game image in accordance with whether the attitude of the controller device is in a predetermined first state or in a second state different from the first state; and
determine that the attitude of the controller device is in the first state when an attitude of a screen of the display device is in a vertical state, and in the second state when the attitude of the screen of the display device is in a horizontal state; and
an axis extending perpendicular to the screen of the display device points in a first direction when the attitude of the screen of the display device is in the vertical state and the axis extending perpendicular to the screen of the display device points in a second direction when the attitude of the screen of the display device is in the horizontal state, the first and second directions being perpendicular to each other.

12. A controller device comprising a computer processor and capable of communicating with a game device, wherein the game device is configured at least to:
obtain operation data representing an operation on the controller device;
perform a game process based on the operation data;
generate a first game image based on the game process;
generate a second game image based on the game process;
output the first game image to a predetermined display device separate from the controller device; and
wirelessly transmit the second game image to the controller device,
the controller device comprises an inertia sensor and is configured at least to:
receive the second game image;
display the second game image in a display device;
transmit the operation data, including data output from the inertia sensor, to the game device, wherein:
the game device is further configured to calculate an attitude of the controller device based on the data output from the inertia sensor;
the game device is further configured to generate a third game image or a fourth game image, as the second game image, and switch between the third game image and the fourth game image in accordance with whether the attitude of the controller device is in a predetermined first state or in a second state different from the first state;
the game device is further configured to determine that the attitude of the controller device is in the first state when an attitude of a screen of the display device is in a vertical state, and in the second state when the attitude of the screen of the display device is in a horizontal state; and
an axis extending perpendicular to the screen of the display device points in a first direction when the attitude of the screen of the display device is in the vertical state and the axis extending perpendicular to the screen of the display device points in a second direction when the attitude of the screen of the display device is in the horizontal state, the first and second directions being perpendicular to each other.

13. A non-transitory computer-readable medium, which upon execution by a game apparatus including a game device and a controller device capable of communicating with the game device, provide steps comprising:
the game device operating to at least to:
obtain operation data representing an operation on the controller device;
perform a game process based on the operation data;
generate a first game image based on the game process;
generate a second game image based on the game process;
output the first game image to a predetermined display device separate from the controller device; and
wirelessly transmit the second game image to the controller device,
the controller device comprising an inertia sensor and operating to at least to:
receive the second game image;
display the second game image in a display device;
transmit the operation data, including data output from the inertia sensor, to the game device, wherein:
the game device further operates to calculate an attitude of the controller device based on the data output from the inertia sensor;
the game device further operates to generate a third game image or a fourth game image, as the second game image, and switch between the third game image and the fourth game image in accordance with whether the attitude of the controller device is in a predetermined first state or in a second state different from the first state;

the game device further operates to determine that the attitude of the controller device is in the first state when an attitude of a screen of the display device is in a vertical state, and in the second state when the attitude of the screen of the display device is in a horizontal state; and an axis extending perpendicular to the screen of the display device points in a first direction when the attitude of the screen of the display device is in the vertical state and the axis extending perpendicular to the screen of the display device points in a second direction when the attitude of the screen of the display device is in the horizontal state, the first and second directions being perpendicular to each other.

14. A method of a controller device communicating with a game device, the method comprising:

the game device operating to at least to:
obtain operation data representing an operation on the controller device;
perform a game process based on the operation data;
generate a first game image based on the game process;
generate a second game image based on the game process;
output the first game image to a predetermined display device separate from the controller device; and
wirelessly transmit the second game image to the controller device, the controller device comprising an inertia sensor and operating to at least to:
receive the second game image;
display the second game image in a display device;
transmit the operation data, including data output from the inertia sensor, to the game device, wherein:

the game device further operates to calculate an attitude of the controller device based on the data output from the inertia sensor;

the game device further operates to generate a third game image or a fourth game image, as the second game image, and switch between the third game image and the fourth game image in accordance with whether the attitude of the controller device is in a predetermined first state or in a second state different from the first state; and the game device further operates to determine that the attitude of the controller device is in the first state when an attitude of a screen of the display device is in a vertical state, and in the second state when the attitude of the screen of the display device is in a horizontal state; and an axis extending perpendicular to the screen of the display device points in a first direction when the attitude of the screen of the display device is in the vertical state and the axis extending perpendicular to the screen of the display device points in a second direction when the attitude of the screen of the display device is in the horizontal state, the first and second directions being perpendicular to each other.

15. A method of a controller device communicating with a game device, the method comprising:

the game device operating to at least to:
obtain operation data representing an operation on the controller device;
perform a game process based on the operation data;
generate a first game image based on the game process;
generate a second game image based on the game process;
output the first game image to a predetermined display device separate from the controller device; and
wirelessly transmit the second game image to the controller device, the controller device comprising an inertia sensor and operating to at least to:
receive the second game image;
display the second game image in a display device;
transmit the operation data, including data output from the inertia sensor, to the game device, wherein:

the game device further operates to calculate an attitude of the controller device based on the data output from the inertia sensor;

the game device further operates to generate a third game image or a fourth game image, as the second game image, and switch between the third game image and the fourth game image in accordance with whether the attitude of the controller device is in a predetermined first state or in a second state different from the first state;

wherein if it is determined that the controller device is in the first state, the predetermined reference attitude is changed to another attitude closer to being horizontal, and if it is determined that the controller device is in the second state, the predetermined reference attitude is changed to another attitude closer to being vertical.

16. The method according to claim 14, wherein:

the first game image is generated representing a game space; and the third game image is generated which represents the game space and is different from the first game image when the attitude of the controller device is in the first state, and the fourth image different from the third image is generated when the attitude of the controller device is in the second state.

17. A method of a controller device communicating with a game device, the method comprising:

the game device operating to at least to:
obtain operation data representing an operation on the controller device;
perform a game process based on the operation data;
generate a first game image based on the game process;
generate a second game image based on the game process;
output the first game image to a predetermined display device separate from the controller device; and
wirelessly transmit the second game image to the controller device, the controller device comprising an inertia sensor and operating to at least to:
receive the second game image;
display the second game image in a display device;
transmit the operation data, including data output from the inertia sensor, to the game device, wherein:

the game device further operates to calculate an attitude of the controller device based on the data output from the inertia sensor;

the game device further operates to generate a third game image or a fourth game image, as the second game image, and switch between the third game image and the fourth game image in accordance with whether the attitude of the controller device is in a predetermined first state or in a second state different from the first state;

the game device further operates to generate a first game image representing a game space; and the game device further operates to generate the third game image which represents the game space and is different from the first game image when the attitude of the controller device is in the first state, and generate the fourth image different from the third image when the attitude of the controller device is in the second state;

the game device further operates to control a player object arranged in the game space based on the operation data;

the first game image is generated representing the game space using a first virtual camera that is set so that the player object is included in a display range; and the third game image is generated using a second virtual camera that is set at a position of a viewpoint of the player object when the attitude of the controller device is in the first state.

18. The game system according to claim 16, wherein the third game image is generated so that a predetermined object arranged in the game space is displayed in a different manner from that for the first game image when the attitude of the controller device is in the first state.

19. A method of a controller device communicating with a game device, the method comprising:

the game device operating to at least to:
  obtain operation data representing an operation on the controller device;
  perform a game process based on the operation data;
  generate a first game image based on the game process;
  generate a second game image based on the game process;
  output the first game image to a predetermined display device separate from the controller device; and
  wirelessly transmit the second game image to the controller device, the controller device comprising an inertia sensor and operating to at least to:
  receive the second game image;
  display the second game image in a display device;
  transmit the operation data, including data output from the inertia sensor, to the game device, wherein:

the game device further operates to calculate an attitude of the controller device based on the data output from the inertia sensor;

the game device further operates to generate a third game image or a fourth game image, as the second game image, and switch between the third game image and the fourth game image in accordance with whether the attitude of the controller device is in a predetermined first state or in a second state different from the first state;

the game device further operates to generate a first game image representing a game space; and the game device further operates to generate the third game image which represents the game space and is different from the first game image when the attitude of the controller device is in the first state, and generate the fourth image different from the third image when the attitude of the controller device is in the second state;

the third game image is generated so that a predetermined object arranged in the game space is displayed in a different manner from that for the first game image when the attitude of the controller device is in the first state the first game image is generated representing the game space while the predetermined object is made invisible; and the third game image is generated while the predetermined object is made visible when the attitude of the controller device is in the first state.

20. A method of a controller device communicating with a game device, the method comprising:

the game device operating to at least to:
  obtain operation data representing an operation on the controller device;
  perform a game process based on the operation data;
  generate a first game image based on the game process;
  generate a second game image based on the game process;
  output the first game image to a predetermined display device separate from the controller device; and
  wirelessly transmit the second game image to the controller device, the controller device comprising an inertia sensor and operating to at least to:
  receive the second game image;
  display the second game image in a display device;
  transmit the operation data, including data output from the inertia sensor, to the game device, wherein:

the game device further operates to calculate an attitude of the controller device based on the data output from the inertia sensor;

the game device further operates to generate a third game image or a fourth game image, as the second game image, and switch between the third game image and the fourth game image in accordance with whether the attitude of the controller device is in a predetermined first state or in a second state different from the first state;

the game device further operates to generate a first game image representing a game space; and the game device further operates to generate the third game image which represents the game space and is different from the first game image when the attitude of the controller device is in the first state, and generate the fourth image different from the third image when the attitude of the controller device is in the second state;

the game device further operates to generate the third game image using a virtual camera which assumes an attitude in accordance with the attitude of the controller device when the attitude of the controller device is in the first state.

21. A method of a controller device communicating with a game device, the method comprising:

the game device operating to at least to:
  obtain operation data representing an operation on the controller device;
  perform a game process based on the operation data;
  generate a first game image based on the game process;
  generate a second game image based on the game process;
  output the first game image to a predetermined display device separate from the controller device; and
  wirelessly transmit the second game image to the controller device, the controller device comprising an inertia sensor and operating to at least to:
  receive the second game image;
  display the second game image in a display device;
  transmit the operation data, including data output from the inertia sensor, to the game device, wherein:

the game device further operates to calculate an attitude of the controller device based on the data output from the inertia sensor;

the game device further operates to generate a third game image or a fourth game image, as the second game image, and switch between the third game image and the fourth game image in accordance with whether the attitude of the controller device is in a predetermined first state or in a second state different from the first state;

the game device further operates to generate a first game image representing a game space; and the game device further operates to generate the third game image which represents the game space and is different from the first game image when the attitude of the controller device is in the first state, and generate the fourth image different from the third image when the attitude of the controller device is in the second state;

the game device further operates to generate the fourth game image which shows the game space as viewed from above when the attitude of the controller device is in the second state.

22. The game system according to claim 14, wherein the game device operates to use different methods of operation on a predetermined object in the game space when the attitude of the controller device is in the first state and when the attitude of the controller device is in the second state.

23. A method of a controller device communicating with a game device, the method comprising:

the game device operating to at least to:
  obtain operation data representing an operation on the controller device;
  perform a game process based on the operation data;
  generate a first game image based on the game process;
  generate a second game image based on the game process;
  output the first game image to a predetermined display device separate from the controller device; and
  wirelessly transmit the second game image to the controller device, the controller device comprising an inertia sensor and operating to at least to:
  receive the second game image;
  display the second game image in a display device;
  transmit the operation data, including data output from the inertia sensor, to the game device, wherein:

the game device further operates to calculate an attitude of the controller device based on the data output from the inertia sensor;

the game device further operates to generate a third game image or a fourth game image, as the second game image, and switch between the third game image and the fourth game image in accordance with whether the attitude of the controller device is in a predetermined first state or in a second state different from the first state;

the game device operates to use different methods of operation on a predetermined object in the game space when the attitude of the controller device is in the first state and when the attitude of the controller device is in the second state;

when the attitude of the controller device is in the first state, the game device performs a predetermined game process in response to an operation on the controller device, the predetermined game process being a process which cannot be performed when the attitude of the controller device is in the second state.

* * * * *